United States Patent
Bourlas et al.

(10) Patent No.: US 8,625,498 B2
(45) Date of Patent: Jan. 7, 2014

(54) TILING ALLOCATIONS FOR WIRELESS COMMUNICATION

(75) Inventors: Yair Bourlas, San Diego, CA (US); Peter J. Graumann, Calgary (CA); Sina Zahedi, San Diego, CA (US); Ron Porat, San Diego, CA (US)

(73) Assignee: WI-LAN, Inc., Ottawa (CA)

( * ) Notice: Subject to any disclaimer, the term of this patent is extended or adjusted under 35 U.S.C. 154(b) by 1804 days.

(21) Appl. No.: 11/625,773

(22) Filed: Jan. 22, 2007

(65) Prior Publication Data

US 2008/0176577 A1    Jul. 24, 2008

(51) Int. Cl.
*H04W 4/00* (2009.01)
*H04W 72/00* (2009.01)

(52) U.S. Cl.
USPC ........... 370/329; 370/328; 370/330; 370/332; 455/450; 455/452.1; 455/464

(58) Field of Classification Search
USPC ............................... 455/450, 451, 452.1, 464; 370/328–330, 332
See application file for complete search history.

(56) References Cited

U.S. PATENT DOCUMENTS

| | | |
|---|---|---|
| 6,693,887 B2 | 2/2004 | Stanwood et al. |
| 2004/0017825 A1 | 1/2004 | Stanwood et al. |
| 2005/0286408 A1* | 12/2005 | Jin et al. .......... 370/208 |
| 2006/0126553 A1* | 6/2006 | Lim et al. ........ 370/321 |
| 2006/0146949 A1 | 7/2006 | Bykovnikov |
| 2006/0153112 A1 | 7/2006 | Lim et al. |
| 2006/0193286 A1* | 8/2006 | Naghian et al. ........ 370/328 |
| 2007/0002958 A1* | 1/2007 | Chang et al. .......... 375/260 |
| 2007/0230326 A1* | 10/2007 | Pandoh et al. ......... 370/208 |
| 2008/0039107 A1* | 2/2008 | Ma et al. ............. 455/450 |
| 2008/0062914 A1* | 3/2008 | Olfat ................. 370/321 |
| 2008/0075032 A1* | 3/2008 | Balachandran et al. ....... 370/317 |
| 2008/0151794 A1* | 6/2008 | Moilanen ............. 370/310 |
| 2008/0279125 A1* | 11/2008 | Hottinen ............... 370/281 |
| 2009/0060081 A1* | 3/2009 | Zhang et al. ......... 375/267 |
| 2009/0303918 A1* | 12/2009 | Ma et al. .............. 370/315 |

* cited by examiner

*Primary Examiner* — Wesley Kim
(74) *Attorney, Agent, or Firm* — Volpe and Koenig, P.C.

(57) ABSTRACT

Allocations for access in a wireless system may be tiled onto a subframe having a first dimension and a second dimension. In an exemplary embodiment, allocations are distributed along the first dimension while the second dimension is locked, and the allocations are distributed along the second dimension while the first dimension is locked. In another exemplary embodiment, allocations are striped by extending a length of a first allocation along the first dimension and by expanding a breadth of the first allocation along the second dimension responsive to a size of the first allocation and by extending a length of a second allocation along the second dimension and expanding a breadth of the second allocation along the first dimension responsive to a size of the second allocation. In yet another exemplary embodiment, multiple allocations are placed proximately to an allocation placement target and allocation-free areas are produced on a subframe.

40 Claims, 38 Drawing Sheets

Example Channel Utilization Mapping Permutations

12 Subcarriers and 4 Subchannels in Channel

Example TDD Frame Format

Example FDD Frame Format

1500 General Example Distributive Tiling Method

1600 Numerical Distributive Tiling Example

TILING ALLOCATIONS FOR WIRELESS COMMUNICATION

BACKGROUND

Wireless communication is extraordinarily prevalent in today's society. People use cordless phones, cellular phones, wireless data communication devices, etc. on a daily basis. The ability to communicate wirelessly has become pervasive in homes, businesses, retail establishments, and in the outdoors generally. Consequently, people can now communicate while in transit and in almost any environment.

Wireless communication involves the use of a limited resource: the electromagnetic spectrum. Different wireless communication schemes involve using different bands or segments of the electromagnetic spectrum in different manners. Typically, each particular segment of the electromagnetic spectrum is utilized in accordance with a wireless standard that has been created by a government entity and/or an industry consortium.

There are many wireless standards under which wireless devices operate today. Example wireless standards include, but are not limited to, Bluetooth, Digital Enhanced Cordless Telecommunications (DECT), Code Division Multiple Access (CDMA)-2000, Wideband-CDMA (WCDMA), Wi-Fi, WiMAX, and so forth. Wireless standards that have a marketing-oriented name typically also have a corresponding more technical name for the standard. For example, the term "Wi-Fi" is usually considered to correspond to at least the IEEE 802.11 (a), (b), and (g) standards. Similarly, the term "WiMAX" is usually considered to correspond to at least a subset of the IEEE 802.16 standard.

Because the electromagnetic spectrum is a finite resource, multiple users share the available frequencies in an effectively simultaneous manner. This sharing is managed so as to reduce the interference that jeopardizes electromagnetic communications. Two mechanisms to share the electromagnetic spectrum are to separate users geographically or to separate them temporally. Multiple users may also be separated into different frequencies, different time segments, or into different codes that are spread over a relatively wide band of frequencies. These and other separation or sharing mechanisms may also be combined and simultaneously utilized in a single system.

Creating and enforcing the separation and sharing mechanisms usually involve some level of planning and scheduling. Planning and scheduling can therefore relate to geographical, coding, temporal, and/or frequency mechanisms for separating usage of the electromagnetic spectrum in a manner that effectively manages interference between and among users.

In order to facilitate the sharing of the electromagnetic spectrum in accordance with a user separation mechanism, some entity typically provides planning and/or scheduling so that the selected separation mechanism or mechanisms may be adopted simultaneously by multiple users. When the planning and scheduling is performed by a centralized entity, the planning and scheduling decisions are typically provided wirelessly to the multiple users over the air interface. Unfortunately, existing approaches to planning and scheduling can often result in a disproportionate allocation of spectrum and/or time access among the multiple users and/or an inefficient utilization of the finite electromagnetic spectrum. Existing approaches may also fail to adequately address interference issues.

SUMMARY

In an exemplary embodiment of the present disclosure, allocations may be tiled onto a subframe having a first dimension and a second dimension. Allocations are distributed along the first dimension while the second dimension is locked, and the allocations are distributed along the second dimension while the first dimension is locked.

In another exemplary embodiment of the present disclosure, allocations are striped by extending a length of a first allocation along the first dimension and by expanding a breadth of the first allocation along the second dimension responsive to a size of the first allocation and by extending a length of a second allocation along the second dimension and expanding a breadth of the second allocation along the first dimension responsive to a size of the second allocation.

In yet another exemplary embodiment of the present disclosure, multiple allocations are placed proximately to an allocation placement target on a subframe, while producing allocation-free areas on the subframe.

Other method, system, apparatus, device, media, procedure, arrangement, etc. implementations of the present disclosure are described herein.

BRIEF DESCRIPTION OF THE DRAWINGS

The same numbers are used throughout the drawings to reference like and/or corresponding aspects, features, and components.

DETAILED DESCRIPTION

Introduction

The present disclosure is directed to the methods, devices, systems, media, etc. for fairly and efficiently providing allocations of wireless access among multiple users in a wireless system, and the efficient distribution of such allocations within communication subframes of the system. As used herein, the terms "allocations" and "bandwidth allocations" are used interchangeably and refer to an allocation of access to a wireless link in the wireless system, wherein the allocation has both time and frequency dimensions and is also referred to herein as one or more "slots."

This "DETAILED DESCRIPTION" of exemplary embodiments of the present disclosure is divided into five sections. A first section references FIGS. 1-5 and is entitled "Example Environments". A second section references FIGS. 6-9 and is entitled "Example General Implementations". A third section is entitled "Example Implementations for Scheduling Algorithms" and references FIGS. 10-13. The fourth section is entitled "Example Implementations for Tiling Bandwidth Allocations" and references FIGS. 14-35. FIGS. 14-19 are primarily directed to distributive approaches for tiling bandwidth allocations, and FIGS. 20-31 are primarily directed to striping approaches for tiling bandwidth allocations. FIGS. 32-35 are primarily directed to organizational approaches for bandwidth allocation tiling implementations. FIG. 36, which illustrates a general wireless device, is described in the fifth section entitled "Example Device Implementations".

Example Environments

The descriptions in this "Example Environments" section, as well as the referenced drawing FIGS. 1-5, are examples only. These described environments are only example environments in which described inventive implementations may be realized and/or practiced. Hence, the inventive implementations as described herein below in other sections may also be realized and/or practiced in other environments.

Figure 1:
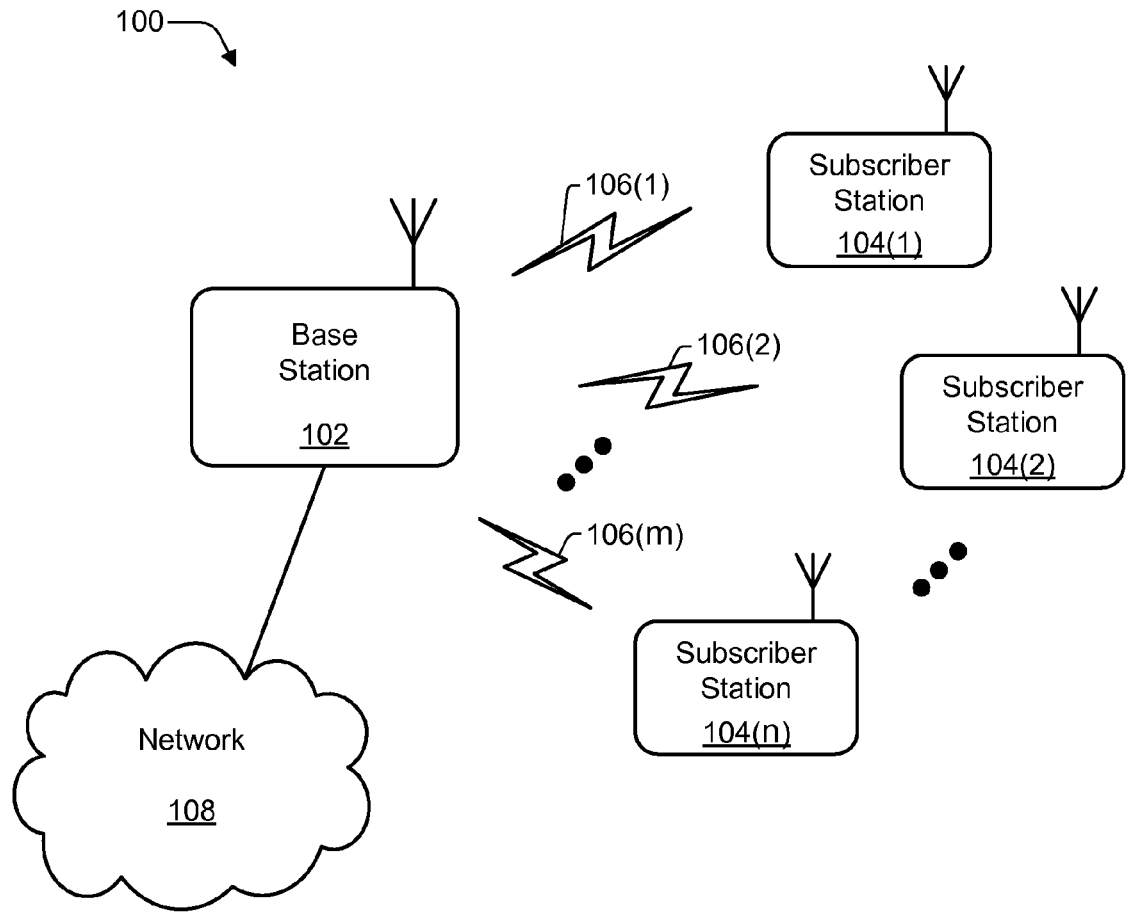
FIG. 1 is a block diagram of an example wireless environment having multiple wireless devices and multiple communication links.

FIG. 1 is block diagram of an example wireless environment 100 having multiple wireless devices 102 and 104 and multiple communication links 106. As illustrated, wireless environment 100 includes a base station 102, a network 108, "n" subscriber stations 104, and "m" communication links 106, with "n" and "m" being the same or different integers. Although a single communication link 106 is explicitly shown as being associated with each subscriber station 104, each subscriber station 104 may be simultaneously participating in multiple communication links 106, including possibly with other subscriber stations 104.

Wireless communications environment 100 is representative generally of many different types of wireless communications environments, including but not limited to those pertaining to wireless local area network (wireless LAN) technology (e.g., Wi-Fi or WiMAX systems), wireless wide area network (wireless WAN) technology (e.g., WiMAX systems), ad hoc wireless network technology (e.g., Wi-Fi or Bluetooth systems), cellular technology (including so-called personal communication services (PCS)), trunking technology, hybrid or multi-use technology (e.g., WiMAX systems), and so forth.

In wireless communications environment 100, base station 102 is in wireless communication with subscriber stations 104(1), 104(2) . . . 104(n) via wireless communications or communication links 106(1), 106(2) . . . 106(m), respectively. Although implementations may vary, base station 102 is typically fixed, and subscriber stations 104 are either mobile or stationary. Although wireless communications environment 100 shows base station 102 communicating to "n" subscriber stations 104 in one general direction, base station 102 may actually be communicating with any number of subscriber stations 104 in any number of directions, including by sectors or omni-directionally.

As illustrated, base station 102 is capable of accessing a network 108. Network(s) 108 may be one or more of a wired network, another wireless network, a combination thereof, and so forth. Access to network 108 enables base station 102 to forward data from subscriber stations 104 to external network locations, and vice versa. Examples of network 108 include, by way of example but not imitation, the internet, a landline telephone network, another wireless network, wired nodes of the overall network of base station 102, LANs and WANs, etc. that are operating in accordance with any given standard.

Base station 102 may be, for example, a nexus point, a trunking radio, a switch or router, an access point, a traditional cellular base station, some combination and/or derivative thereof, and so forth. Subscriber stations 104 may be, for example, a hand-held device; a server, client, personal, desktop, and/or laptop computer; a wireless expansion card, module, adapter, or similar apparatus that is coupled to a computer; a storage device; a set-top box, television, or other entertainment device; a personal digital assistant (PDA); a mobile phone or other mobile appliance; a vehicle having a wireless communication device; a tablet or hand/palm-sized computer; a wireless router; a node of a wireless mesh network; a portable inventory-related scanning device; any device capable of processing generally; some combination thereof; and so forth.

Base station 102 may interact with subscriber stations 104 in accordance with any individual or combined standardized and/or specialized air interface technologies. Example air interface technologies include, by way of example but not limitation, the IEEE 802.11 standard, the IEEE 802.16 standard, various cellular phone standards, some combination or derivative thereof, or any other such technology. However, where air interface specifics are applicable, certain description examples herein below focus on the IEEE 802.16 standard and/or on orthogonal frequency division multiple access (OFDMA) technology and orthogonal frequency division multiplexing (OFDM) schemes. Nevertheless, the performance of example data downlink operations (e.g., fairness-based algorithmic scheduling, bandwidth allocation tiling, etc.) as described herein below is applicable to at least those communication environments generally in which a centralized entity is responsible for the planning and/or scheduling of transmissions across the air interface.

Figure 2:
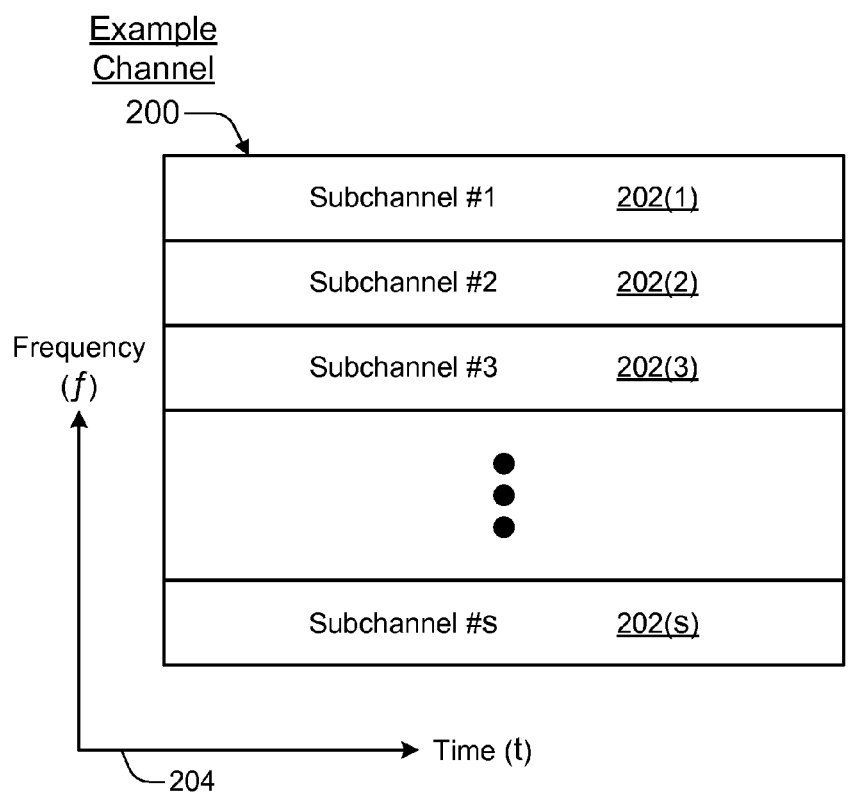
FIG. 2 is a block diagram of an example channel for one or more communication links.

FIG. 2 is a block diagram of an example channel 200 for one or more communication links 106 (of FIG. 1). An axis 204 indicates that time (t) elapses along the abscissa axis and that frequencies (f) range along the ordinate axis. Channel 200 includes at least one subchannel 202. As illustrated, channel 200 includes "s" subchannels 202, with "s" being some integer. More specifically, channel 200 includes subchannel #1 202(1), subchannel #2 202(2), subchannel #3 202(3) . . . subchannel #s 202(s). Subchannels 202 may correspond to communication links 106. Alternatively, a single subchannel 202 may carry multiple communication links 106, or a single communication link 106 may consume multiple subchannels 202.

Typically, a channel 200 is a radio frequency (RF) channel. More specifically, a channel is usually defined by the carrier center frequency and channel bandwidth. With frequency division duplex (FDD) systems, channels are often divided into downlink (DL) subchannel(s) and uplink (UL) subchannel(s) because the rules for both their construction and their use are often different. Furthermore, the DL and UL subchannels are transmitted from separate sources. At times, an individual "channel" or "subchannel" may be a specific frequency and time allocation within an overall "RF channel". The subchannel may be intended or even reserved for a specific purpose, such as for channel access requests. With time division duplex (TDD) systems, each frequency channel usually carries DL subframes and UL subframes at different times. Example FDD and TDD implementations having DL and UL subframes at a given frequency or frequencies are described further herein below with particular reference to FIGS. 4A and 4B.

In an OFDMA implementation, for example, each RF channel is formed of a number of subcarriers, with the number being dependant upon the Fast Fourier Transform (FFT) size. For instance, a 1024 point FFT results in 1024 subcarriers. In accordance with OFDMA principles, a subchannel is a group of subcarriers that are not necessarily adjacent but are within the same RF channel. The member subcarriers for a given subchannel are well defined. Which groupings of subcarriers are permitted to form subchannels is a function of the channel utilization mapping permutation being used in that zone (in time) of a particular subframe.

Figure 3:
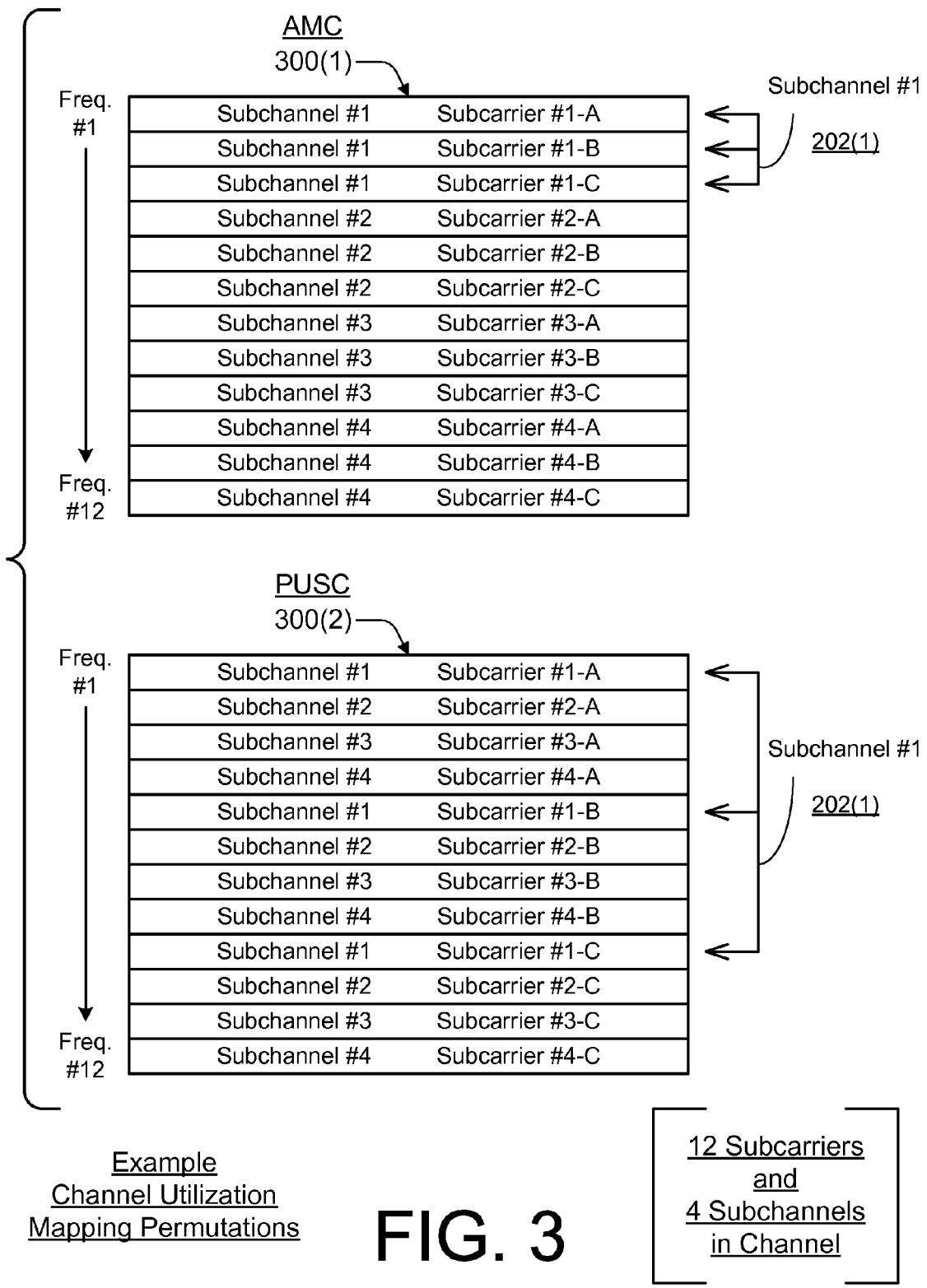
FIG. 3 is a block diagram of two example channel utilization mappings between subchannels and subcarriers.

FIG. 3 is a block diagram of two example channel utilization mapping permutations 300(1) and 300(2), with the mappings being between subchannels and subcarriers. Mapping permutations are different ways of grouping subcarriers into subchannels. Each mapping permutation 300 is directed to a hypothetical example RF channel having 12 subcarriers and 4 subchannels. Each subchannel #1, #2, #3 and #4 comprises 3 subcarriers A, B, and C. As indicated by the vertical frequency axes, the 12 subcarrier frequencies range from #1 at the top to #12 at the bottom of each channel mapping permutation 300. In practice, a given channel may include different numbers of subchannels, subcarriers, and/or subcarriers per subchannel than those used for this example.

There are two primary kinds of subchannel-to-subcarrier mapping permutations: distributed and adjacent. Generally, distributed mapping permutations perform well in mobile environments, and adjacent mapping permutations are usable for fixed or lower mobility environments. These two kinds of mapping permutations enable a tradeoff between mobility and throughput.

Mapping permutation 300(1) is directed to Advanced Modulation and Coding (AMC). An AMC mapping permutation uses adjacent subcarriers to form subchannels. AMC enables a subscriber station to communicate on those subcarrier frequencies that currently have relatively less interference. AMC is therefore often better for slowly changing and relatively stable wireless environments (e.g., which often involve stationary subscriber stations).

As illustrated in the top three subcarriers of AMC permutation 300(1), subchannel #1 202(1) is formed from three adjacent subcarriers: subcarrier #1-A, subcarrier #1-B, and subcarrier #1-C. These three subcarriers are adjacent in the frequency band of the RF channel. Although not separately identified, each of subchannel #2, #3, and #4 is likewise formed from three adjacent subcarriers. Hence, subchannel #2 is formed from subcarrier #2-A, subcarrier #2-B, and subcarrier #2-C. Subchannel #3 is formed from subcarrier #3-A, subcarrier #3-B, and subcarrier #3-C. Subchannel #4 is formed from subcarrier #4-A, subcarrier #4-B, and subcarrier #4-C.

Mapping permutation 300(2) is directed to Partial Usage of SubChannels (PUSC). A PUSC mapping permutation uses distributed subcarriers to form subchannels. PUSC enables interference to be relatively evenly distributed across the subchannels and thus across communicating subscriber stations. PUSC is therefore often better for wireless environments in which the communication conditions are rapidly changing (e.g., which usually includes highly mobile environments).

PUSC can also enable different sectors of the same or adjacent base stations to have lower interference and greater handover flexibility. Although not a requirement, the subcarriers are typically divided into three groups in such a way that each group has some subcarriers for data and some for pilots. This allows the three sectors to operate independently. However, because they are all from the same RF channel, it allows a subscriber station to more easily hear transmissions from adjacent sectors, which aids in handovers. PUSC is sometimes credited with enabling a reuse ratio of one, but aside from the handover benefits, it may be argued that it simply allows a subdividing of the overall RF channel into smaller RF channels.

As illustrated by the indicated three subcarriers for subchannel #1 202(1) in mapping permutation 300(2), subchannel #1 202(1) is formed from three distributed subcarriers: subcarrier #1-A, subcarrier #1-B, and subcarrier #1-C. Although not separately identified, each of subchannel #2, #3, and #4 is likewise formed from three distributed subcarriers. Hence, subchannel #2 is formed from subcarrier #2-A, subcarrier #2-B, and subcarrier #2-C. Subchannel #3 is formed from subcarrier #3-A, subcarrier #3-B, and subcarrier #3-C. Subchannel #4 is formed from subcarrier #4-A, subcarrier #4-B, and subcarrier #4-C.

Although PUSC mapping permutation 300(2) is illustrated with subcarriers that are evenly distributed, PUSC mapping permutations may be formed from non-evenly-distributed (e.g., randomly-distributed) subcarriers. Also, there are other mapping permutations besides AMC and PUSC. For example, a mapping permutation may adopt the Full Usage of SubChannels (FUSC) approach (which is described in, e.g., IEEE 802.16) or any other approach.

Figure 4A:
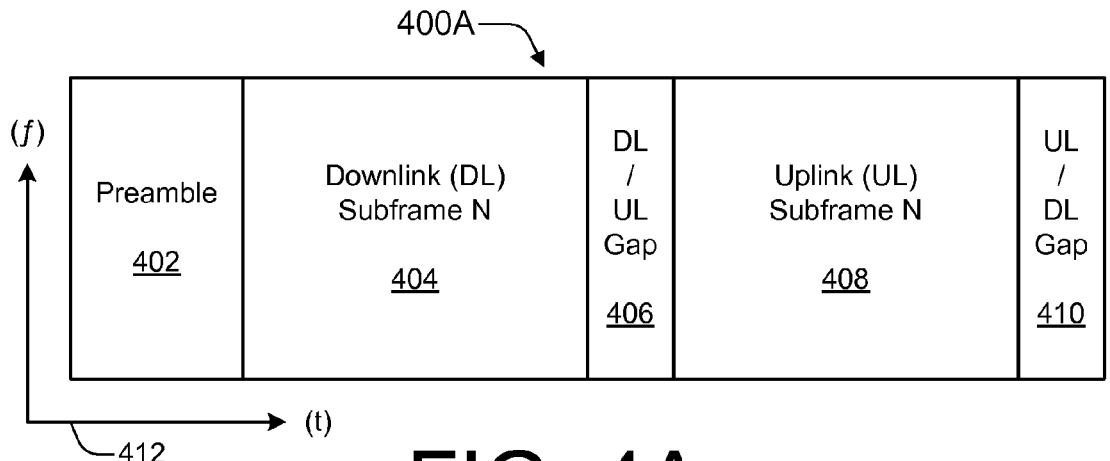
FIGS. 4A and 4B are block diagrams of example TDD and FDD frame formats, respectively, for transmission on a channel.
Figure 4B:
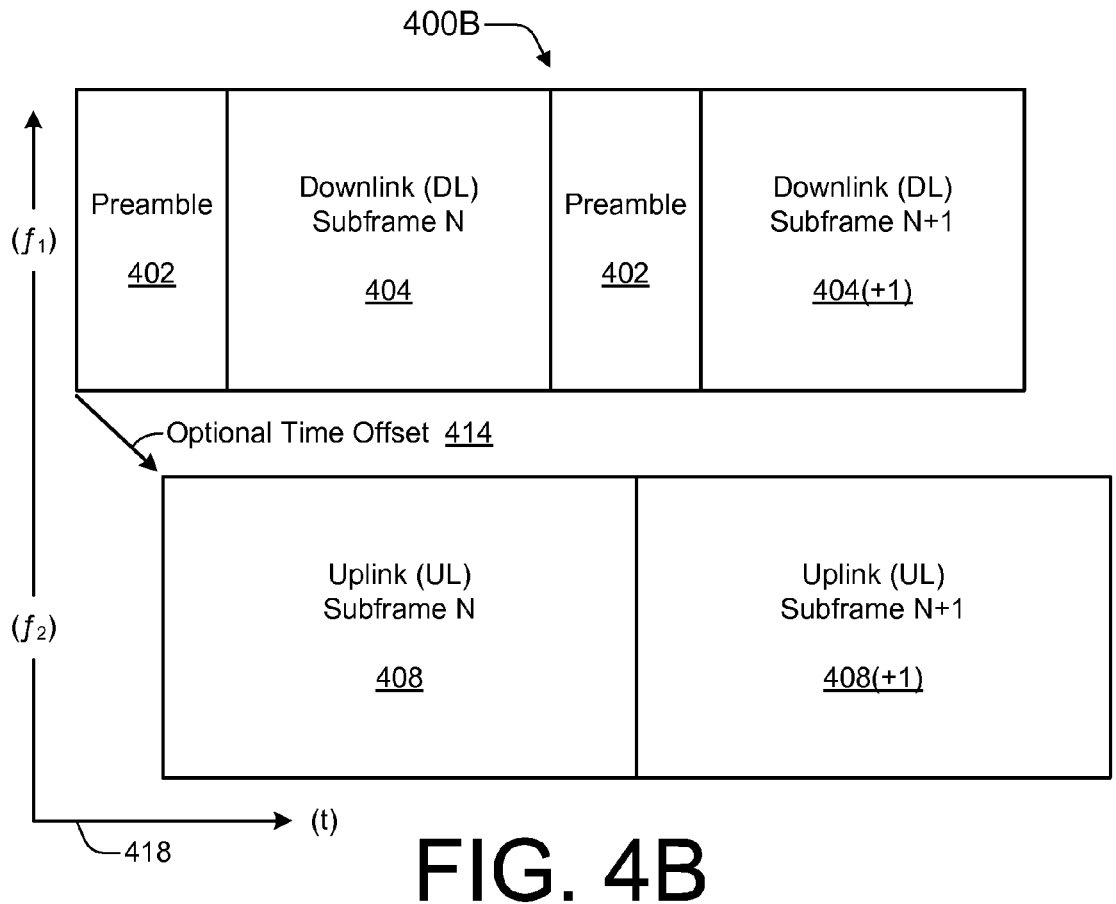

FIGS. 4A and 4B are block diagrams of example TDD and FDD frame formats, respectively, for transmission on a channel. FIG. 4A is a block diagram of an example time division duplex (TDD) frame format 400A. FIG. 4B is a block diagram of an example frequency division duplex (FDD) frame format 400B. Frame formats 400A and 400B include downlink (DL) subframes 404 and uplink (UL) subframes 408. Each block diagram also includes an axis 412 or 418 showing time (t) increasing rightward along the abscissa axis and frequency (f) increasing upward along the ordinate axis. The different frame portions are not necessarily illustrated to scale.

Frames subdivide transmission and reception times to provide temporal order to wireless communications. In general, different time periods separate DL and UL transmissions in TDD implementations. Different frequencies, on the other hand, separate DL and UL transmissions in FDD. However, there may also be a time component to FDD because individual DL and UL channels may also be internally separated temporally by subframes.

As illustrated in FIG. 4A, TDD frame format 400A includes a preamble 402, a DL subframe N 404, a DL/UL gap 406, an UL subframe N 408, and an UL/DL gap 410. Implementations as described herein, however, need not include all of these example frame format parts. After UL/DL gap 410, another TDD frame 400A may be started with another preamble 402 followed by a DL subframe N+1 404(+1) (not explicitly shown in FIG. 4A), another DL/UL gap 406, an UL subframe N+1 408(+1) (not explicitly shown in FIG. 4A), and so forth. In this manner, each frequency repeats DL subframes 404 and UL subframes 408 as TDD frames 400A are repeated.

As illustrated in FIG. 4B, FDD frame format 400B includes two different frequencies $f_1$ and $f_2$. One frequency, the DL subchannel $f_1$, includes multiple DL subframes 404. Another frequency, the UL subchannel $f_2$, includes multiple UL subframes 408. More specifically, the DL subchannel $f_1$ includes a preamble 402, a DL subframe N 404, another preamble 402, a DL subframe N+1 404(+1), and so forth. The UL subchannel $f_2$ includes an UL subframe N 408, an UL subframe N+1 408(+1), and so forth. The DL subchannel $f_1$ and the UL subchannel $f_2$ may have different start times for their subframes in accordance with optional time offset 414.

Thus, a number of different frame portions are illustrated in FIGS. 4A and 4B. These frame portions include, for example, preambles 402, DL subframes 404, UL subframes 408, and so forth. These frame portions may be different lengths, may have different content, may follow different rules, and so forth. In practice, frame durations may change and/or the DL and UL ratio may be changed, including possibly dynamically. Additionally, the DL and UL ratios may be changed dynamically and/or by the operator.

Depending on perspective, the frame may be considered a Medium Access Control (MAC) concept or a physical (PHY) layer concept. Regardless, the concept originated from two primary sources or perspectives. First, from the PHY perspective, in non-continuous physical layers (e.g., in Time Division Duplexing (TDD) implementations, in most reasonable implementations of the PHY layers in IEEE 802.16, etc.), the frame is a structure that breaks time up into pieces to facilitate ease of synchronization of the subscriber station with the base station.

For example, a typical "TDD frame" (e.g., as illustrated in FIG. 4A) has the following structure: a frame start preamble, a DL subframe, a DL/UL gap, an UL subframe, and an UL/DL gap. The time between frame start preambles is typically fixed. Usually, the position and duration of the gaps is also fixed; however, the availability of data for transmission can make them appear to vary in length. Within the DL or UL subframes, other dynamic variability can occur to take advantage of special capabilities of individual subscriber stations.

Second, from the MAC perspective, a frame is the time interval over which scheduling occurs. In a system with a framed PHY layer, this MAC frame concept usually maps directly to the PHY frame. Because the MAC layer is controlling (i) who transmits or receives and (ii) when such transmissions and receptions are to occur, the MAC layer directs a number of items. For example, the MAC layer directs the use of some PHY layer features (e.g., a burst profile such as the modulation/Forward Error Correction (FEC)), the use of subchannelization, the use of zone switches (e.g., for mapping permutation changes and special features such as Multiple Input, Multiple Output (MIMO)), and so forth.

Figure 5:
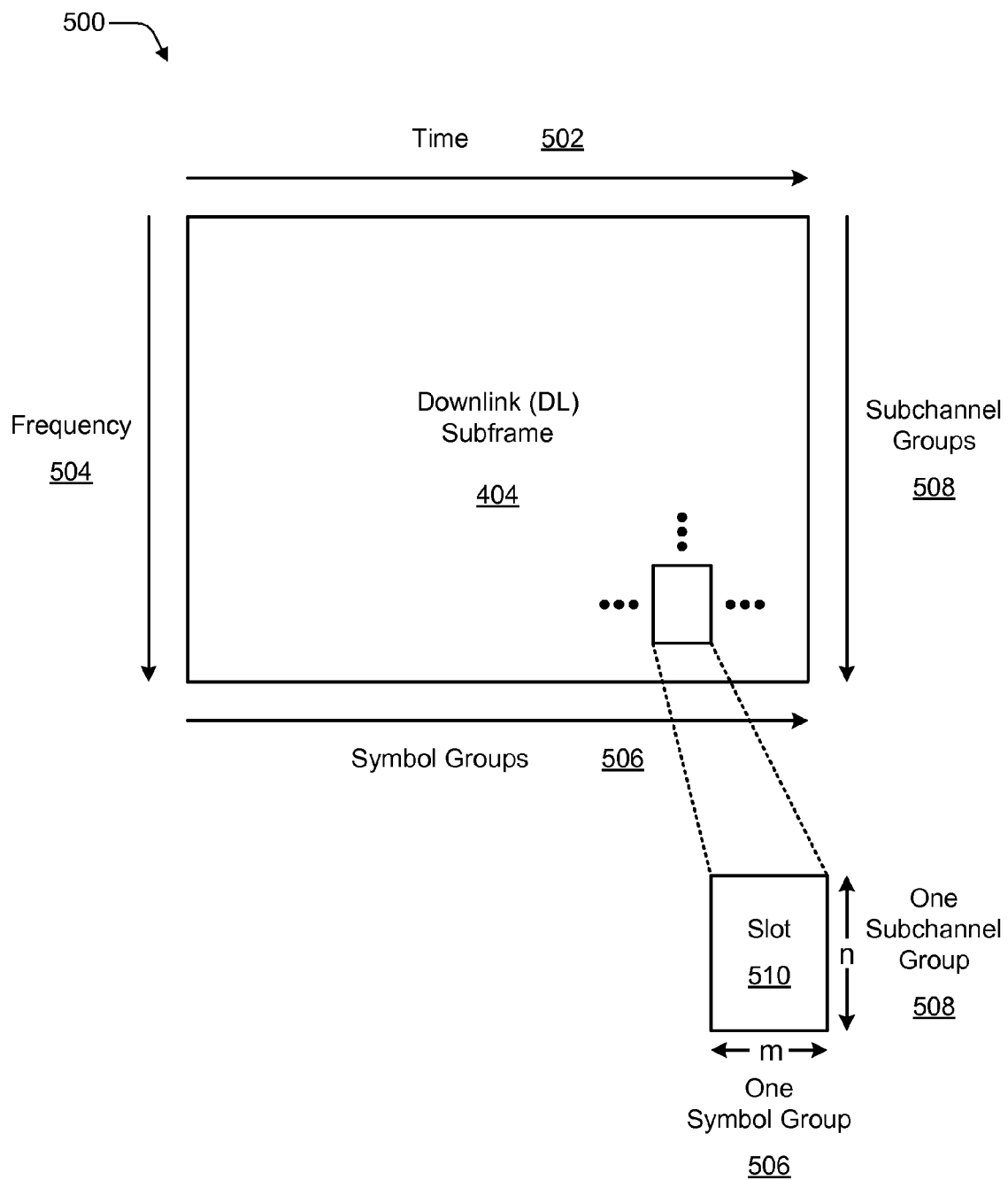
FIG. 5 is a block diagram of an example downlink (DL) subframe that includes a slot.

FIG. 5 is a block diagram 500 of an example DL subframe 404 that includes a slot 510. As illustrated, DL subframe 404 is a rectangular block that may be defined by two dimensions: time 502 and frequency 504. Time 502 extends along the horizontal direction and frequency 504 extends along the vertical direction in FIG. 5. However, these dimensions may be exchanged.

As described above with particular reference to FIGS. 2 and 3, frequencies 504 are divided into or mapped to subchannels 202. Similarly, time 502 is divided into symbols. Symbols are transmitted over the air interface in accordance with a given coding rate. Symbols are described further herein below. Subchannels 202 (of FIG. 2) are grouped into subchannel groups 508 along the axis of frequencies 504. Symbols are grouped into symbol groups 506 along the axis of time 502.

DL subframe 404 is comprised of multiple slots 510, but only a single slot is explicitly illustrated for the sake of clarity. Each slot 510 may have the following dimensions: one symbol group 506 by one subchannel group 508. Each symbol group 506 includes "m" symbols, with "m" being some integer. Each subchannel group 508 includes "n" subchannels, with "n" being some integer.

Generally, the term "symbol" has two different, relatively-common meanings, including within IEEE 802.16. There are OFDM symbols and coding rate symbols (e.g., Quadrature Amplitude Modulation (QAM)). OFDM symbols are the basic "packets" at the PHY layer that are used for transmission of data, and they may have multiple modulations and coding rates. OFDM symbols represent a unit of time spread across all subcarriers of a given RF channel. They can have a built-in redundancy that makes them tolerant to mobility and multipath fading. In IEEE 802.16 for example, they usually map directly onto FEC blocks.

From the MAC point of view, on the other hand, different subchannels can cause different subcarriers of an OFDM symbol to be used in different ways, including having a different QAM modulation. QAM symbols are the data bits that can be deduced from (or cause) a phase and amplitude sampling of the RF carrier. When using QAM-X modulation, there are X possibilities of phase and amplitude allowing $\log_2(X)$ number of bits per sample. For example, a QPSK (QAM-4) symbol represents 2 data bits and a QAM-64 symbol represents 6 data bits. The modulation or type of QAM symbol that is used determines the data carrying capacity of the OFDM symbols. Hence, both OFDM symbols and coding rate QAM symbols are relevant to scheduling.

Hence, a slot (e.g., a slot 510) may be a unit of allocation defined by a number of subchannels (e.g., a subchannel group 508) and by a number of OFDM symbols (e.g., a symbol group 506). The slot definition may be a function of both the mapping permutation and whether the allocation is in the DL or the UL. For IEEE 802.16, the number of subchannels "n" per subchannel group 508 is one, and the number of OFDM symbols "m" per symbol group 506 is either two (for FUSC and PUSC) or three (for the AMC). These values for "m" and "n" may also vary in dependence on whether a given subframe is for the UL or the DL. Generally, a symbol group 506 may have any number of OFDM symbols, and a subchannel group 508 may have any number of subchannels, depending on the context.

Example General Implementations

Figure 6:
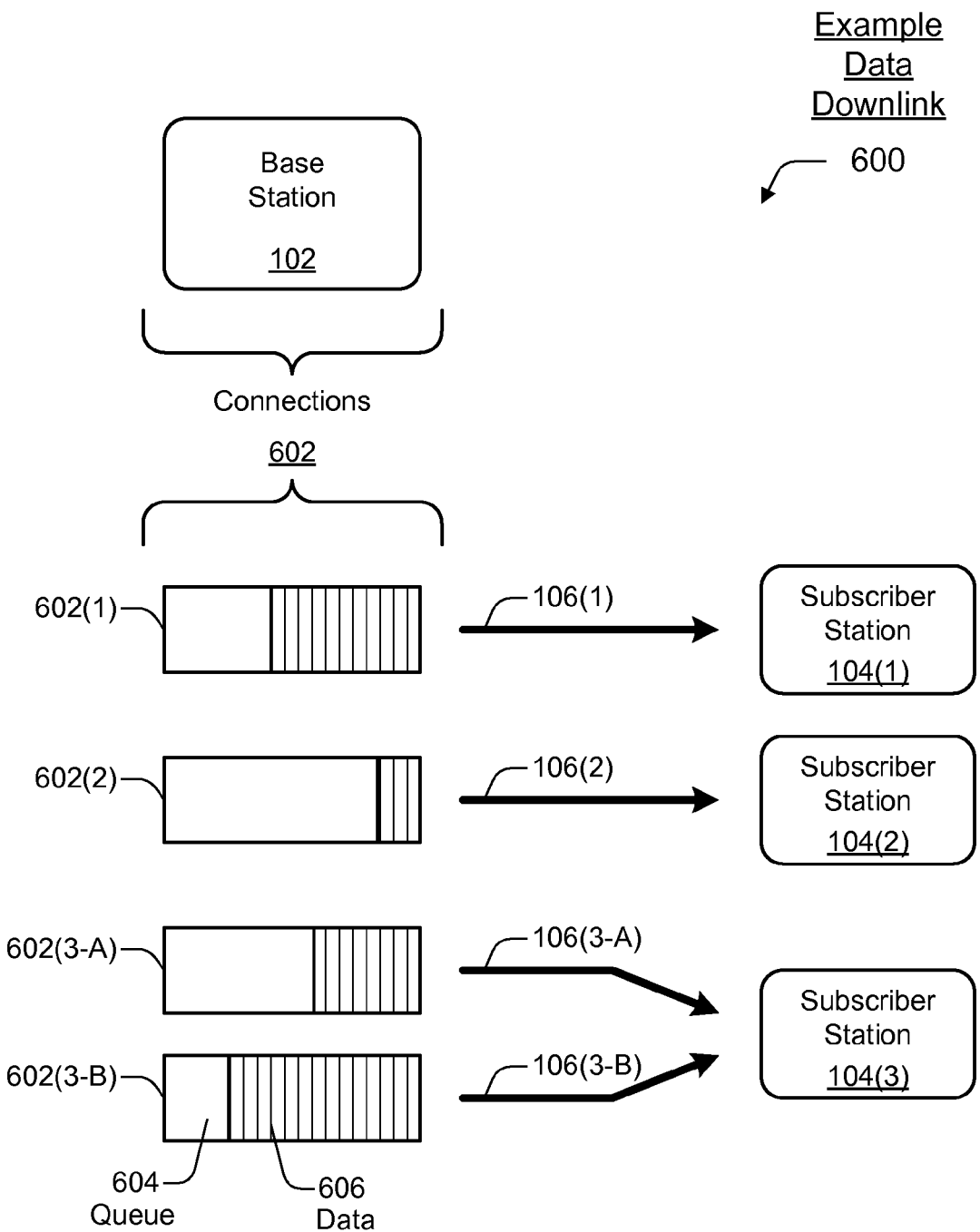
FIG. 6 is a block diagram of an example data downlink portion of a wireless communication from a base station to multiple subscriber stations.

FIG. 6 is a block diagram of an example data downlink portion 600 of a wireless communication from a base station 102 to multiple subscriber stations 104. Base station 102 is engaged in respective communications 106(1,2,3) with respective subscriber stations 104(1,2,3). Subscriber station 104(3) is engaged in two communications 106(3-A) and 106(3-B). Although shown with three subscriber stations 104 and one-to-two communications 106 per subscriber station 104, there may be more or fewer than three subscriber stations 104 overall and more than two communications 106 with any given single subscriber station 104.

Each communication 106 corresponds to a connection 602 that is maintained at base station 102. Hence, there are four connections 602(1), 602(2), 602(3-A), and 602(3-B). Each connection 602 has a corresponding queue 604 that may include some amount or level of data 606. Each connection 602 may also be associated with a connection identifier (CID). Base station 102 is responsible for transmitting some amount of data 606 to subscriber stations 104 each DL subframe 404. The amount of transmitted data, which may be none for some subscriber stations in some subframes, may be dependent on the available bandwidth, on the channel quality, on the priority of the data and/or the subscriber station, on the existence of data, on obligations to deliver a certain amount of bandwidth, on some selected measure of fairness and/or efficiency, on some combination thereof, and so forth.

Figure 7:
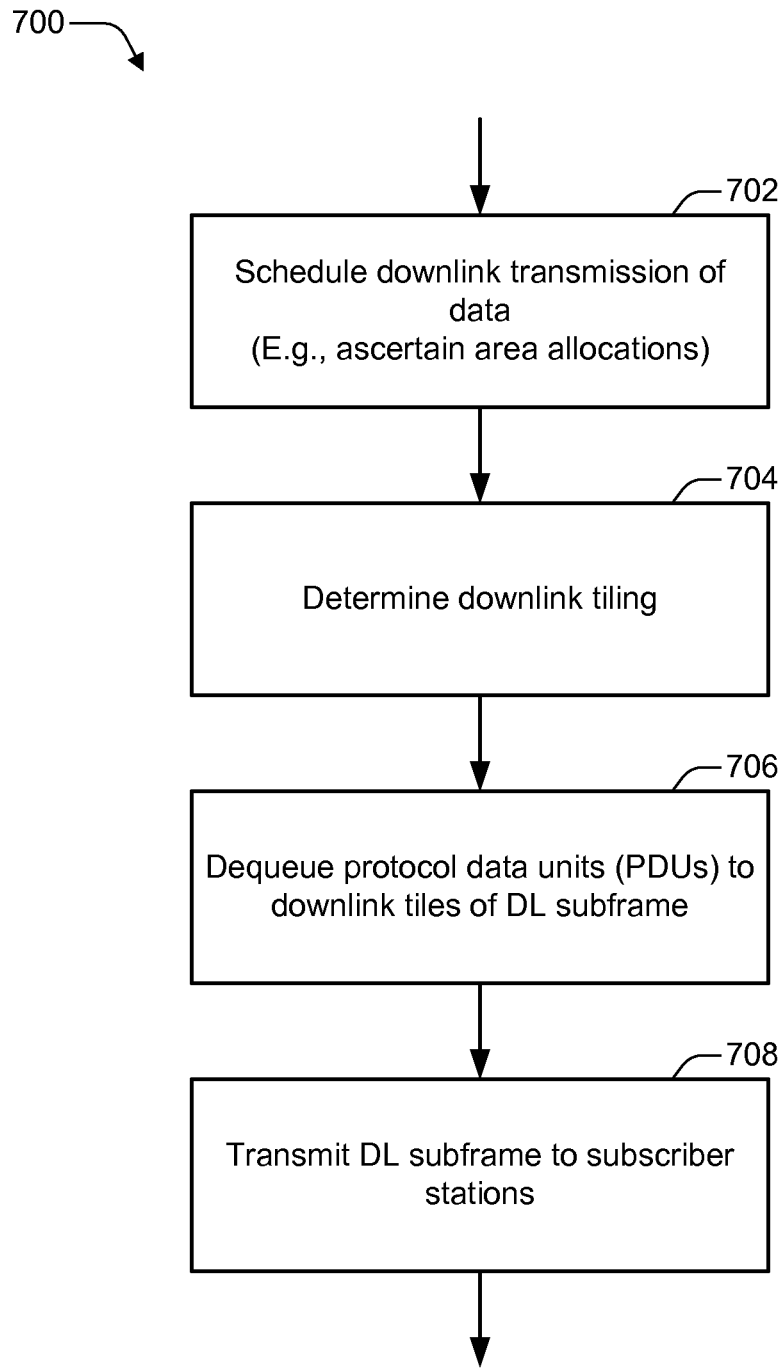
FIG. 7 is a flow diagram that illustrates an example method for a data downlink portion of a wireless communication.

FIG. 7 is a flow diagram 700 that illustrates an example method for a data downlink portion of a wireless communication. Flow diagram 700 includes four (4) blocks 702-708. Although the actions of flow diagram 700 may be performed in other environments and with a variety of hardware, firmware, and/or software combinations, the environments and components otherwise described herein and/or illustrated in the referenced figures are used to illuminate example implementations of the method. From the perspective of a base station 102, a data downlink portion for wireless communication can be divided into four major phases as represented by the four blocks 702-708.

At block 702, downlink transmission of data is scheduled. For example, which queues 604 are to have how much of their data 606 transmitted in the current DL subframe 404 may be ascertained. In other words, area allocations of DL subframe 404 for individual connections 602 may be ascertained. Additional descriptions of downlink data scheduling are provided herein below with particular reference to FIG. 8 generally and FIGS. 10-13 specifically.

At block 704, the downlink tiling is determined. For example, how the ascertained area allocations are to be fitted into the available bandwidth area of DL subframe 404 may be determined. Each tile may include multiple slots 510. More specifically, a tile is a group of contiguous slots 510 in either the DL or the UL. Within any single tile, slots 510 have the same coding and modulation attributes. Additional descriptions of downlink tiling are provided herein below with particular reference to FIG. 9 generally and FIGS. 14-19 (for distributive tiling) and FIGS. 20-31 (for striping tiling) specifically.

At block 706, protocol data units (PDUs) are dequeued to downlink tiles of the DL subframe. For example, PDUs of data 606 may be dequeued from queues 604 and applied to slots 510 of DL tiles in accordance with the determined DL tiling and the ascertained area allocations.

Generally, a layer X of the OSI protocol model receives service data units (SDUs) from layer X+1 (i.e., the layer above layer X). Layer X then sends PDUs to layer X−1 (i.e., the layer below layer X). With reference to the example system of FIG. 6, SDUs are queued by the system into a queue 604. The PDU is the (e.g., IEEE 802.16 MAC) data unit that is de-queued from queue 604. Each PDU may be a fragment of an SDU or may contain several SDUs packed together.

At block 708, the DL subframe is transmitted to subscriber stations. For example, a fully or partially filled DL subframe 404 may be transmitted from base station 102 to subscriber stations 104.

Figure 8:
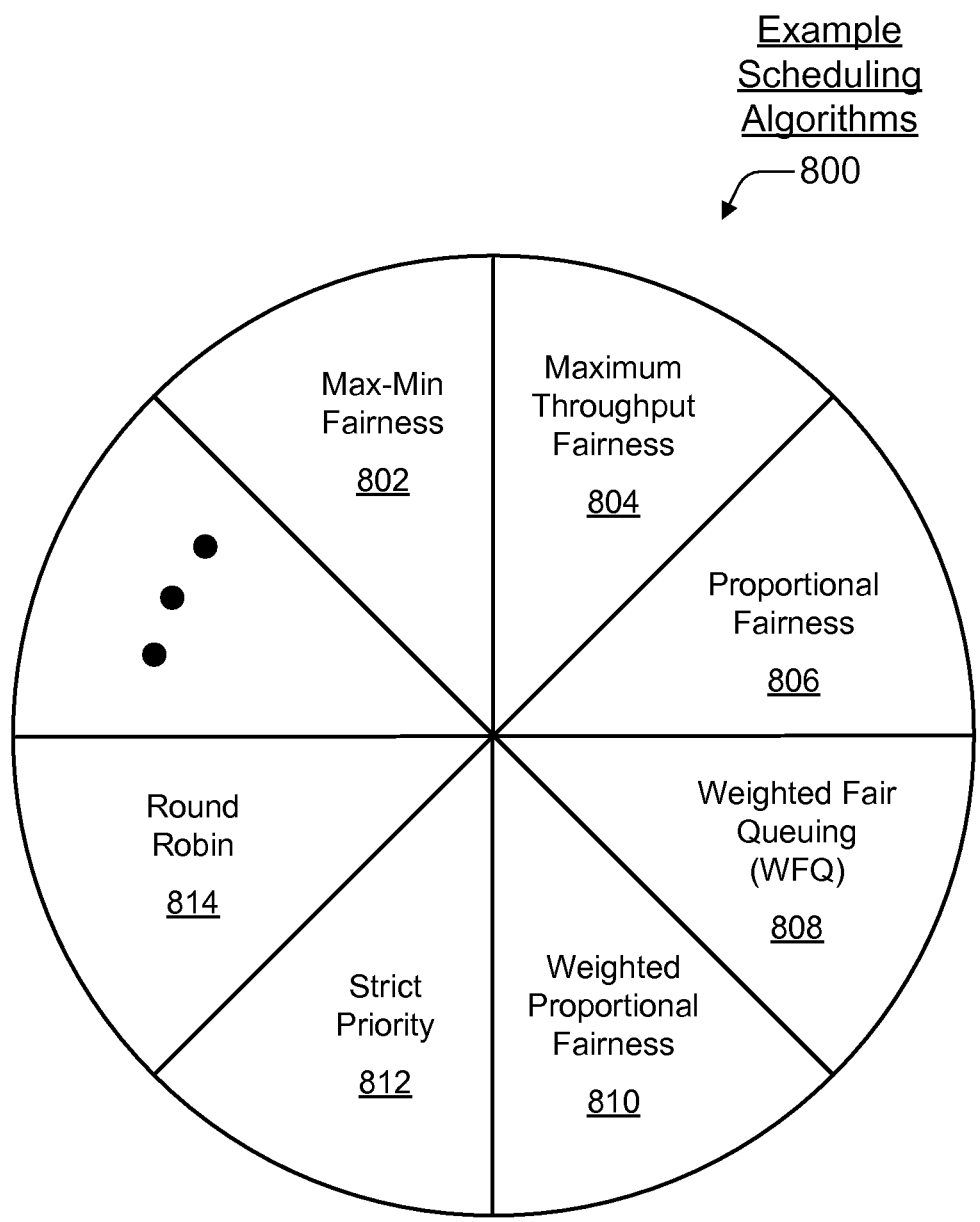
FIG. 8 is a circular diagram illustrating example algorithms for scheduling the downlink transmission of data.

FIG. 8 is a circular diagram 800 illustrating example algorithms for scheduling the downlink transmission of data. Diagram 800 includes multiple example scheduling algorithms: max-min fairness 802, maximum throughput fairness 804, proportional fairness 806, weighted fair queuing (WFQ) 808, weighted proportional fairness 810, strict priority 812, round robin 814, and so forth. As indicated by the ellipses (" . . . "), there are other scheduling algorithms that may be adopted in order to determine allocations.

Each scheduling algorithm produces as its output an allocation for each connection 602. This allocation is usually in terms of bytes. The allocation in bytes is then converted to a number of slots based on the coding and modulation of the connection. The number of slots may be termed an area allocation. Each connection 602 is thus ultimately scheduled an area allocation.

With regard to max-min fairness 802, the max-min notion of fairness is among the more popular notions. It is based on the following premises: (a) no entity should receive an allocation larger than its demand; and (b) increasing the allocation of any entity should not result in the decrease of the allocation of another entity that received an equal or smaller allocation. The name derives from the concept of maximum allocation with minimum impact.

With regard to maximum throughput fairness 804, the notion reflects a desire to be most fair by maximizing total throughput of the medium, which is typically a wireless medium. To maximize use of the wireless medium, bandwidth in the medium may be allocated to users with the highest current data rates. Unfortunately, the low data rate users can be starved with this approach. A max throughput scheduler can, however, achieve maximum channel throughput and utilization.

With regard to proportional fairness 806, it reflects a desire to find a compromise between max-min fairness and maximum throughput fairness. A proportional fairness policy attempts to achieve two goals simultaneously: (a) optimization of the throughput by taking into account the achievable data rate in each instance (which is dependent on the channel condition); and (b) maintenance of fairness by keeping track of the achieved historical data rate. In equation form, goal (a) is reflected in the numerator, and goal (b) is reflected in the denominator.

Proportional fairness 806 is relatively simple to implement. It involves the sorting of connections in ascending order of the proportional fairness (PF) ratio. The PF ratio of connection i is given by:

$$\text{PF\_Ratio}_i = \frac{r_i}{R_i},$$

where $r_i$ is the achievable data rate in frame n, and $R_i$ is the data rate the source has achieved so far. This historical data rate $R_i$ is typically implemented using a sliding window (e.g., a moving average) or an exponential average.

With regard to WFQ 808, it is a packet scheduling technique allowing guaranteed bandwidth services. A purpose of WFQ is to let several sessions share the same link. In WFQ 808, each session has a separate First In-First Out (FIFO) queue. At any given time, the N active sessions (e.g., the ones with non-empty queues) are serviced simultaneously (e.g., once per frame). WFQ 808 allows respective sessions to have different respective guaranteed bandwidths provided to each of them.

In a described implementation with regard to weighted proportional fairness 810, it may be considered a hybrid scheduling algorithm (i) that weights allocations based on demand and credits and (ii) that shares excess bandwidth proportionally. Hence, both a committed information rate (CIR) and an excess information rate (EIR) may be tracked and factored into the fairness scheduling decisions.

In a sense, weighted proportional fairness scheduling algorithm 810 may be characterized as being related to WFQ. It is like WFQ because it uses weights, potentially a different weight for each user, to allocate access to the medium. These weights may be calculated based on demand and credit. Credits may be calculated based on a Token Bucket Rate Algorithm (TBRA), for example.

There are two types of credit calculations: committed rate as represented by the CIR and excess rate as represented by the EIR. The CIR is allocated first. Usually, there is sufficient capacity to allocate the CIR to all users. This tends to be ensured by the admission control policy. However, there is a finite probability that the sum of the CIRs of all users is greater than the available channel resources. This condition is called over-subscription or overbooking. In over-subscription cases, the scheduler reduces the rate of each user proportionally to the level of over-subscription. For instance, if the over-subscription level is 10%, then all users (or at least all users of a given class level) experience a 10% reduction in allocated bandwidth in comparison to their CIR.

With weighted proportional fairness 810, the excess bandwidth is shared. The excess bandwidth is the leftover channel capacity after the demands for CIRs for all users have been satisfied. The excess bandwidth is shared proportionally to the respective EIR of each respective user. An implementation of weighted proportional fairness 810 is described further herein below in the third section that is entitled "example Implementations for Scheduling Algorithms".

With regard to strict priority 812, the highest priority queues are served first, and the lower priority queues are served after the higher priority queues have been fully satisfied. With regard to round robin 814, each queue is served once in turn.

Regardless of what scheduling algorithm is implemented, the output of a scheduling phase of a downlink portion of a wireless communication may be considered a bandwidth allocation. In terms of a DL subframe 404, each bandwidth allocation translates to a number of slots that have been allocated to a given connection, which equates to an area of a DL subframe that has been allocated. However, the dimensions of each area allocation and the location within DL subframe 404 have yet to be determined. The dimensions and locations of area allocations are determined in a tiling phase. The tiling phase of a downlink portion of a wireless communication is introduced below with reference to FIG. 9.

Figure 9:
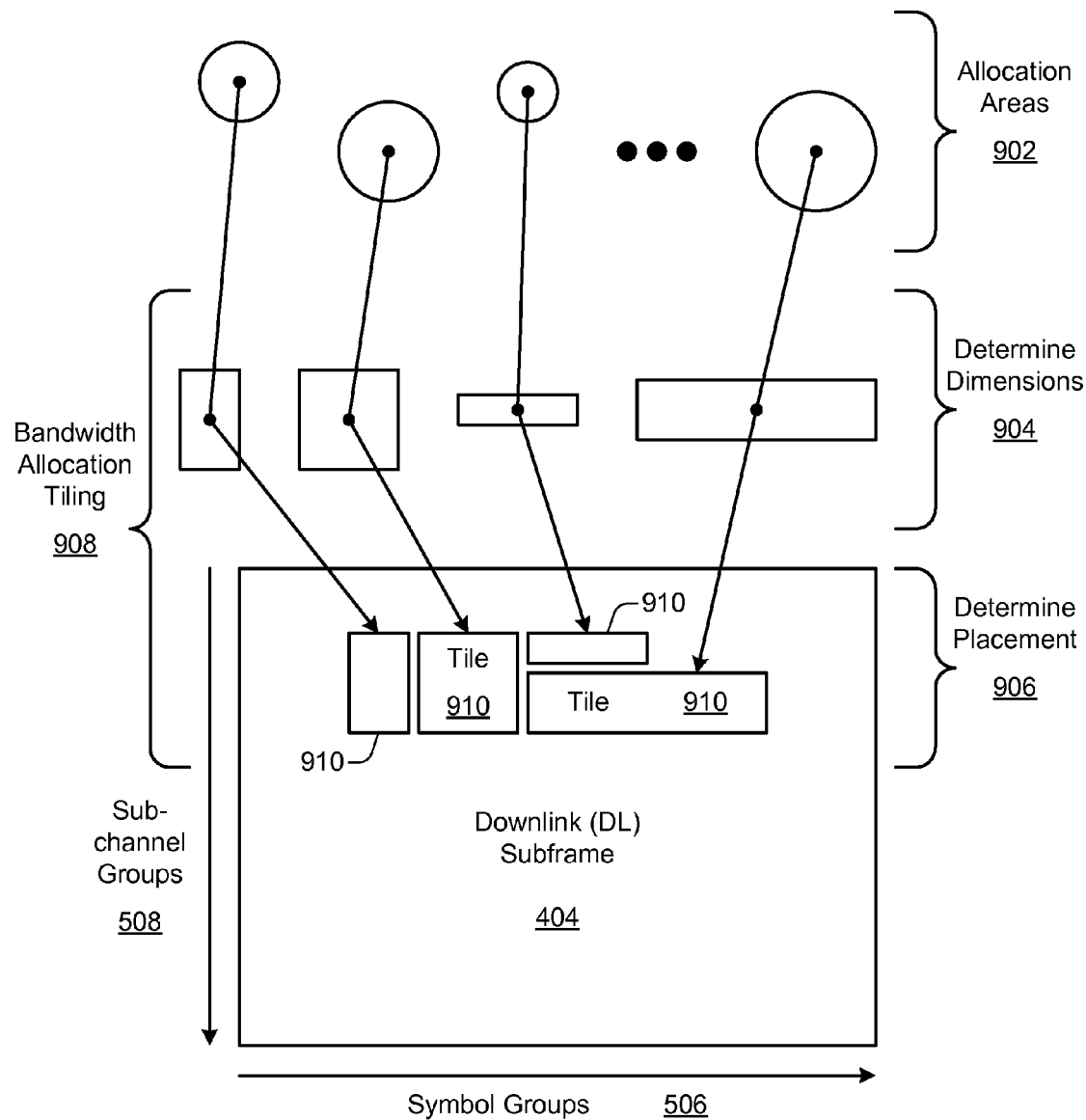
FIG. 9 is a block diagram illustrating an example downlink tiling procedure for scheduled downlink data allocations.

FIG. 9 is a block diagram illustrating an example downlink tiling procedure 900 for scheduled downlink data allocations 902. As illustrated, downlink tiling procedure 900 includes DL subframe 404 that comprises subchannel groups 508 in one dimension and symbol groups 506 in the other dimension. Data allocations 902 are applied to DL subframe 404 in order to implement the bandwidth allocation tiling 908. Although described in the context of a DL subframe 404, bandwidth allocation tiling 908 may also be implemented in the context of an UL subframe 408.

Data allocations 902 result from implementation of a scheduling algorithm, such as one of the scheduling algorithms described herein above with particular reference to FIG. 8. Hence, data allocations 902 may result from, for example, a weighted proportional fairness algorithm 810 as described further herein below with particular reference to FIGS. 10-13. Because data allocations 902 may be interpreted as areas that are to occupy part of DL subframe 404, they are also referred to as allocation areas 902. Because the bandwidth areas of allocation areas 902 are known, but their dimensions are flexible, allocation areas 902 are generically represented as circles in FIG. 9.

In order to tile allocation areas 902 in DL subframe 404, two determinations are effected: a dimension determination 904 and a placement determination 906. Although these two determinations are illustrated separately, they may be effected fully, partially, and/or substantially simultaneously. Jointly, dimension determination 904 and placement determination 906 comprise bandwidth allocation tiling 908.

With dimension determination 904, a height and width (or, more generally, a length and breadth) of each of allocation areas 902 is determined. This dimensioning is represented by the rectangles of determine dimensions 904. The area that is allocated by the selected scheduling algorithm is maintained as the dimensions are determined. With placement determination 906, the dimensioned allocations are placed within DL subframe 404 as tiles 910. With the dimensioning (904) and placement (906) of the allocated areas 902, the bandwidth allocations are tiled 910 into DL subframe 404 by bandwidth allocation tiling 908.

Bandwidth allocation tiling 908 is usually performed under one or more constraints. For example, there is a finite amount of time to make both the dimensioning and the placement determinations each frame. Also, the fewer the holes, or places of DL subframe 404 to which no data is tiled, the more efficient the utilization of the limited electromagnetic medium is generally considered to be. Other constraints can also impact or be used to tailor the bandwidth allocation tiling 908.

Example Implementations for Scheduling Algorithms

Figure 10:
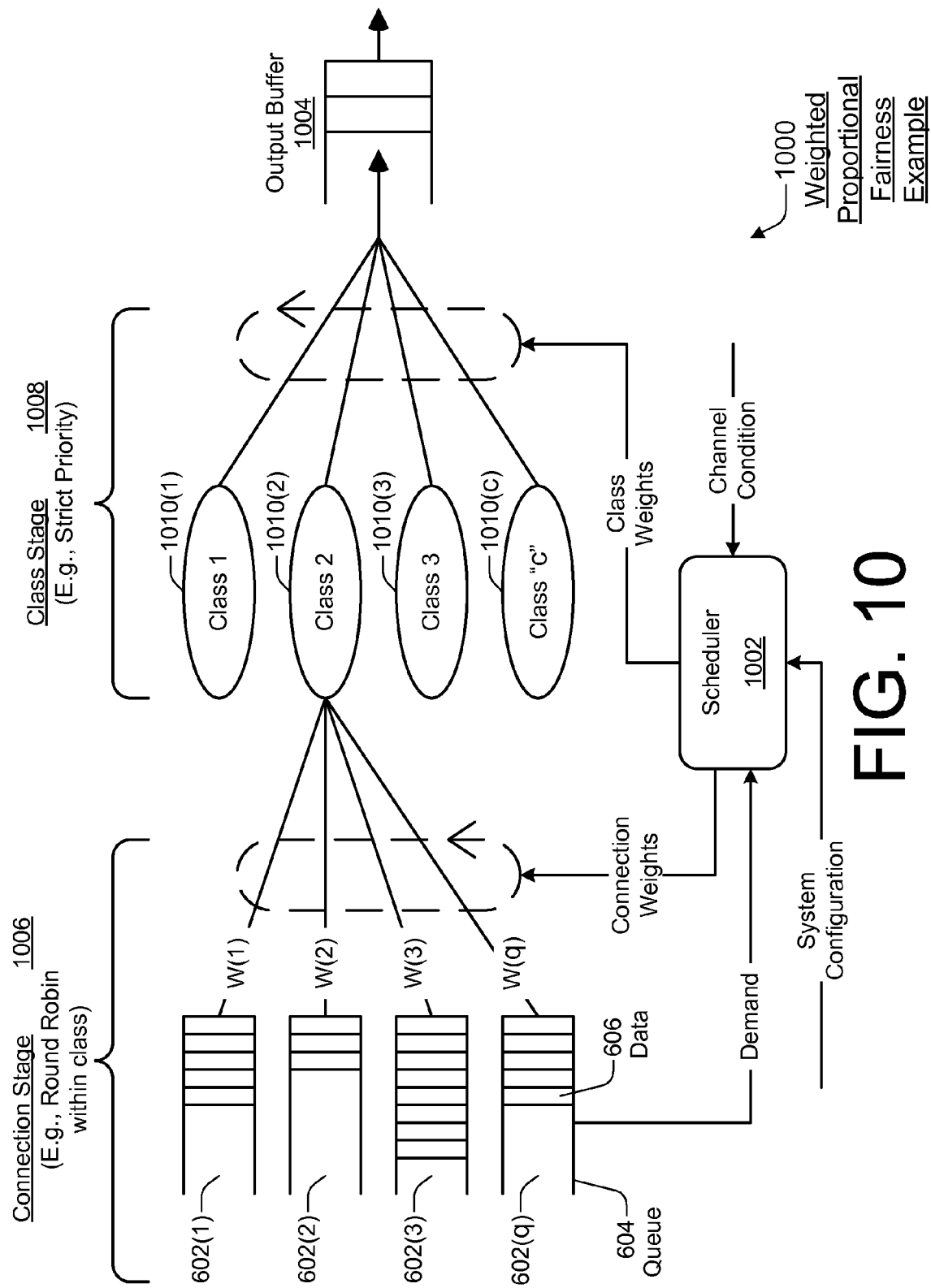
FIG. 10 is an example block diagram of a two-stage per-connection scheduling algorithm termed weighted proportional fairness.

FIG. 10 is a block diagram of a two-stage per-connection scheduling scheme 1000. Scheduling scheme 1000 may be used to implement a weighted proportional fairness scheduling algorithm. As illustrated, scheduling scheme 1000 includes a scheduler 1002, an output buffer 1004, a connection stage 1006, and a class stage 1008. Scheduler 1002 receives three inputs: system configuration, demands, and channel conditions. Scheduler 1002 provides two outputs: connection weights and class weights.

Connection stage 1006 pertains to scheduling for different connections 602. Class stage 1008 pertains to scheduling for different classes 1010. A class 1010 is a set of connections 602 that have a common priority level. Example priority levels include, by way of example but not limitation, real-time (RT), non-real-time (NRT), best effort (BE), and so forth.

Connection stage 1006 includes "q" connections 602(1, 2, 3 . . . q), with "q" being some integer. Each connection 602 has a corresponding queue 604 and amount of data 606. Each connection 602 also has a corresponding demand that is related to the amount of data 606. Respective connections 602(1, 2, 3 . . . q) are associated with respective weights W(1, 2, 3 . . . q). In a described implementation, connection stage 1006 is handled using a round robin scheduling within each class. However, other scheduling algorithms can alternatively be implemented for connection stage 1006.

Class stage 1008 includes "c" classes 1010(1, 2, 3 . . . c), with "c" being some integer. Although only the "q" connections 602 of class 1010(2) are explicitly illustrated, each respective class 1010 has its own respective set of connections 602 at that respective class level. Scheduler 1002 provides the class weights for class stage 1008. In a described implementation, the classes are served in strict priority. In other words, the connections 602 of the first class 1010(1) are served prior to any of the connections 602 of the second class 1010(2) being served.

In flow based queuing, each connection or flow is mapped to a dedicated buffer (a.k.a., per flow queuing). Consequently, each flow within a class can have its own forwarding priority relative to other flows within the same class. Per flow queuing allows for better isolation of buffer resources. Flow based queuing can be implemented using hierarchical queuing added to class based queuing, as illustrated in FIG. 10.

The per-flow-based queuing is thus a super set of the class based queuing in which only "q" queues are instantiated and the flows belonging to the same class are mapped to the same buffer. An advantage of implementing a hierarchical queue engine is that different queuing algorithms can be used both within the class and between classes. For example, with hierarchical queuing, the per-flow stage of class 3 may use WFQ while the per-flow stage of class 1 may use round robin.

In an example implementation of the weighted proportional fairness scheduling algorithm as described herein, scheduler 1002 uses a hierarchical queue structure with a per class stage 1008 and "c" per flow connection stages 1006. Class stage 1008 is a logical stage and, depending on the implementation, may not need to store any packets.

In a described implementation, the weighted proportional fairness queuing algorithm as described herein is a bounded algorithm that scales at 2n order in which n is the number of active connections across each of the classes. It can thus be termed a two-pass algorithm because the algorithm uses two consecutive loops to calculate the fair share of the available bandwidth to be given to each active connection.

In order to bound the algorithm to two passes, the demand and credit of each flow is taken into account. The demand is the current queue depth (or amount of data 606) of each flow in the downlink direction or the number of bytes queued by a subscriber station (e.g., the bandwidth requests) at the base station in the uplink direction.

The first pass is used to credit the Committed Information Rate (CIR) of each connection. In the second pass, the excess bandwidth is shared in accordance with the accumulated credits and demand of each connection. These first and second passes are described relatively qualitatively herein below with particular reference to FIGS. 12 and 13, respectively. Thereafter, the two passes are described relatively quantitatively.

The allocation of the CIR and the Excess Information Rate (EIR) takes into account the modulation and coding scheme for each subscriber and the fact that the modulation and coding scheme changes over time. In a described implementation, the modulation and coding scheme is indexed by the rate ID. The rate ID reflects the communication data rate between the base station and a given subscriber station. The rate ID generally reflects the current channel quality. It also represents the efficiency or channel bandwidth utilization by the given subscriber station. Hence, subscriber stations with lower rate IDs may receive a smaller portion of the available bandwidth than subscriber stations with higher, and thus more efficient, rate IDs. This is especially valid when proportional fairness or maximum channel throughput (e.g., overall channel utilization efficiency) is desired.

Figure 11:
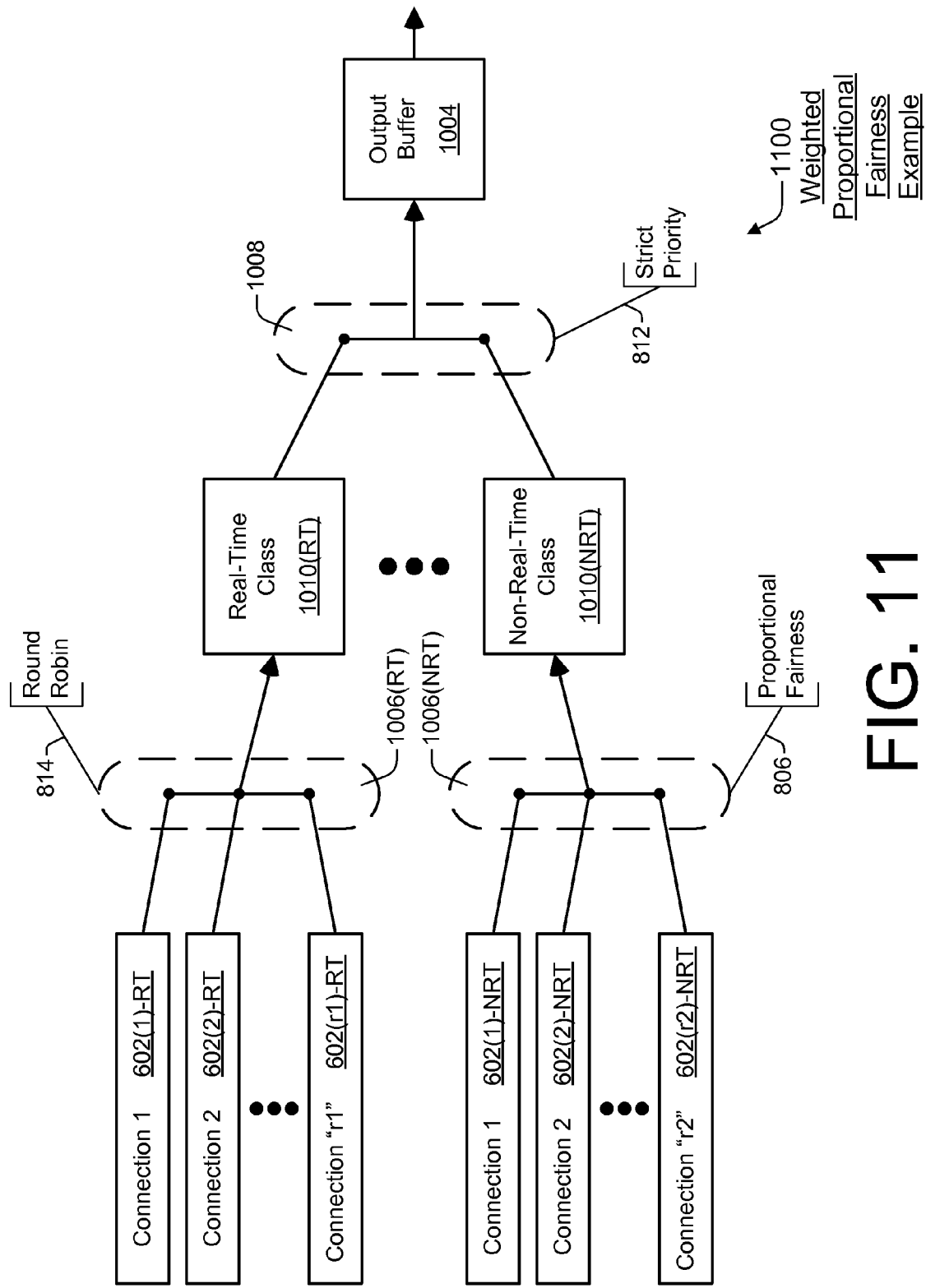
FIG. 11 is another example block diagram of the two-stage per-connection scheduling algorithm termed weighted proportional fairness.

FIG. 11 is another example block diagram of a hierarchical scheduling scheme 1100 that is termed weighted proportional fairness. Hierarchical scheduling scheme 1100 is an example implementation of two-stage per-connection scheduling scheme 1000 (of FIG. 10) in which the number "c" of classes 1010 is two. These two classes are: real-time class 1010(RT) and a non-real-time class 1010(NRT). By way of example only, the traffic for real-time class 1010(RT) may include voice over internet protocol (VoIP) communications, and the traffic for non-real-time class 1010(NRT) may include FTP and HTTP communications. Also by way of example only, the scheduling algorithm for class stage 1008 is a strict priority scheduling algorithm 812.

Real-time class 1010(RT) includes "r1" connections 602, with "r1" being some integer. These r1 connections are connection 1 602(1)-RT, connection 2 602(2)-RT . . . connection "r1" 602(r1)-RT. By way of example only, the scheduling algorithm for connection stage 1006(RT) is a round robin scheduling algorithm 814.

Non-real-time class 1010(NRT) includes "r2" connections 602, with "r2" being some integer. These r2 connections are connection 1 602(1)-NRT, connection 2 602(2)-NRT . . . connection "r2" 602(r2)-NRT. By way of example only, the scheduling algorithm for connection stage 1006(NRT) is a proportional fairness scheduling algorithm 806.

A max-min fairness algorithm 802 may be realized using equations S1-S13 below. The CIR for each connection is calculated first and then the remaining channel capacity, if any, is shared with each connection in accordance with the EIR of the connection. However, the max-min fairness algorithm does not take into account the channel quality; instead, it results in a relatively precise fairness regardless of the channel conditions experienced by individual users.

In contrast, a proportional fairness algorithm 806 tends to favor users with higher channel conditions. Fairness is dependent on the relatively high probability that users, over time, will experience a similar overall channel condition. Unfortunately, it is possible that two stationary users can experience a different channel quality—a first user experiences a generally good quality channel because the wireless device is closer to the base station, while a second user is located in an area where there is poor signal coverage. In this case, the first user will generally get a higher throughout compared to the second user.

Another potential problem with proportional fairness is that for some services it is important to allocate the user the throughput required by an application without delay (e.g., voice applications). Consequently, a hybrid approach that employs both max-min fairness and proportional fairness is adopted for a described implementation. Connections with strict delay and jitter performance requirements (so-called real-time connections) are served with strict priority. Any leftover capacity after the real-time connections have been serviced is shared using proportional fairness.

A number of terms and parameters are used generally below in the qualitative description of FIGS. 12 and 13. They are used somewhat more rigorously in the mathematical quantitative description that follows the description of FIG. 13. Example explanations of the terms and parameters follow:

1. Demand is a number of bytes in the queue for connection i in frame n.
2. CIR is the committed bandwidth that is allocated to a connection in frame n.
3. EIR is the excess bandwidth, over and above the CIR allocation, that is allocated to a connection in frame n. EIR=PIR−CIR, where PIR is the Peak Information Rate. In contrast to a technological concept and term, the PIR is more of a marketing concept and term. In the absence of a technological requirement, it limits the total bandwidth that a connection or subscriber station may be allocated. This PIR limitation concept may be incorporated and imposed to enforce tiered pricing and/or to avoid the appearance of system degradation as the early-adopter period transitions to a more standard utilization period.
4. CIR_MAX is the maximum number of CIR bytes a connection is allowed to transmit in frame n.
5. EIR_MAX is the maximum number of EIR bytes a connection is allowed to transmit in frame n.
6. CIR-token is the number of tokens in the CIR bucket.
7. EIR-token is the number of tokens in the EIR bucket.
8. $MBS_{CIR}$ is the maximum number of tokens that can be placed in the CIR bucket.
9. $MBS_{EIR}$ is the maximum number of tokens that can be placed in the EIR bucket.
10. Allocation is a contiguous region of slots. The slots within any single allocation have the same modulation and coding scheme (e.g., rate ID).
11. Rate ID is typically defined by the particular wireless standard under which a system is operating. The Rate ID may be expressed in, for example, bytes per slot. It may be affected by, for instance, the rate type, the bits/QAM, the coding rate, and so forth.
12. Channel capacity is the current spare capacity, in slots, of the DL or the UL.

Figure 12:
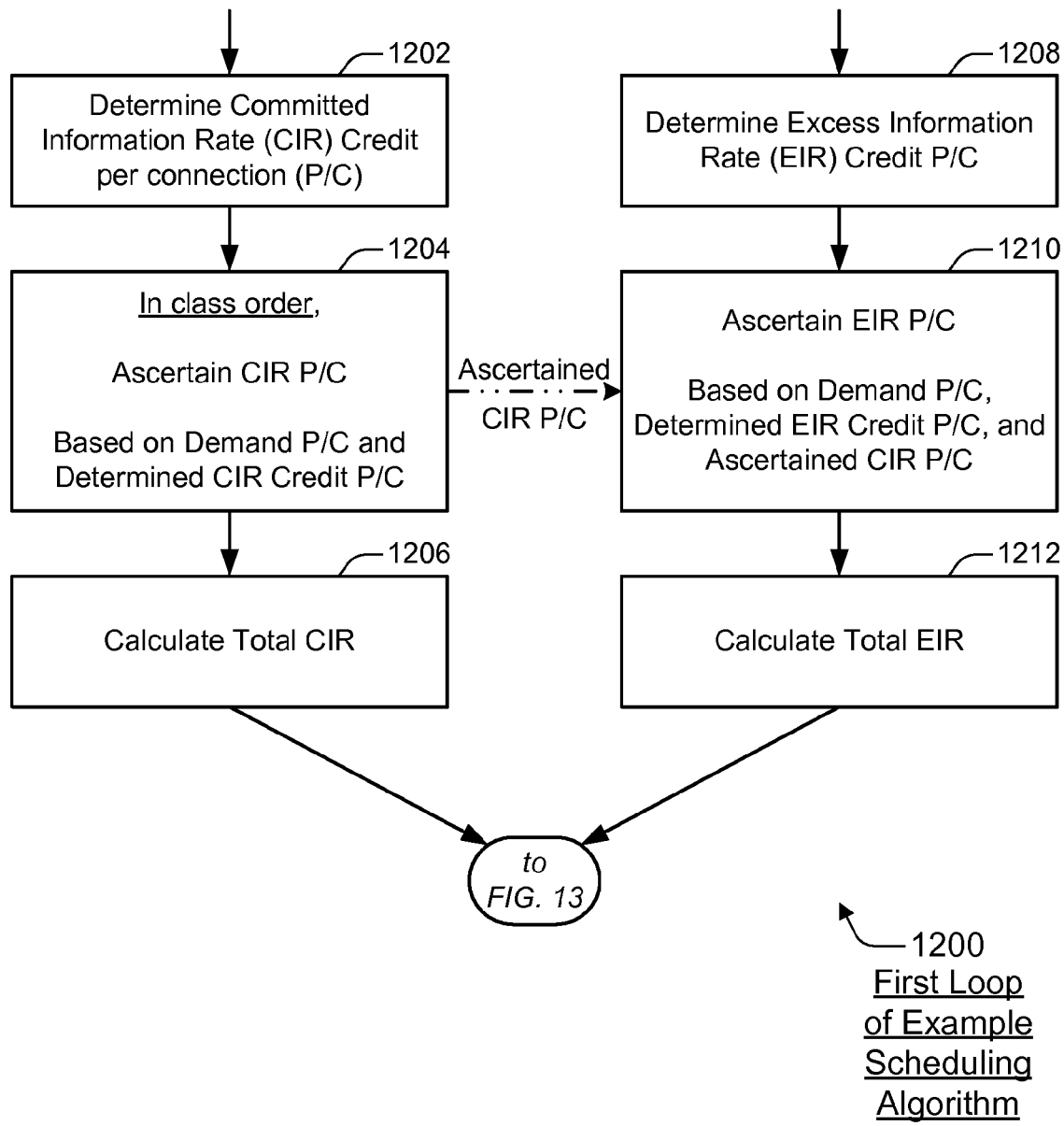
FIG. 12 is a flow diagram that illustrates an example method for a first loop of a two-loop scheduling algorithm.

FIG. 12 is a flow diagram 1200 that illustrates an example method for a first loop of a two-loop scheduling algorithm that implements weighted proportional fairness. Flow diagram 1200 includes six (6) blocks 1202-1212. Although the actions of flow diagram 1200 may be performed in other environments and with a variety of hardware, firmware, and/or software combinations, the environments and components otherwise described herein and/or illustrated in the referenced figures are used to illuminate example implementations of the method.

At block 1202, a CIR credit per connection is determined. At block 1208, an EIR credit per connection is determined. These credits may be determined using, for example, a token bucket rate algorithm (TBRA) that is executed once every given time period (e.g., each frame) or that is calculated when relevant using a bucket filling rate. The credit determinations may also be performed outside of the first and second loops of the example scheduling algorithm. The EIR and CIR credits may be limited by maximum allowed credit levels.

At block 1204, the CIR per connection is ascertained based on the demand per connection and the determined CIR credit per connection. For example, the CIR per connection may be ascertained responsive to a minimum between the demand per connection and the determined CIR credit per connection. The CIR per connection may be ascertained in class order because the CIR allocation is granted in class order during the second loop. The demand per connection may be derived from the amount of data 606 in each queue 604 corresponding to each connection 602.

At block 1206, the total CIR is calculated. For example, the total CIR may be calculated by summing the individual ascertained CIRs per connection.

The ascertained CIRs per connection, as ascertained at block 1204, are provided to the EIR analysis for use at block 1210. At block 1210, the EIR per connection is ascertained based on the demand per connection, the determined EIR credit per connection, and the ascertained CIR per connection. For example, the EIR per connection may be ascertained responsive to a minimum between (i) a difference between the demand per connection and the ascertained CIR per connection and (ii) the determined EIR credit per connection.

At block 1212, the total EIR is calculated. For example, the total EIR may be calculated by summing the individual ascertained EIRs per connection. After the total CIR and the total EIR have been calculated (at blocks 1206 and 1212, respectively), the algorithm continues with the second loop at FIG. 13.

Figure 13:
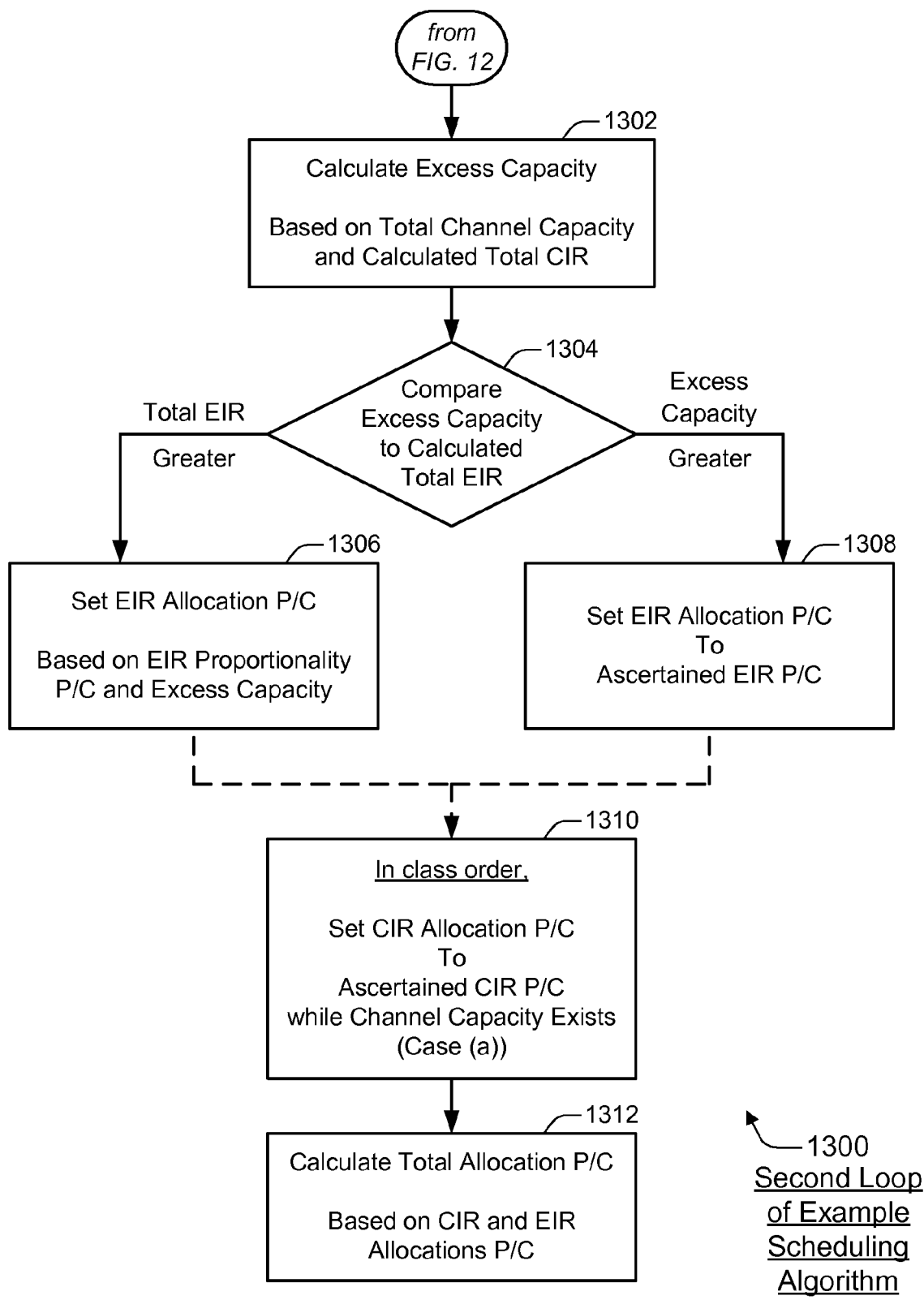
FIG. 13 is a flow diagram that illustrates an example method for a second loop of a two-loop scheduling algorithm.

FIG. 13 is a flow diagram 1300 that illustrates an example method for a second loop of a two-loop scheduling algorithm that implements weighted proportional fairness. Flow diagram 1300 includes six (6) blocks 1302-1312. Although the actions of flow diagram 1300 may be performed in other environments and with a variety of hardware, firmware, and/or software combinations, the environments and components otherwise described herein and/or illustrated in the referenced figures are used to illuminate example implementations of the method.

At block 1302, excess capacity is calculated based on total channel capacity and the calculated total CIR. For example, excess capacity may be calculated responsive to a difference between total channel capacity and the calculated total CIR (from block 1206).

At block 1304, the excess capacity is compared to the calculated total EIR. For example, it may be determined if the excess capacity is less than the calculated total EIR (from block 1212). If so, then the method of flow diagram 1300 continues at block 1306. If, on the other hand, the excess capacity is determined to be greater than the calculated total EIR, then the method continues at block 1308.

At block 1306, when the total EIR is greater than the excess capacity, the EIR allocation per connection is set based on an EIR proportionality per connection and the excess capacity. For example, the EIR allocation per connection may be established responsive to a connection's EIR as a proportion of the calculated total EIR and to the excess capacity (as calculated at block 1302).

At block 1308, when the excess capacity is greater than the total EIR, the EIR allocation per connection is set responsive to the ascertained EIR per connection. In these situations, each connection effectively receives its full demand, at least up to any instituted PIR. First, the CIR is fully satisfied for each connection in class order. Second, the remaining EIR per connection can also be fully satisfied for each connection because the calculated excess capacity exceeds the total EIR.

The CIR allocations are also "officially" assigned in the second loop. As noted herein below, the actions of the illustrated flow diagrams may be altered in a number of manners. For example, the order may be rearranged. Thus, although shown as occurring after the action(s) of block 1306 or 1308, the action(s) of block 1310 may actually be performed earlier, including during the first loop of FIG. 12.

At block 1310, the CIR allocation per connection is set responsive to the ascertained CIR per connection while channel capacity remains. To ensure that the class order is enforced, the CIR allocations per connection are assigned in class order. Hence, the CIR allocations per connection for class #1 1010(1) are assigned prior to assigning any CIR allocations for the connections of class #2 1010(2). The action(s) of block 1310 conform to case (a) of two described cases (a) and (b). These two cases are described further herein below after the description of FIG. 13 in the quantitative description of the second loop.

At block 1312, the total allocation per connection is calculated based on the CIR allocation per connection and the EIR allocation per connection. For example, the total allocation per connection may be calculated responsive to a sum of the CIR allocation per connection (from block 1310) and the EIR allocation per connection (from block 1306 or 1308).

For a described implementation, the following provides a relatively rigorous, more quantitative description of the weighted proportional fairness example scheduling algorithm presented herein. First, the credits are calculated. The credit for each connection or flow is calculated based on its traffic descriptors. Credit is determined using the TBRA, but other credit determining algorithms may alternatively be implemented. The token determinations assume the use of separate buckets for the CIR and the EIR. The credits are bounded by respective maximum bucket sizes for the CIR and EIR.

The credit is determined upon a packet arrival event. However, credit determination can also be performed at a fixed time interval (e.g., at the TDD frame), but performing this operation upon packet arrivals provides an optimization because there can be long time periods, much longer than the TDD frame duration, between consecutive packet arrivals in the packet arrival pattern.

Upon packet arrival for connection identifier$_i$ (CID$_i$), the following token credit determinations are performed with equations S1 and S2:

$$CIR\_token_i = MIN(MBS_{CIR_i}, CIR\_token_i + R_{CIR_i} \times \Delta t),$$
and (Eqn S1)

$$EIR\_token_i = MIN(MBS_{EIR_i}, CIR\_token_i + R_{EIR_i} \times \Delta t),$$ (Eqn S2)

where $R_{CIR}$ and $R_{EIR}$ are CIR and EIR rates in bits/s and $\Delta t$ is the time between packet arrival for CIR$_i$. CIR_token and EIR_token are the accumulated CIR and EIR credits, respectively, for each connection. In this example, the units are in bytes, but they may be maintained in other units. MBS is the Maximum Burst Size or maximum size to which the credit totals can reach. If equations S1 and S2 are performed at a fixed interval (e.g., at frame times), then $R_{EIR} \times \Delta t =$ CIR_refreshrate. The analysis is similar for EIR.

The fairness allocation portion of the weighted proportional fairness algorithm is performed in two loops. Thus, the algorithm for the fairness allocation loops through the set of active connections twice. The first loop allocates the CIR for each connection based on the CIR traffic attribute or class. The second loop allocates the excess bandwidth for each connection based on the EIR traffic attribute. As noted above, the algorithm thus scales on the order of 2N, where N is the number of active connections.

In a described implementation, the following actions and calculations are performed in the first loop pass: The CIR for each connection is ascertained. All classes and all connections within a class are looped through to determine the CIR. The loop is exited when the channel has been fully allocated. In addition, the EIR for each connection is ascertained, and it is accumulated for the total EIR. This total EIR is used in the second loop.

It should be noted that for the purpose of a channel capacity calculation, credit and demand parameters, which are typically maintained in bytes or bits/second, are converted to slots. This is accomplished using the modulation and coding scheme (e.g., rate ID) of each connection at frame N. The timing of the conversion is flexible as long as parameters in different units are not mixed.

The CIR and EIR per connection are ascertained with equations S3 and S4:

$$CIR_i = MIN(CIR\_MAX_i, Demand_i, CIR\_token_i * CIR_{TF}),$$
and (Eqn S3)

$$EIR_i = MIN(Demand_i - CIR_i, EIR\_token_i * EIR_{TF}),$$ (Eqn S4)

in accordance with the following Notes A, B, and C:
- (Note A)—CIR$_i$ and EIR$_i$ are the desired CIR and EIR allocations, respectively, for connection i in frame N.
- (Note B)—For the EIR calculation, the desired CIR allocation is subtracted so that it is not doubly counted.
- (Note C)—CIR$_{TF}$ and EIR$_{TF}$ are the transfer functions for CIR and EIR, respectively. These transfer functions represent the temporal behavior of a channel as it should be applied to bandwidth allocation. The transfer function can be as simple as a unity function in which case changes in the channel throughput are not taken into account. Especially in this sense, the values CIR$_{TF}$ and EIR$_{TF}$ can be ignored in equations S3 and S4. On the other hand, it may favor (e.g., give a larger allocation to) connections with higher rate IDs.
- There is a separate transfer function for CIR and EIR. This concept can be extended to have different transfer functions for each class of service or even for each connection. A counter (e.g., that reflects time) can also be included in the transfer function to allow a larger allocation for connections that reach a latency threshold.

Equations S3 and S4 are repeated for each connection in each class. After the CIR and EIR for each connection has been ascertained, the total CIR and the total EIR are calculated using equations S5 and S6:

$$CIR_{total} = \sum_{i}^{n} CIR_i, \text{ and} \qquad \text{(Eqn S5)}$$

$$EIR_{total} = \sum_{i}^{n} EIR_i. \qquad \text{(Eqn S6)}$$

Two example approaches for handling CIR over booking are described as Cases (a) and (b): Case (a)—Cease connection allocations when the complete channel has been fully allocated and continue from the point of cessation in the next round when that class is again reached (each round starts with the class of highest priority). Case (b)—Proportionally decrease the allocation for each connection in the class that cannot be fully serviced at the CIR level to ensure that each connection gets a fair share of the channel. These approaches are implemented in the second loop in a manner similar to the EIR allocation.

In a described implementation, the following actions and calculations are performed in the second loop pass: First, the excess channel capacity is calculated with equation S7:

ExcessCapacity=ChannelCapacity-$CIR_{Total}$. (Eqn S7)

If (ExcessCapacity<=$EIR_{total}$), then equation S8 is used to calculate the EIR_Allocation per CID:

$$EIR\_Allocation_i = \frac{EIR_i}{EIR_{Total}} \times ExcessCapacity, \qquad \text{(Eqn S8)}$$

otherwise equation S9 is used to calculate the EIR_Allocation per CID:

EIR_Allocation$_i$=EIR$_i$. (Eqn S9)

The CIR_Allocation per CID is calculated in one of the following ways depending on the selected approach or case for handling CIR overbooking. These two approaches, Case (a) and Case (b), are described above.

For Case (a), CIR_Allocation per CID is established using equation S10:

CIR_Allocation$_i$=CIR$_i$ (Eqn S10)

For Case (b), CIR_Allocation per CID is established using equation S11 or equation S12. Specifically, if the CIR is overbooked (e.g., $CIR_{Total}$>ChannelCapacity), then equation S11 is used to set the CIR_Allocation per CID once the class whose total CIR cannot be fully satisfied starts to be allocated:

$$CIR\_Allocation_i = \frac{CIR_i}{CIR_{Total}} \times ChannelCapacity, \qquad \text{(Eqn S11)}$$

otherwise equation S12 is used to set the CIR_Allocation per CID when the CIR is not overbooked:

CIR_Allocation$_i$=CIR$_i$. (Eqn S12)

After the CIR_Allocation and the EIR_Allocation for a given CID are established, the total Allocation for the given CID may be calculated using equation S13:

Allocation$_i$=CIR_Allocation$_i$+EIR_Allocation$_i$. (Eqn S13)

After the two loops have been completed, the allocation for each connection (CID) is known. This weighted proportional fairness algorithm may be used for both the downlink and the uplink. The main difference between the DL and the UL procedure is in the definition of the demand. The demand in the DL is the length (e.g., in number of bytes) of data queued by the system for connection i. The demand in the UL, on the other hand, is the outstanding bandwidth requests accumulated by the system for connection i.

In short, the Allocation$_i$ of equation S13 provides the number of slots (e.g., prior to any rounding to slots boundaries) that is to be allocated to connection i in frame N to maintain fairness for and among the set of connections considered in the algorithm.

Example Implementations for Tiling Bandwidth Allocations

FIGS. 14-19 are primarily directed to distributive approaches for tiling bandwidth allocations onto DL subframes. FIGS. 20-31 are primarily directed to striping approaches for tiling bandwidth allocations onto DL subframes. FIGS. 32-35 are primarily directed to organizational approaches for bandwidth allocation tiling onto UL subframes.

Figure 14:
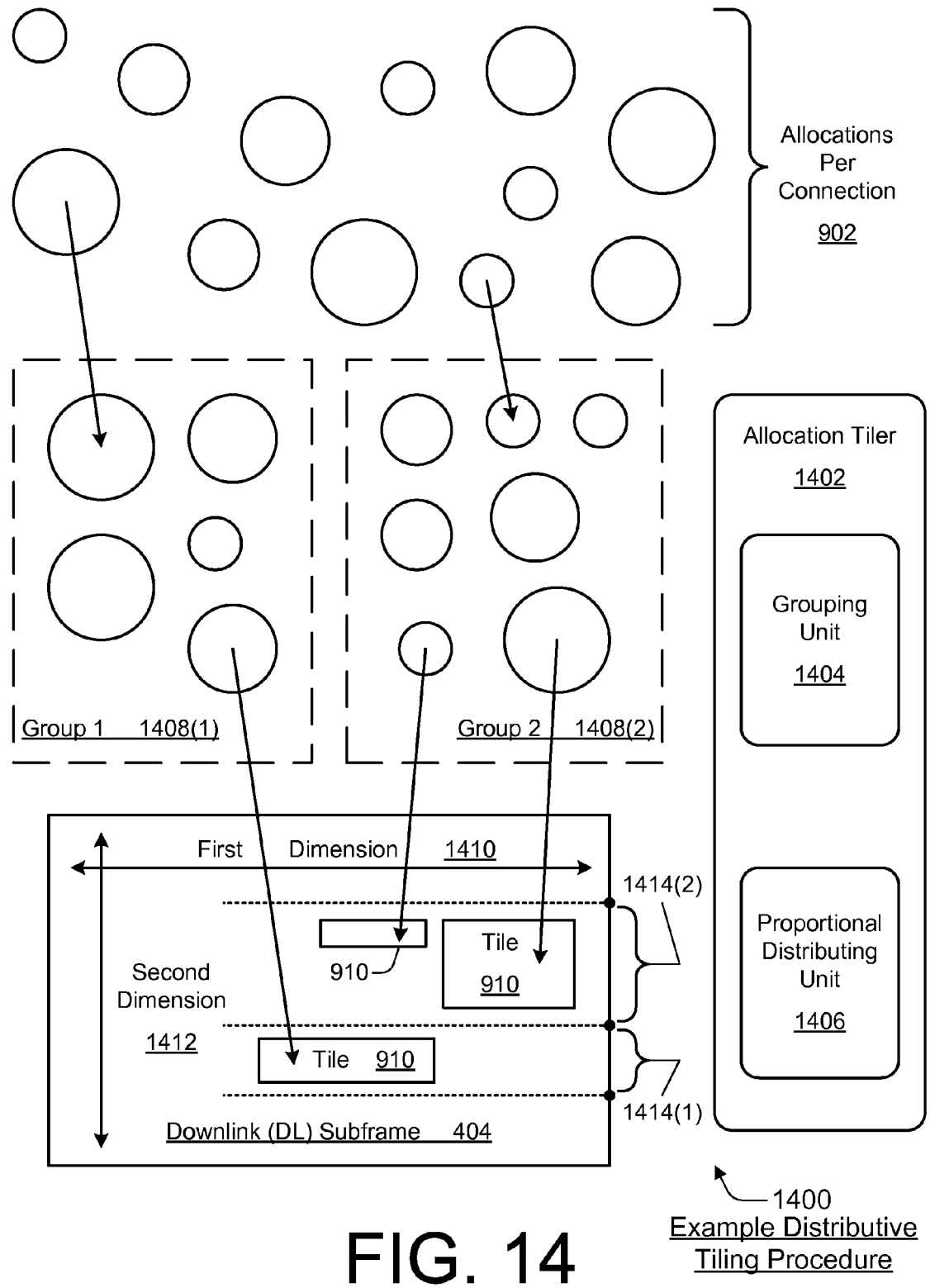
FIG. 14 is a block diagram illustrating an example allocation distributive tiling procedure.

FIG. 14 is a block diagram illustrating an example bandwidth allocation distributive tiling procedure 1400. As described more generally herein above (e.g., with particular reference to FIG. 9), bandwidth allocations per connection 902 are dimensioned and placed within a subframe by tiling procedure 1400. As illustrated, tiling procedure 1400 includes an allocation tiler 1402, two groups 1408(1) and 1408(2), and a DL subframe 404. Allocation tiler 1402 includes a grouping unit 1404 and a proportional distributing unit 1406.

In a described implementation, allocation tiler 1402 dimensions and places allocations per connection 902 into DL subframe 404. Allocations per connection 902 are produced by some scheduling algorithm and converted from bytes to slots, as appropriate. Example scheduling algorithms include, but are not limited to, those that are described herein above with particular reference to FIG. 8. Bandwidth allocations 902 represent an area in terms of a geometry that ultimately has a frequency dimension and a time dimension. The height and width (i.e., the dimensions) of an allocation may be flexible when it is initially determined by the scheduling algorithm. This dimensional flexibility is represented in FIG. 14 by the circular shape of bandwidth allocations 902. The dimensionality resulting from a tiling procedure is represented by the rectangular shape of tiles 910.

Tiling placement attempts to reduce, if not actually minimize or even eliminate, holes in DL subframe 404. Holes are areas of DL subframe 404 that do not have any bandwidth allocation associated therewith. Hence, holes are essentially wasted available bandwidth, and their existence in a DL subframe 404 can indicate a level of inefficiency in the tiling procedure.

More specifically for tiling procedure 1400, grouping unit 1404 groups allocations 902 in accordance with one or more criteria, such as channel condition preferences of each subscriber, modulation and coding rate, equalization of the allocation total for each group, and so forth. As shown, two groups 1408(1) and 1408(2) are created from allocations 902 by grouping unit 1404. As is described further herein below, grouping unit 1404 may also create subgroups (not explicitly diagramed in FIG. 14) within each group 1408. Although only two groups 1408 are shown in FIG. 14, grouping unit 1404 may create any number of groups 1408.

As illustrated, DL subframe 404 has a first dimension 1410 and a second dimension 1412. One dimension represents frequency (e.g., subchannel groups), and the other dimension represents time (e.g., symbol groups). In a described implementation, proportional distributing unit 1406 distributes allocations 902 proportionally onto DL subframe 404. In operation, proportional distributing unit 1406 first locks one dimension "A" of DL subframe 404 and proportionally distributes allocations 902 across the other dimension "B". Next, proportional distributing unit 1406 locks the other dimension "B" of DL subframe 404 and proportionally distributes allocations 902 across the dimension "A".

With specific reference to first dimension 1410 and second dimension 1412, proportional distributing unit 1406 initially locks first dimension 1410. To proportionally distribute allocations 902 along second dimension 1412, sub-bands 1414(1) and 1414(2) are created with each respective sub-band 1414($x$) corresponding to a respective group 1408($x$). Each sub-band 1414($x$) is of a size that is proportional to a ratio of the size of the allocations 902 of the corresponding group 1408($x$) and the total size of all allocations 902 of all groups 1408.

Next, proportional distributing unit 1406 locks second dimension 1412. To proportionally distribute allocations 902 along first dimension 1410, subgroups of allocations 902 within each given group 1408($x$) are proportionally distributed with regard to their individual subgroup areas in proportion to the total area of the corresponding sub-band 1414($x$) of the given group 1408($x$) to form tiles 910. These groups, subgroups, proportional distribution, etc. are described more fully herein below, including as part of a relatively-rigorous quantitative formulation.

Although a DL subframe 404 is illustrated in FIG. 14, described implementations of the distributive tiling procedure may also be applied to UL subframes 408. Additionally, it should be understood that distributive approaches to tiling bandwidth allocations are applicable to both TDD systems (e.g., using a TDD frame format 400A) and FDD systems (e.g., using an FDD frame format 400B).

Figure 15:
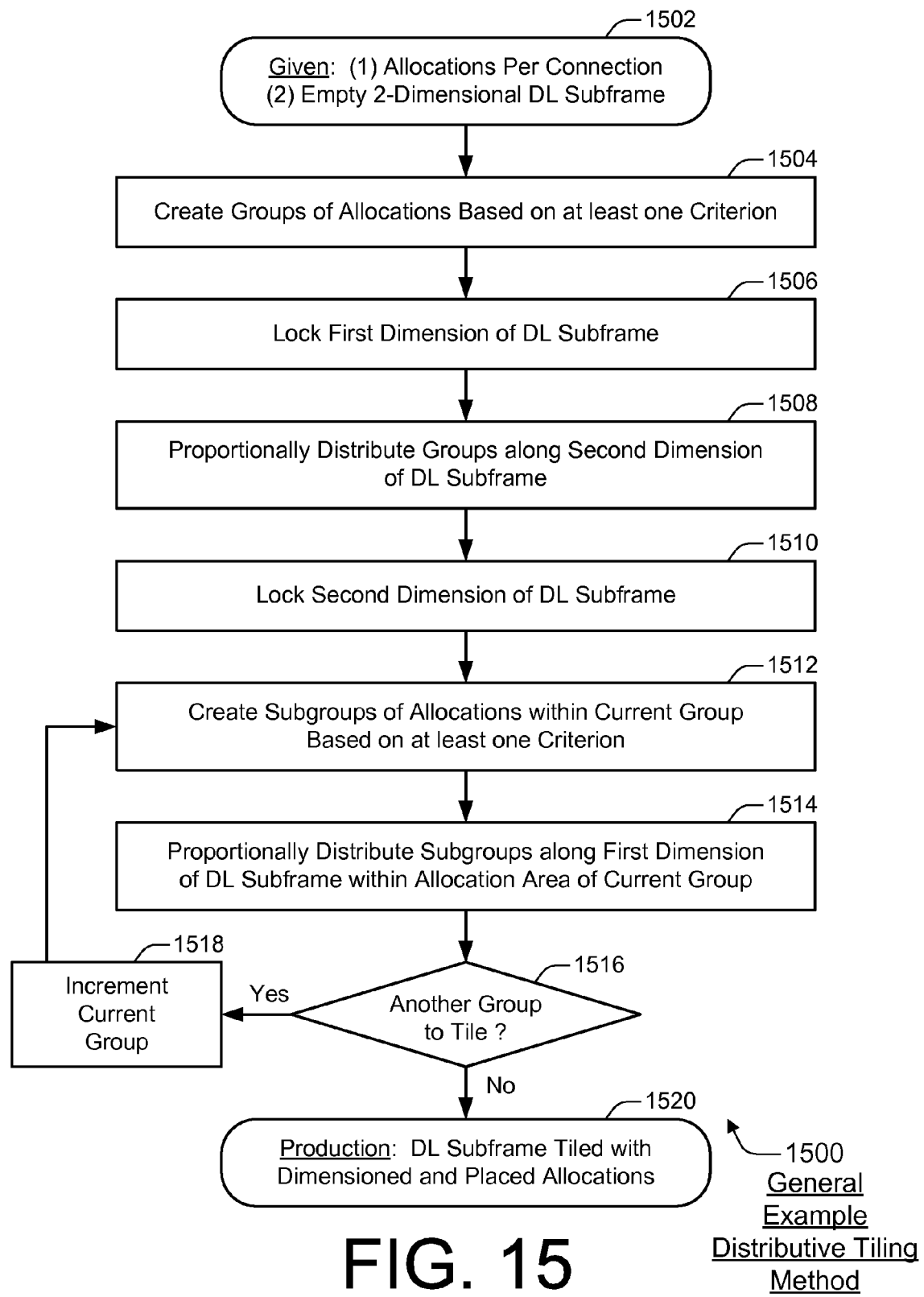
FIG. 15 is a flow diagram that illustrates an example general method for a distributive approach to tiling allocations.

FIG. 15 is a flow diagram 1500 that illustrates an example general method for a distributive approach to tiling bandwidth allocations. Flow diagram 1500 includes ten (10) blocks 1502-1520. Although the actions of flow diagram 1500 may be performed in other environments and with a variety of hardware, firmware, and/or software combinations, the environments and components otherwise described herein and/or illustrated in the referenced figures are used to illuminate example implementations of the method.

At block 1502, it is given that the tiling method is provided (1) with a number of bandwidth area allocations per connection and (2) an empty two-dimensional DL subframe (or UL subframe). For example, allocation tiler 1402 may be provided with allocations per connection 902 and an empty DL subframe 404.

At block 1504, groups of allocations are created based on at least one criterion. For example, allocation groups 1408 may be created from area allocations 902 by grouping unit 1404 based on at least one criterion.

At block 1506, a first dimension of the DL subframe is locked. For example, first dimension 1410 of DL subframe 404 may be locked by allocation tiler 1402.

At block 1508, groups are proportionally distributed along a second dimension of the DL subframe. For example, groups 1408 may be proportionally distributed along second dimension 1412 of DL subframe 404 by proportional distributing unit 1406. In other words, each group 1408($x$) is assigned a sub-band 1414($x$) whose proportion of DL subframe 404 is equivalent to a given group's percentage of the total size of all groups 1408.

At block 1510, a second dimension of the DL subframe is locked. For example, second dimension 1412 of DL subframe 404 may be locked by allocation tiler 1402.

At block 1512, subgroups of allocations within a current group are created based on at least one criterion. For example, grouping unit 1404 may create subgroups of allocations 902 within a given current group 1408. The criteria for creating groups and subgroups may be the same or different.

At block 1514, the subgroups are proportionally distributed along the first dimension of the DL subframe within a total allocation area of the current group. For example, the subgroups of a current group 1408($x$) may be proportionally distributed by proportional distributing unit 1406 along first dimension 1410 of DL subframe 404 within the sub-band 1414($x$) corresponding to the current group 1408($x$). In other words, each subgroup is assigned a portion of sub-band 1414($x$) that is proportional to the subgroup's size in relation to the total size of the given current group 1408($x$).

At block 1516, it is determined if there is another group to tile. If so, then the current group is incremented at block 1518 so that each group may have (i) subgroups created and (ii) its created subgroups proportionally distributed along the first dimension at blocks 1512 and 1514, respectively.

If, on the other hand, it is determined (at block 1516) that there is no other group to tile, then at block 1520 the tiling method produces a DL subframe (or UL subframe) that is tiled with dimensioned and placed allocations. For example, allocation tiler 1402 may produce a DL subframe 404 having dimensioned and placed allocations 902 that form tiles 910.

Either first dimension 1410 or second dimension 1412 may be frequency 504/subchannel groups 508. Similarly, either first dimension 1410 or second dimension 1412 may be time 502/symbol groups 506. Hence, either time or frequency may be locked first while allocations are first distributed along the other dimension.

A relatively-rigorous quantitative bandwidth allocation tiling scheme is described below. Bandwidth allocation tiling as described herein may be utilized in accordance with many different communication standards, including many different wireless communication standards. Nevertheless, and by way of example only, the quantitative description below comports with certain constraints imposed by an IEEE 802.16 standard. For example, an IEEE 802.16 standard imposes restrictions on how tiling can be performed in the DL. Relevant restrictions for the purpose of an example tiling implementation are: (1) tiled allocations are to have a rectangular dimension and (2) the PDUs within any single allocation are to have the same modulation and coding scheme (which may also be referred to as a modulation and coding rate pair). Notwithstanding these example restrictions, the example tiling scheme is presented below without loss of generality.

A goal of the following tiling scheme is to create a set of tiles that leave few if any holes in the DL subframe (or UL subframe) while simultaneously maintaining whatever fairness for the connections has been established. Another goal is to achieve superior tiling partitioning while utilizing reasonably low computational resources. These goals are addressed by certain described implementations with a tiling scheme that produces a tiled subframe in a relatively linear manner. It does not, in contrast to other possible approaches, rely on a hoped-for convergence from an unknown number of algorithmic iterations.

It should be noted, however, that there will likely be round-off, quantization, and other such errors that naturally intrude on the process. Moreover, random vagaries in allocation sizes, modulation and coding schemes, etc. can also impact the final result of a tiling scheme as described below. In other words, although described implementations of the tiling scheme are believed to offer exceptional results on average, actual real-world results, especially in individual situations, may fall short of the goals listed above for any number of reasons.

In IEEE 802.16, the TDD split setting in TDD systems or the frame duration in FDD systems gives the temporal dimension of the DL subframe in terms of the number of symbol-groups (M). For the frequency dimension, the number of sub-channel groups (N) is determined by the channel bandwidth, the FFT size, the selected channel utilization mapping permutation, and so forth. With these known values of M and N, a described implementation of the tiling scheme may begin with the following two parts (for a DL subframe example):

(1) The dimensions of the DL subframe are defined as N×M, with N being the number of subchannel groups and M being the number of symbol groups. Thus, DL_Slots=N×M is the number of slots in the DL in frame n.

(2) A set of connections is organized into groups in which the number of groups is less than N. Although this example describes addressing (e.g., distributing along) the N direction first, this tiling scheme can be implemented by addressing the M direction first. The number of groups is set to be less than N to reduce the quantization or round off error.

It is not fundamental to the scheme what criterion or criteria are used for creating the groups. One or more of the following grouping criteria may be employed: channel condition preferences of each subscriber, modulation and coding scheme, equalization of the allocation total for each group, and so forth. Connections with similar grouping criteria are grouped into groups.

The thickness in the N dimension that is to be allocated to each group $G_j$ is determined using the following calculations:

Let $Allocation_{Total}$ be the sum of the allocations (e.g., in slots) for all connections in frame n. Let $Allocation_{Total\_j}$ be the sum of the allocations for all connections in group $G_j$ in frame n. The allocation in number of slots for each group $G_j$, or $Allocation\_Group_j$, is determined in proportion to each group's individual allocation as a percentage of the total allocation, as indicated by equation T1 below:

$$Allocation\_Group_j = \min\left[Allocation_{Total\_j}, \frac{Allocation_{Total\_j}}{Allocation_{Total}} \times DL\_Slots\right].$$ (Eqn T1)

Thus, equation T1 represents the number of slots that are to be allocated to group $G_j$; however, the tile dimensions are still unknown.

To continue the tiling process, one dimension of all tiles is fixed with respect to M. Thus, the portion or percentage that should be allocated to $G_j$ in the N dimension may be calculated as shown by equation T2 below:

$$N\_G_j = \frac{Allocation\_Group_j}{DL\_Slots} \times N.$$ (Eqn T2)

For example, if dimension N is in the frequency domain (i.e., N represents subchannel groups), then $N\_G_j$ represents the number of sub-channel groups that are to be allocated to group $G_j$. Consequently, the tile dimension of group $G_j$ is $N\_G_j \times M$ at this stage of the tiling scheme. Equations T1 and T2 are repeated for each group $G_i$ to calculate the height dimension of each group.

When the DL has many allocations, some group allocations are likely to be made up of several smaller allocations. If this is the case, the tiling scheme is continued for each group $G_j$. To continue the tiling scheme at the next stage, the N dimension is fixed, and the M dimension is partitioned while being mindful of the selected measure(s) of fairness.

It is given that the number of slots in group allocation $G_j$ is determinable by: $DL\_Slots_j = N\_G_j \times M$. Each group $G_j$ is then divided into k subgroups. Each subgroup $G_{j\_k}$ is sized in terms of slots in the M direction using equations T3 and T4. Let $Allocation_{Total\_G\_j}$ be the sum of the allocations for all connections in group $G_j$ in frame n. The allocation for subgroup $G_{j-k}$ in number of slots, or $Allocation\_Subgroup_{j-k}$ is given by equation T3:

$$Allocation\_Subgroup_{j_k} = \frac{Allocation_{Total\_j_k}}{Allocation_{Total\_G_j}} \times DL\_Slots_j.$$ (Eqn T3)

The width $M\_G_{j-k}$ of each sub-group $G_{j-k}$ is given in slots or symbol groups by:

$$M\_G_{j_k} = \frac{Allocation\_Subgroup_{j_k}}{DL\_Slots_j} \times M$$ (Eqn T4)

Thus, the dimension of subgroup $G_{j_k} = N\_G_j \times M\_G_{j_k}$.

In actual implementations, these subgroup dimensions may not automatically align with slot boundaries in terms of symbol groups and/or subchannel groups. In the discussion above, these boundaries were ignored. To continue the tiling process for an example real-world implementation, however, these subgroup dimensions are aligned by rounding off to the nearest slot boundary because fractional slots are not permissible under IEEE 802.16.

Hence, the dimensioned subgroups are rounded off to the nearest subchannel group and symbol group to match the slot boundaries. In a described implementation, the rounding off process takes into account the demand of each group (or subgroup) by rounding up to the nearest subchannel group (or symbol group) if there is sufficient demand to fill the tile.

To perform the rounding, it is given that $Demand_j$ is the total demand for group $G_j$. The number of subchannel groups allocated to group $G_j$ may be determined as follows:

```
if (Demand_j ≥ Round(N_G_j × M) then
    N_G_j = Round(N_G_j)
Else
    N_G_j = Round(N_G_j) - 1.
```

Similarly, for the subgroups in group $G_j$: It is given that $Demand_{j-k}$ is the total demand of subgroup $G_{j-k}$. The number of symbol groups allocated to subgroup $G_{j-k}$ may be determined as follows:

```
if (Demand_{j_k} ≥ Round(N_G_j × M_G_{j_k}) then
    M_G_{j_k} = Round(M_G_{j_k})
Else
    M_G_{j_k} = Round(M_G_{j_k}) - 1.
```

In other words, the Round( ) function above is performed. Afterwards, the resulting allocation is compared to the demand. If the fractional part of the allocation is greater than 0.5, the allocation is rounded up. However, before an allocation is rounded up, the demand is checked to determine if it is sufficient to fill the extra slot area. If not, the allocation is rounded down.

The example rounding implementations described above are a general approach for dealing with rounding to slot boundaries. There are, however, many cases in which this approach may not work optimally. For example, consider a case in which all of the allocations would need to be rounded up to the next slot boundary, but none of the allocations have enough demand to fill a larger allocation size.

There are multiple alternative schemes that can address such cases. One example scheme involves readjusting the allocations. After performing the general rounding implementation described above, if there are any excess unallocated slots, the system can readjust the slot boundary (e.g., change the allocation size) starting with the allocation that has the highest leftover demand. Consider, for instance, an allocation that is 3.6 prior to rounding and that should therefore be rounded up to 4. However, because it has no demand to fill 4, it is instead rounded down to 3. Because not all slots have been assigned, the size of this allocation can be readjusted to 4. This readjustment can continue until all slots are assigned. Although example specific rounding algorithms have been described herein, other rounding algorithms may alternatively be employed.

An implementation of a bandwidth allocation tiling scheme is described above at least partly mathematically. A numerical example of the quantitative description is provided below to further illuminate the described example implementation. This numerical example has four (4) connection groups, with the first connection group being made up of five (5) smaller subgroups. Connection groups 2-4 are not divided into subgroups in this example for the sake of brevity. In this example, there are 30 subchannel groups (N=30) and 25 symbol groups (M=25).

The allocation percentage of each connection group is shown in the second column of Table 1 below. The number of subchannel groups for each connection group that results from these percentages is shown in the third column of Table 1.

TABLE 1

Connection group percent allocation.

| Connection Group | Percentage of Total Allocation | Number of Subchannel Groups |
|---|---|---|
| Group 1 | 20% | 6 |
| Group 2 | 10% | 3 |
| Group 3 | 40% | 12 |
| Group 4 | 30% | 9 |

The allocation percentage of each subgroup as a portion of Connection Group 1 is shown in the second column of Table 2 below. The number of symbol groups that from these percentages is shown in the third column of Table 2. With regard to Note 1 of Table 2, subgroups 1-C and 1-E are rounded off to the nearest symbol group boundary. The rounding off process takes into account the demand of these subgroups as described above.

TABLE 2

Subgroup percent allocation.

| Subgroups of Connection Group 1 | Percentage of Group 1 Total Allocation | Number of Symbol Groups |
|---|---|---|
| Subgroup 1-A | 20% | 5 |
| Subgroup 1-B | 20% | 5 |
| Subgroup 1-C | 30% | $8^{Note\ 1}$ |
| Subgroup 1-D | 20% | 5 |
| Subgroup 1-E | 10% | $2^{Note\ 1}$ |

Figure 16:
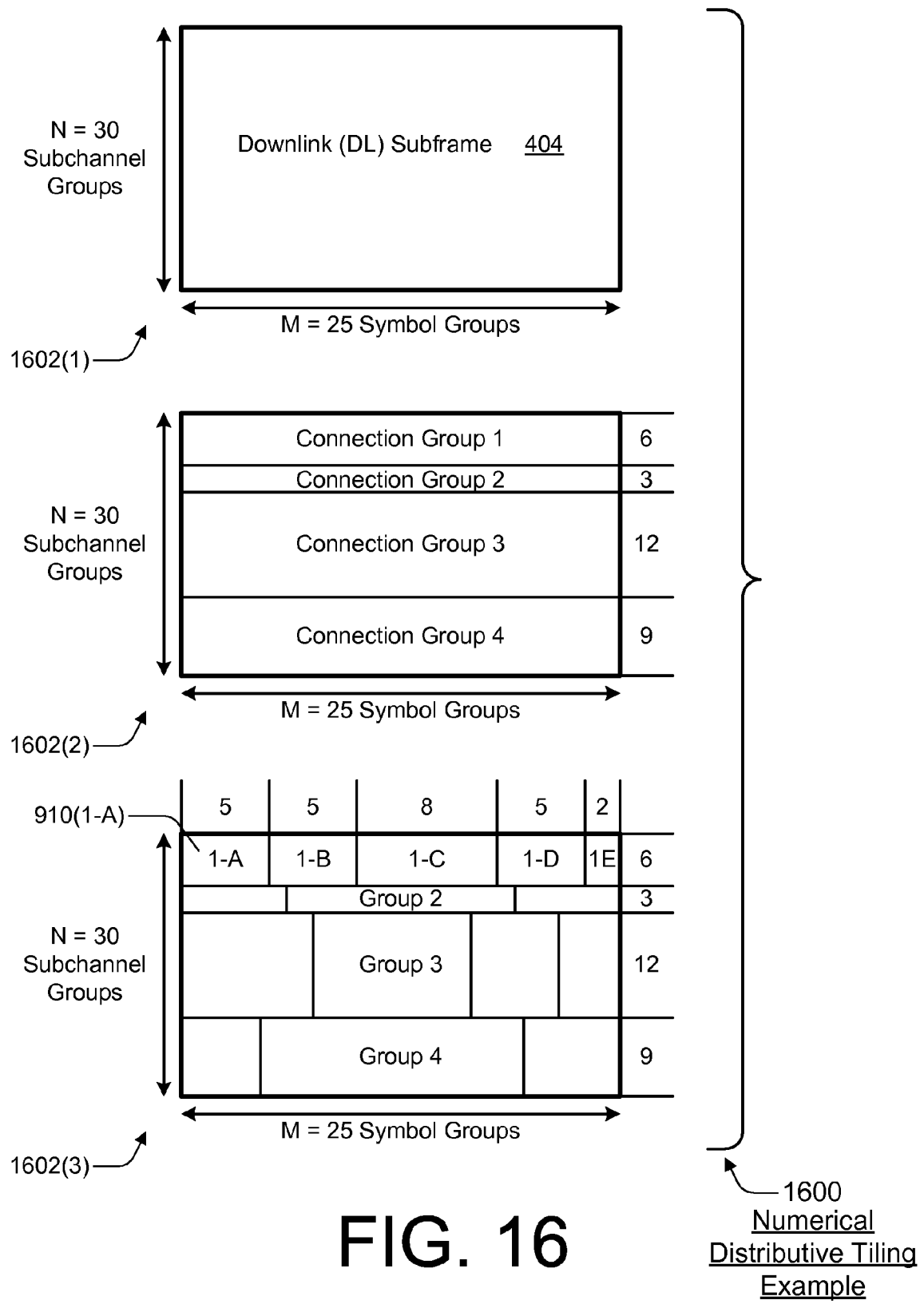
FIG. 16 is a block diagram in which allocations having example numeric values are distributively tiled onto a DL subframe.

FIG. 16 is a block diagram 1600 in which bandwidth allocations having example numeric values are distributively tiled onto a DL subframe 404. DL subframe 404 is shown at three different stages 1602 of a tiling procedure that illustrates the numerical example described above and presented by Tables 1 and 2. First stage 1602(1) is the empty stage that merely shows the dimensions of DL subframe 404. These dimensions are 30 subchannel groups by 25 symbol groups.

In second stage 1602(2), the M dimension is fixed, and the N dimension is proportionally divided according to the allocations of connection groups 1, 2, 3, and 4 as shown above in Table 1. Hence, connection group 1 is apportioned 6 subchannel groups, connection group 2 is apportioned 3 subchannel groups, connection group 3 is apportioned 12 subchannel groups, and connection group 4 is apportioned 9 subchannel groups.

In third stage 1602(3), the N dimension is fixed. Connection group 1 has five subgroups, and the M dimension is therefore proportionally partitioned into five allocated tiles. These five symbol group allocations are shown above in Table 2. They are also illustrated in third stage 1602(3) as follows: subgroup 1-A is apportioned 5 symbol groups, subgroup 1-B is apportioned 5 symbol groups, subgroup 1-C is apportioned 8 symbol groups, subgroup 1-D is apportioned 5 symbol groups, and subgroup 1-E is apportioned 2 symbol groups.

By way of example, the tile for subgroup 1-A, 910(1-A), has a dimension of 6 subchannel groups by 5 symbol groups. In accordance with slot 510 (of FIG. 5), tile 910(1-A) has 5×6=30 slots. The individual allocations 902 (not separately shown in FIG. 16) of tile 910(1-A) of subgroup 1-A are thus used to fill the 30 slots. The filling of the slots is accomplished by taking PDUs from associated connections 602 (of FIG. 6) and applying them to the slots to the limit instituted by allocations 902.

Figure 17:
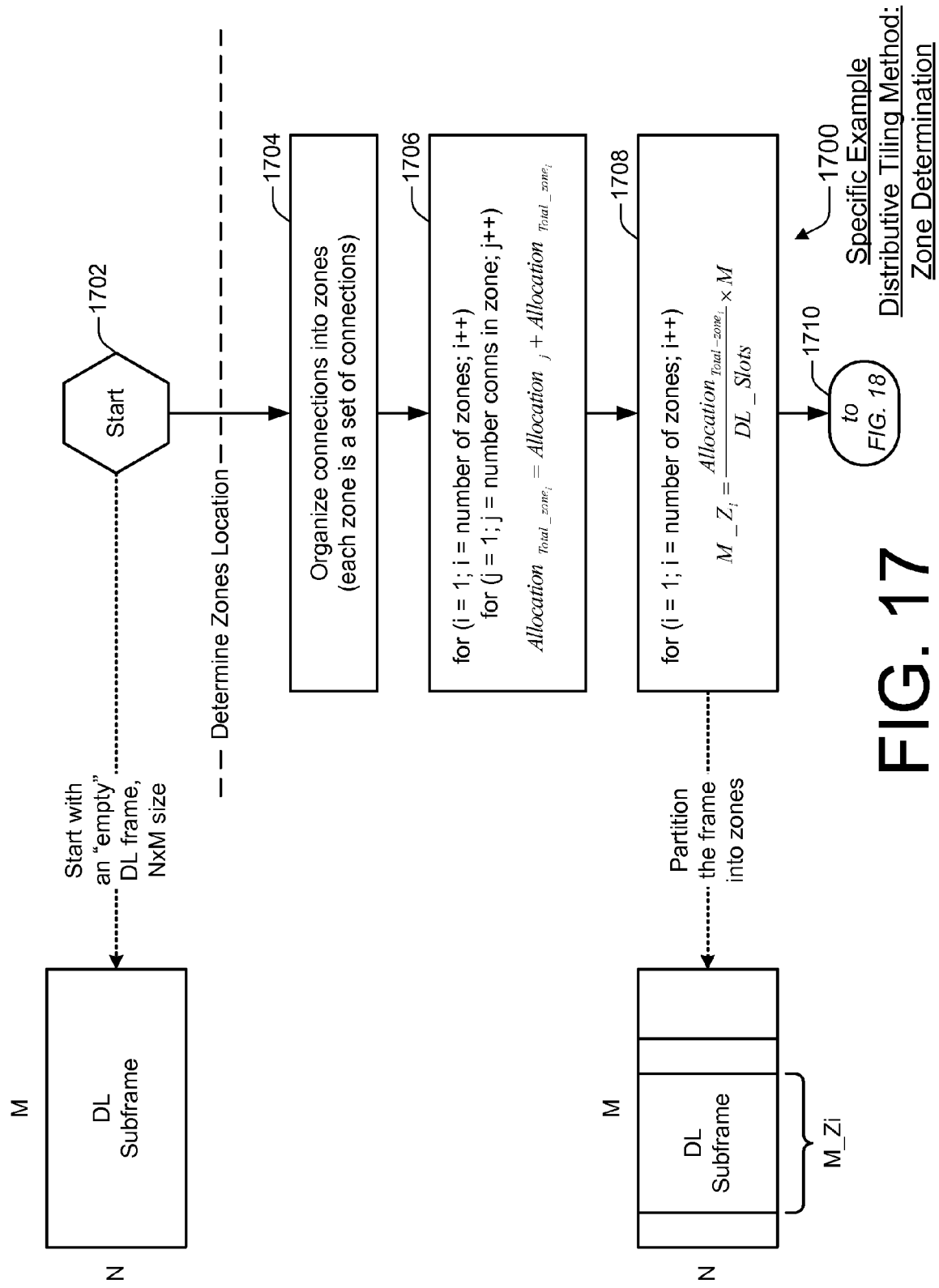
FIG. 17 is a flow diagram that illustrates a first part of a more-specific example method for distributively tiling allocations, with the first part being directed to the determination of zones.
Figure 18:
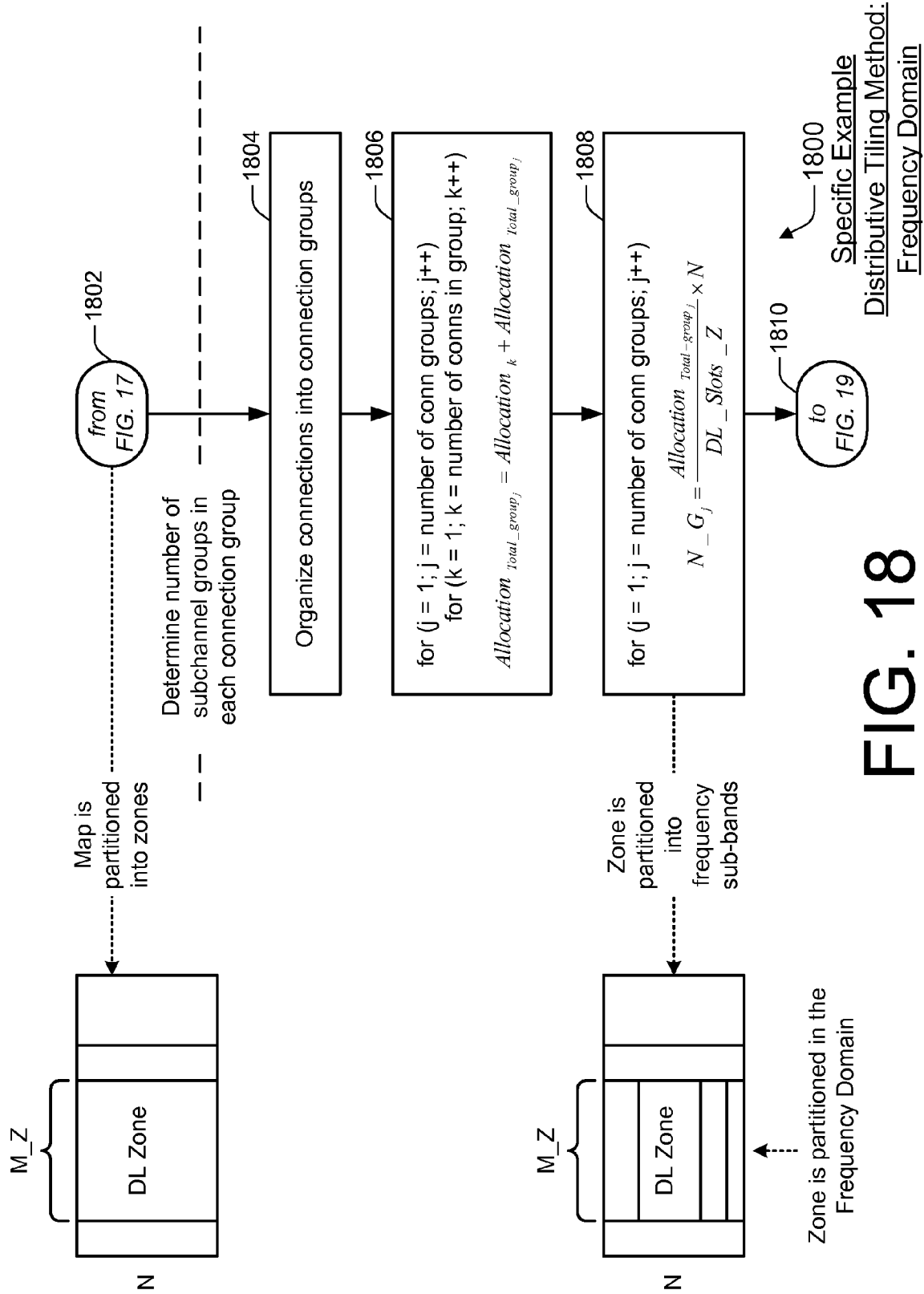
FIG. 18 is a flow diagram that illustrates a second part of the more-specific example method for distributively tiling allocations, with the second part being directed to frequency domain dimensioning.
Figure 19:
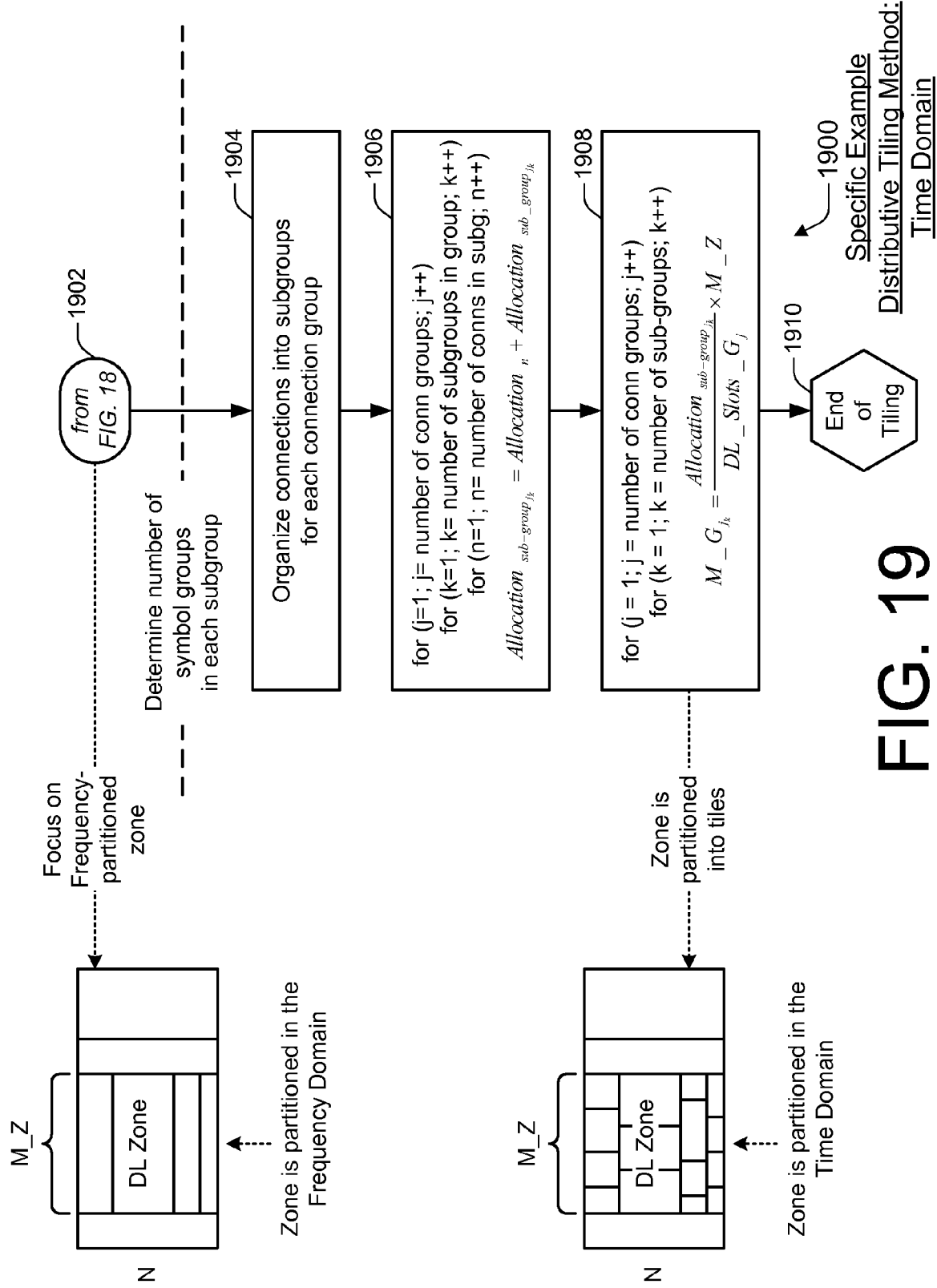
FIG. 19 is a flow diagram that illustrates a third part of the more-specific example method for distributively tiling allocations, with the third part being directed to time domain dimensioning.

FIGS. 17, 18, and 19 are flow diagrams 1700, 1800, and 1900, respectively, that illustrate a more-specific example method for distributively tiling bandwidth allocations. Flow diagram 1700 includes five (5) blocks 1702-1710 and illustrates a first part that is directed to the determination of zones. Flow diagram 1800 includes five (5) blocks 1802-1810 and illustrates a second part that is directed to frequency domain dimensioning. Flow diagram 1900 includes five (5) blocks 1902-1910 and illustrates a third part that is directed to time domain dimensioning. Although the actions of flow diagrams 1700, 1800, and 1900 may be performed in other environments and with a variety of hardware, firmware, and/or software combinations, the environments and components otherwise described herein and/or illustrated in the referenced figures are used to illuminate example implementations of the method. Although the flow diagrams are directed to tiling a DL subframe, the method may also be applied to tiling UL subframes, as permitted by the constraints of a given wireless standard.

FIG. 17 is a flow diagram 1700 that illustrates a first part of a more-specific example method for distributively tiling bandwidth allocations, with the first part being directed to the determination of zones. Zones are partitioned areas of the DL subframe. They are relevant to some air interfaces but not to others. Zone switching is relevant to, for example, IEEE 802.16. With zone switching, the DL subframe is partitioned in the time domain on symbol group boundaries. Zone switches enable the support of different PHY layer modes. For instance, each PHY layer mode is supported by a different zone.

Hence, the example specific tiling algorithm as described herein organizes users into zones to determine the proportional number of slots (e.g., in terms of symbol groups) each set of users is to be allocated. Each zone is then partitioned along a first dimension using groups and then along a second dimension using subgroups. Zone partitioning, frequency domain partitioning, and time domain partitioning are addressed by FIGS. 17, 18, and 19, respectively.

In a described implementation for FIG. 17, flow diagram 1700 starts at block 1702 with an "empty" DL subframe having an N×M size. More specifically, the following are inputs to the zone determination part of this example tiling method: a per connection allocation, a per subscriber station and/or a per connection modulation and coding scheme, and a size of the DL subframe (e.g., a number of subchannel groups N, a number of symbol groups M, and a number of slots in the DL subframe).

To determine the locations of the zones, the actions of blocks 1704-1708 are performed. At block 1704, connections are organized into zones. Thus, each zone is a set of connections. Zones are partitioned on symbol group boundaries. Each connection is associated with a specific zone. The connections can therefore be organized into zones by the scheduler, for example.

At block 1706, the total allocation for a zone is determined by summing the allocations of each connection j that is a member of the set of connections of the zone. This total zone allocation determination is repeated for each zone i.

At block 1708, the size of a zone is determined relative to its total allocation. More specifically, the size of the zone $M\_Z_i$ is determined in terms of a number of symbol groups that is proportional to the zone's percentage of the total number of DL_Slots of the DL subframe. This zone size determination is repeated for each zone i. The output is a DL subframe that is partitioned into zones. As indicated by block 1710, the method continues at FIG. 18.

FIG. 18 is a flow diagram 1800 that illustrates a second part of the more-specific example method for distributively tiling bandwidth allocations, with the second part being directed to frequency domain dimensioning. In a described implementation for FIG. 18, flow diagram 1800 starts at block 1802 with a DL subframe that is partitioned into zones. Additionally, the same inputs continue to be available for the frequency domain partitioning part of this example tiling method: a per connection allocation, a per subscriber station and/or a per connection modulation and coding scheme, and a size of the target zone or zones in the DL subframe.

To determine the number of subchannel groups in each connection group, the actions of blocks 1804-1808 are performed. At block 1804, the set of connections of the targeted zone are organized into connection groups. In other words, based on some grouping criterion or criteria, the connections are organized into connection groups. The grouping criteria may be one or more of the following examples: channel condition preferences of each subscriber; modulation and coding scheme of the connections; allocation leveling (e.g., the allocation for each connection group is selected such that each connection group has approximately the same total allocation); active antenna systems/multiple input, multiple output (AAS/MIMO); some combination thereof, and so forth. Any criterion or criteria may be used to organize the connections into connection groups.

At block 1806, the total allocation for a connection group is determined by summing the allocations of the j connections that have been organized into that connection group. This total group allocation determination is repeated for each connection group i.

At block 1808, the number of subchannel groups for each connection group is determined with regard to the connection group's total allocation. More specifically, the number of subchannel groups $N\_G_j$ for each connection group is determined such that it is proportional to the connection group's percentage of the total size of the current zone DL_Slots_Z. This subchannel determination is repeated for each connection group j. The output is a DL subframe with the current zone partitioned in the frequency domain. In other words, the current zone is partitioned into frequency sub-bands. As indicated by block 1810, the method continues at FIG. 19.

FIG. 19 is a flow diagram 1900 that illustrates a third part of the more-specific example method for distributively tiling bandwidth allocations, with the third part being directed to time domain dimensioning. Although frequency domain dimensioning is illustrated as being performed prior to time domain dimensioning as reflected by the order of FIGS. 18 and 19, time domain dimensioning may alternatively be performed prior to frequency domain dimensioning. In a described implementation for FIG. 19, flow diagram 1900 starts at block 1902 with a DL subframe that has a zone that is partitioned into sub-bands corresponding to connection groups in accordance with the frequency dimensioning.

To determine the number of symbol groups in each subgroup, the actions of blocks 1904-1908 are performed. At block 1904, the connections for each connection group are organized into subgroups. The criterion or criteria for subgroup creation may also vary. In an example implementation, however, the connections are organized into subgroups such that each connection in a given subgroup has the same constellation and coding rate (e.g., modulation and coding scheme).

At block 1906, the total allocation for a subgroup is determined by summing the allocations of the n connections that have been organized into that subgroup. This total subgroup allocation determination is repeated for each subgroup k of each connection group j.

At block 1908, the number of symbol groups for each subgroup is determined with regard to the subgroup's total allocation. More specifically, the number of symbol groups $M\_G_{j\_k}$ for each subgroup is determined such that it is proportional to the subgroup's percentage of the total size of the current connection group $DL\_Slots\_G_j$. This symbol group determination is repeated for each subgroup k of each connection group j.

The output is a DL subframe with the current zone partitioned in the frequency domain and in the time domain. In other words, each connection group of each frequency sub-band is partitioned into tiled subgroup allocations. The current zone is thus partitioned into tiles. The number of symbol groups for each subgroup is given by M_G, and the number of subchannel groups for each subgroup is given by N_G. Hence, the tile dimension of each subgroup is given by N_G× M_G.

The actions of flow diagrams 1800 and 1900 are repeated for each zone that is established by the actions of flow diagram 1700. As indicated by block 1910, the basic tiling can be considered to be completed. However, rounding as described above may still be implemented.

Figure 20:
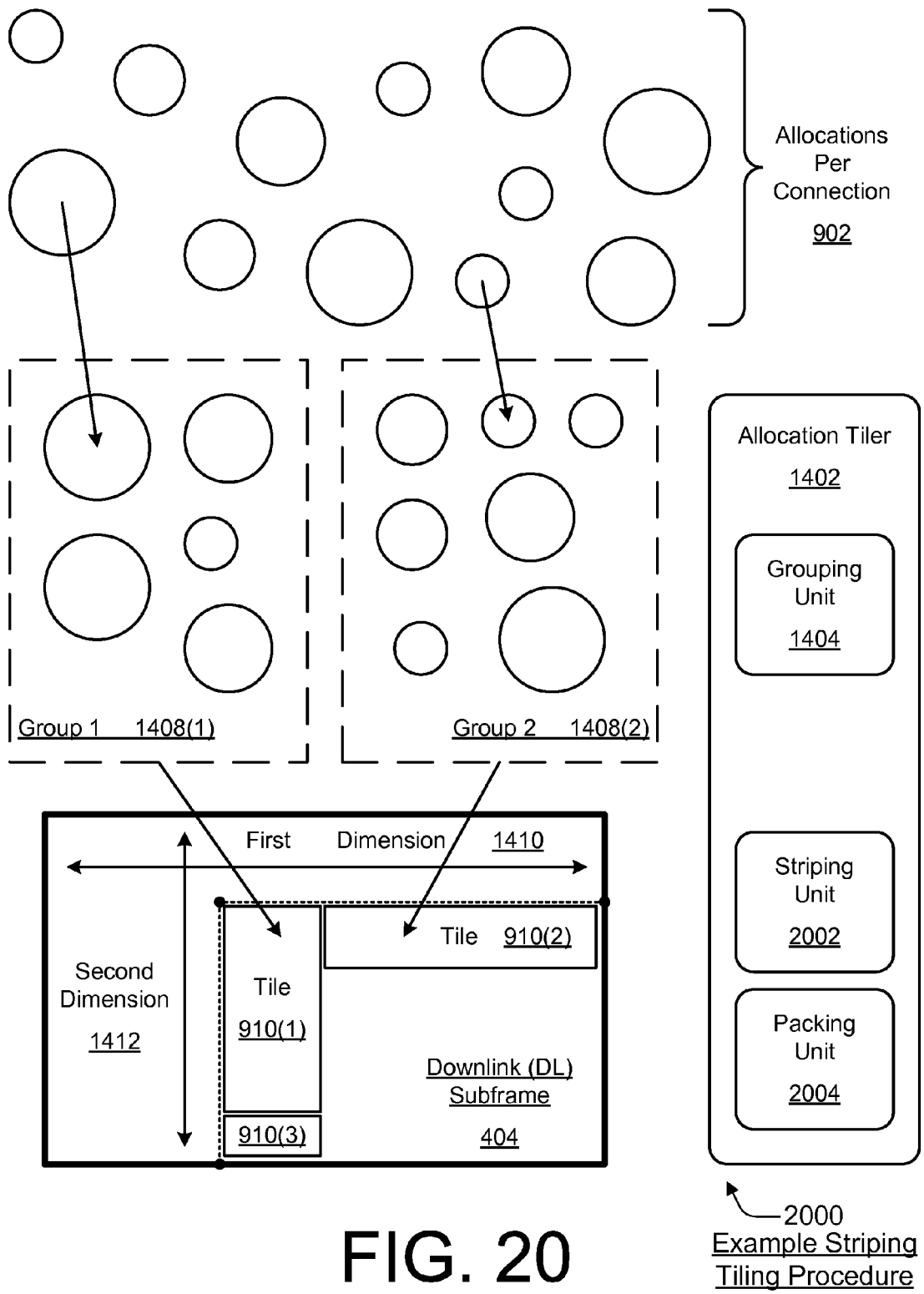
FIG. 20 is a block diagram illustrating an example allocation striping tiling procedure.

FIG. 20 is a block diagram illustrating an example bandwidth allocation striping tiling procedure 2000. As described more generally herein above (e.g., with particular reference to FIG. 9), bandwidth allocations per connection 902 are dimensioned and placed within a subframe by tiling procedure 2000. As illustrated, tiling procedure 2000 includes allocation tiler 1402, two groups 1408(1) and 1408(2), and a DL subframe 404. Allocation tiler 1402 includes grouping unit 1404, a striping unit 2002, and a packing unit 2004.

In a described implementation, and as introduced herein above with particular reference to FIG. 14, allocation tiler 1402 dimensions and places allocations per connection 902 into DL subframe 404. Allocations per connection 902 are produced by some scheduling algorithm and converted from bytes to slots, as appropriate. Example scheduling algorithms include, but are not limited to, those that are described herein above with particular reference to FIG. 8. Bandwidth allocations 902 represent an area in terms of a geometry that ultimately has a frequency dimension and a time dimension. The length and breadth (i.e., the dimensions) of an allocation may be flexible when it is initially determined by the scheduling algorithm. This dimensional flexibility and adjustability is represented in FIG. 20 by the circular shape of bandwidth allocations 902. The ultimate dimensionality resulting from a tiling procedure is represented by the rectangular shape of tiles 910 in DL subframe 404.

When capacity usage is at a maximum, tiling placement attempts to reduce, if not actually minimize or even eliminate, holes in DL subframe 404. Holes are areas of DL subframe 404 that do not have any bandwidth allocation associated therewith. Hence, holes are essentially wasted available bandwidth, and their existence in a DL subframe 404 can indicate a level of inefficiency in the tiling procedure.

More specifically for tiling procedure 2000, grouping unit 1404 groups allocations 902 in accordance with one or more criteria, such as channel condition preferences of each subscriber, modulation and coding rate, equalization of the allocation total for each group, connection category type, some combination thereof, and so forth. As shown, two groups 1408(1) and 1408(2) are created from allocations 902 by grouping unit 1404. Although only two groups 1408 are shown in FIG. 20, grouping unit 1404 may create any number of groups 1408. For example, the number of groups 1408 may be equal to the number of different modulation and coding rate pairs currently being used by a base station. The number of groups 1408 can also be larger. There can be multiple groups in which each group has the same modulation and coding rate. These multiple groups may be created, for example, to tile them in different areas of a DL subframe (e.g., in different zones).

As illustrated, DL subframe 404 has a first dimension 1410 and a second dimension 1412. One dimension represents frequency (e.g., subchannel groups), and the other dimension represents time (e.g., symbol groups). In a described implementation generally, striping unit 2002 stripes total allocations for each group 1408 into tiles 910 onto DL subframe 404. To reduce wasted available bandwidth, packing unit 2004 attempts to place smaller allocation groups into bonus fillable areas, which are represented by tile 910(3) in FIG. 20.

More specifically, striping unit 2002 stripes the total allocations 902 of group 1408(1) as tile 910(1). The total allocations are striped extending toward the edge of second dimension 1412 and then expanded outward along first dimension 1410 until the entire allocation group 1408(1) is placed on DL subframe 404. Because of rounding constraints and the rectangular shape of tile 910(1), an unused area may be left beyond the end of tile 910(1). This bonus fillable area need not be wasted.

Packing unit 2004 attempts to pack relatively smaller allocation groups into these bonus fillable areas that are created by the striping of striping unit 2002. By way of example, packing unit 2004 has placed tile 910(3) into the bonus fillable area below tile 910(1). Tile 910(3) corresponds to an un-illustrated third group of allocations 1408.

After tiling an allocation group along second dimension 1412, striping unit 2002 stripes an allocation group in a different direction along first dimension 1410. Striping unit 2002 stripes the total allocations 902 of group 1408(2) as tile 910(2). The total allocations are striped extending toward the edge of first dimension 1410 and then expanded outward along second dimension 1412 until the entire allocation group 1408(2) is placed on DL subframe 404. Additional striping and packing functionality for striping unit 2002 and packing unit 2004, respectively, are described herein below.

Although a DL subframe 404 is illustrated in FIG. 20, described implementations of the striping tiling procedure may also be applied to UL subframes 408, depending on the flexibility of a given wireless standard. Additionally, it should be understood that striping approaches to tiling bandwidth allocations are applicable to both TDD systems (e.g., using a TDD frame format 400A) and FDD systems (e.g., using an FDD frame format 400B).

Figure 21:
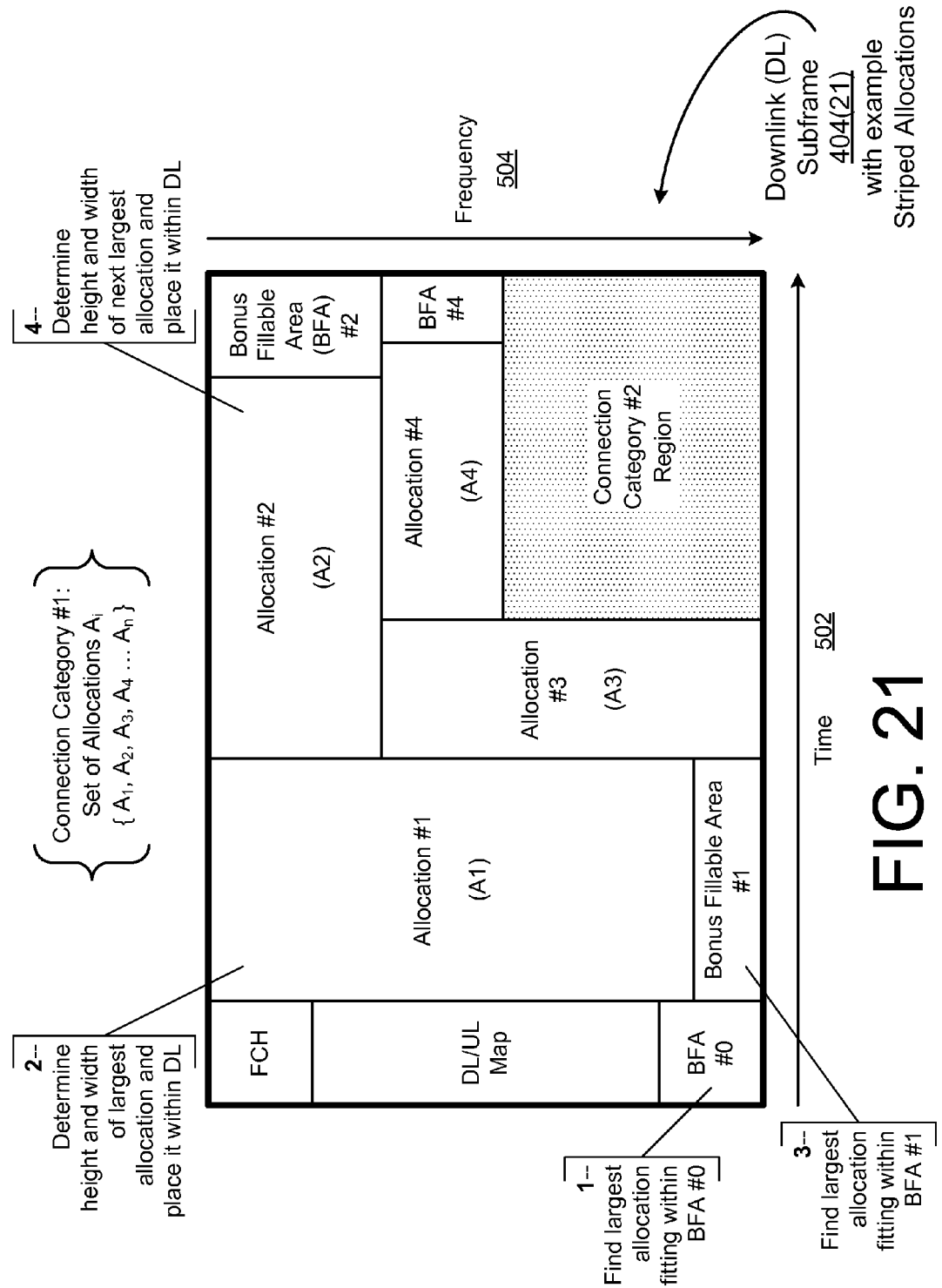
FIG. 21 is a block diagram of a DL subframe having example striped allocations.

FIG. 21 is a block diagram of a DL subframe 404(21) having example striped allocations (A1-A4). As illustrated, DL subframe 404(21) corresponds to time 502 along the abscissa axis versus frequency 504 along the ordinate axis. DL subframe 404(21) includes a frame control header (FCH) block, a DL/UL map block, and four allocation blocks A1-A4. DL subframe 404(21) also includes four bonus fillable areas (BFAs) and a connection category #2 region.

In a described implementation, allocations are separated into two or more categories. In the examples that follow, the allocations are separated into a first category #1 and a second category #2. These categories may be defined in any manner. For instance, they may be separated into real-time connections (e.g., category #1) and non-real-time connections (e.g., category #2). They may also be separated into connections that cannot afford retransmission (e.g., category #1) and those that do tolerate retransmissions (e.g., category #2). In an IEEE 802.16 implementation, for example, they may be separated into Hybrid Automatic-Repeat-Request (HARQ) connections (e.g., category #2) and non-HARQ connections (e.g., category #1).

Figure 31:
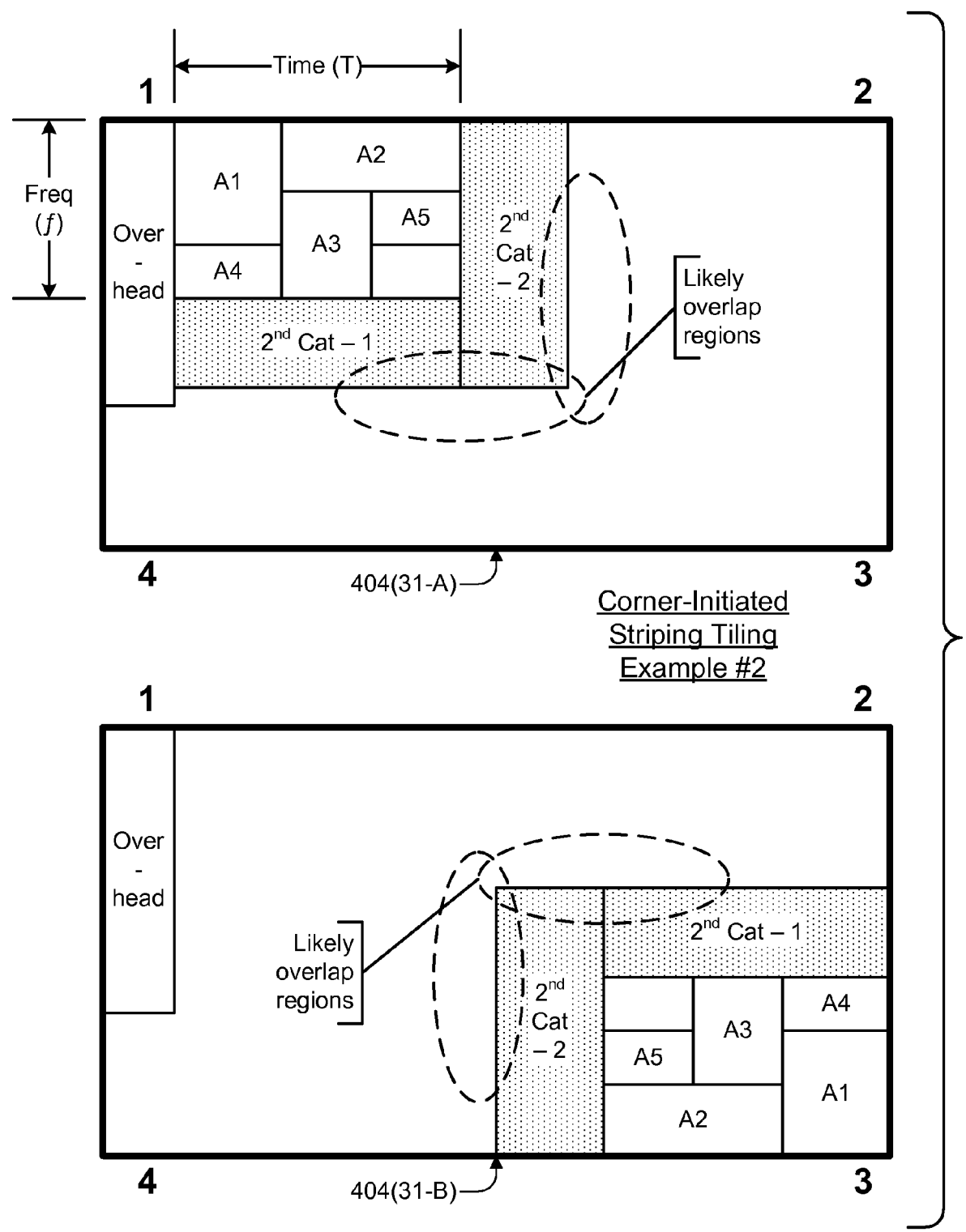
FIG. 31 depicts block diagrams of DL subframes illustrating a second example quadrant-oriented technique for a striping approach to tiling allocations.

The connections of category #1 are given to be a set of allocations $A(i)=\{A1, A2, A3, A4 \ldots An\}$. Each allocation $A(i)$ may, for example, correspond to the sum of allocations 902 in each group 1408($i$) (of FIG. 20). As noted above, each group may have allocations belonging to a single modulation and coding rate pair. Without loss of generality, the connections of category #2 are assumed to be capable of being tiled as one rectangle on DL subframe 404. Nevertheless, category #2 connections may alternatively be tiled as multiple rectangular regions (e.g., as shown in FIG. 31).

When grouping is implemented by modulation and coding rate pair, the total allocation size for allocations $A(i)$ of category #1 connections may be determined by equation T5 as follows:

$$A(i) = \left\lceil \frac{\sum \text{Demand\_per\_Connection}}{\text{Modulation \& CodingRatePair\_Payload}} \right\rceil. \quad \text{(Eqn T5)}$$

In equation T5, "Σ Demand_per_Connection" represents the total demand across all connections of a given group. The "Modulation&CodingRate Pair_Payload" variable represents the efficiency at which the connections are currently communicating for the given group. The quotient within the brackets therefore represents the area (e.g., in tile units) that the group should be allocated in a subframe.

In DL subframe 404(21), the FCH and DL/UL map blocks are standard overhead areas. Generally, DL subframes 404 include some overhead area. This overhead area may include those that are illustrated in FIG. 21 and/or alternative overhead information. The DL/UL map informs subscriber stations 104 of the areas of the DL and UL subframes that have been assigned to them in a given frame.

In a described implementation, the allocations A of connection category #1 are ordered from largest to smallest. Thus, allocation A1 is larger than allocation A2, which is larger than allocation A3, and so forth.

For the sake of clarity, the blocks in DL subframe 404(21) are described in terms of their height and width. In FIG. 21, the height parameter is measured top-to-bottom along the frequency 504 dimension, and the width parameter is measured right-to-left along the time 502 dimension.

An example striping tiling procedure is described in terms of stages 1-4. Below the DL/UL map block, there is bonus fillable area (BFA) #0. As illustrated, the width of BFA #0 is equal to the width of the DL/UL map block. The height of BFA #0 is the amount of the frequency 504 dimension that is not consumed by the FCH and DL/UL map blocks. (In IEEE 802.16 systems, for example, the DL/UL map follows the frequency-first time-second pattern which means that the map fills up all of the subcarrier groups of a symbol group "column" and then might fill up only halfway through the next symbol group "column". Hence, the width of BFA#0 is one symbol group under current IEEE 802.16 specifications.) Packing unit 2004 at stage 1 attempts to find the largest allocation A that fits within BFA #0. This largest allocation, if any, is placed at BFA #0.

At stage 2, the height and width of the largest allocation, A1, is determined by striping unit 2002. This allocation, after handling any rounding, is placed within DL subframe 404(21). It is dimensioned such that it extends in height as far as possible along the frequency 504 dimension and is then expanded in width along the time 502 dimension as much as is needed to accommodate the total area of allocation A1.

Because of rounding constraints with the placement of allocation A1, a BFA #1 is created below it. At stage 3, the largest remaining allocation A that can fit within BFA #1, if any, is placed below allocation #1 A1 by packing unit 2004.

At stage 4, the next largest allocation, A2, is dimensioned and placed within subframe 404(21). The height and width are determined as follows. For this allocation, striping unit 2002 extends the width of allocation #2 A2 as far as possible along the time 502 dimension. The height of allocation #2 A2 is then expanded along the frequency 504 dimension as much as is needed to accommodate the total area of allocation A2. A BFA#2 results, and packing of another allocation is attempted.

For allocation #3 A3, the height is extended as far as possible, and the width is then expanded as necessary to accommodate the total area of allocation A3. For allocation #4 A4, the width is extended as far as possible, and the height is then expanded as necessary to accommodate the total area of allocation A4. A BFA #4 is also illustrated. Each BFA is filled in by the largest possible allocation A during the tiling procedure by packing unit 2004.

In this manner, allocations A(i) of connection category #1 are dimensioned and placed onto subframe 404(21). Some allocations are extended first along the time dimension and then expanded along the frequency dimension until the total area of the allocation is accommodated. Other allocations are extended first along the frequency dimension and then expanded along the time dimension until the total area of the allocation is accommodated. This process need not be alternated each and every time an allocation is tiled. However, by having some allocations extended in height and expanded in width while some other allocations are extended in width and expanded in height, a relatively sizable rectangular area is created in a corner of the subframe that may be reserved for a connections-of-category-#2 region. The allocations for these category #2 connections are then allotted areas within this rectangular region.

Figure 22A:
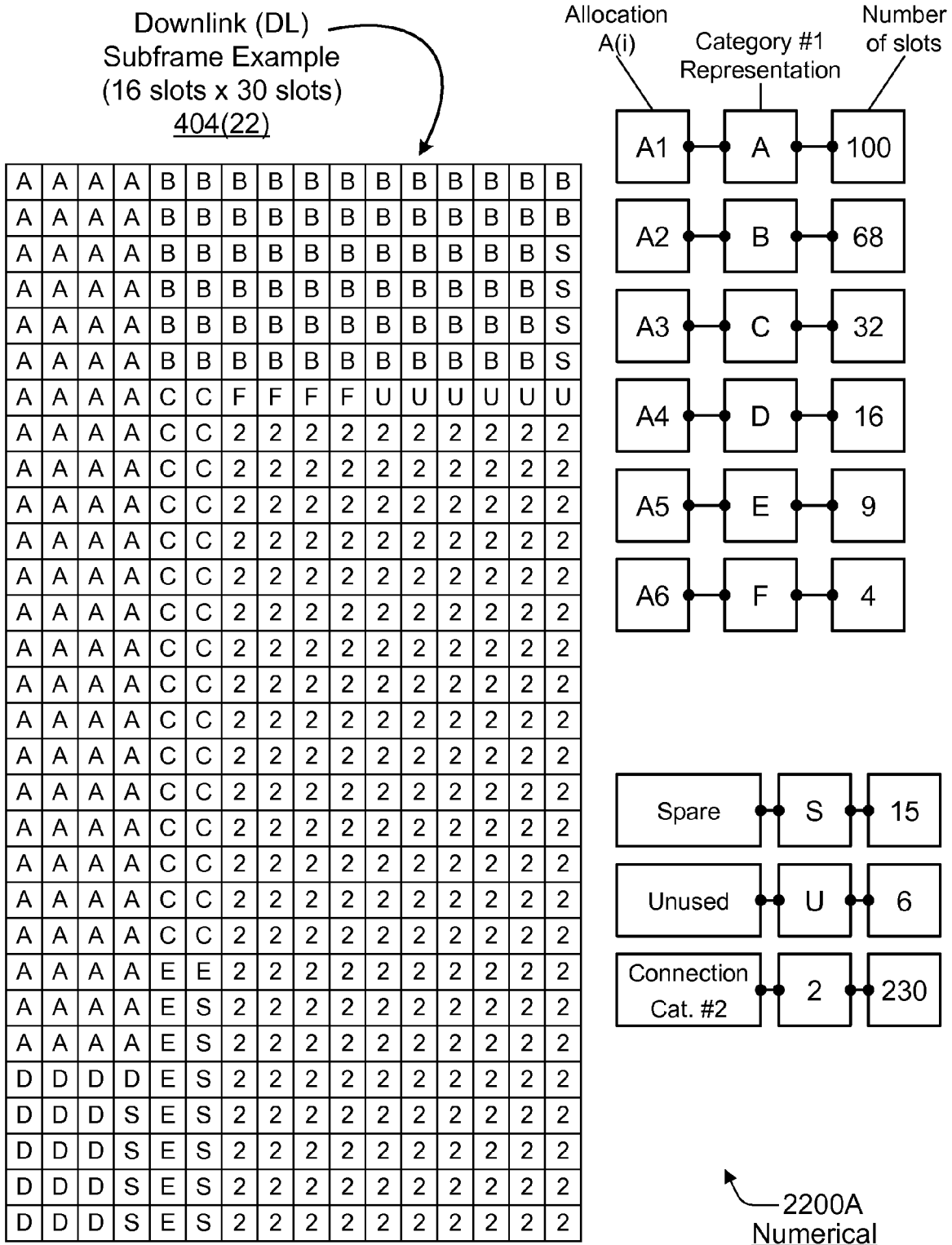
FIGS. 22A and 22B are block diagrams of a DL subframe illustrating a striping approach to tiling with allocations having example numerical values.

FIG. 22A is a block diagram 2200A of a DL subframe 404(22) illustrating a striping approach to tiling with allocations having example numerical values. DL subframe 404(22) is an example subframe composed of 16 slots in width and 30 slots in height. In the example of FIG. 22, each allocation is assumed to be constrained to be rectangular in shape (e.g., as specified by certain IEEE 802.16 standards).

The six example allocations A1-A6 are listed as follows: allocation A(i)—category #1 representation on DL subframe 404(22)-number of slots in allocation A(i). The allocations having numerical examples are: A1-A-100; A2-B-68; A3-C-32; A4-D-16; A5-E-9; and A6-F-4. In DL subframe 404(22), spares are represented by "S", unused slots are represented by "U", and slots reserved for connection category #2 allocations are represented by "2". Spare slots "S" are those slots that are allocated to a particular allocation as part of a rectangular block but are not needed by that particular allocation. Unused slots "U" are those slots that are not allocated to any user or group. In block diagram 2200A, the resulting slots for these three types are: Spare-S-15; Unused-U-6; and Connection Category #2-2-230.

Allocation A1 is striped in a first direction. It is striped by extending its height as far as possible before its width is expanded. This creates a pattern on DL subframe 404(22) (not shown) of three full columns utilizing all 30 slots and a fourth column having 10 utilized "A" slots. Twenty slots in the fourth column would be wasted because allocation A1 is to be rectangular. In order to create a rectangular allocation A1 and produce a rectangular BFA "under" allocation A1, the "As" are compressed by placing them in a 4×25 block of slots. Thus, a BFA can be located in a 4×5 block of 20 slots below allocation A1. The largest allocation that can fit within the 20 slot block is allocation A4, as represented by D. With 16 slots in allocation A4, four slots are designated as spares, as represented by "S". As is described below with particular reference to FIG. 22B, the "D" slots can also be compressed.

The next largest allocation, A2 as represented by "Bs", is striped in a second direction. It is striped by extending its width as far as possible before its height is expanded. This striping determines the overall width and height. Four spares "S" are designated after placing the 68 "Bs" of allocation A2. The location of the spare slots depends on whether the first dimension or the second dimension is filled up first after an allocation's overall dimensions are determined. In FIG. 22A, slots are filled up along the vertical dimension prior to the horizontal dimension, which leaves a vertical column of spare "S" slots. With allocation A2, no BFA can be created by compression.

The next largest allocation, A3 as represented by "Cs", is striped in the first direction by placing its 32 "Cs" appropriately "under" allocation A2 and to the "right" of allocation A1. It is striped by extending its height as far as possible before its width is expanded. This creates a first column of 24 "Cs" and a second column of eight "Cs" (not shown), but a BFA may be created through compression. After compression of the "C" slots, the originally-allocated 2×24 block that would have had 16 spares (e.g., in the second column) becomes a 2×16 block with no spares. Thus, this compression results in 16 slots in a 2×8 block for a BFA. Because the 16-slot allocation A4 has already been tiled, the next largest remaining allocation that can be packed into this 16-slot BFA is the 9-slot allocation A5. The 9 "Es" of allocation A5 are therefore packed into this BFA. This leaves 7 spares "S". Compression of this filled-in BFA is described below with particular reference to FIG. 22B.

The next largest and last allocation, A6 as represented by "Fs", is then striped in the second direction. It is striped by extending its width as far as possible before its height is expanded. The four "Fs" are placed in a row extending in width toward the edge of DL subframe 404(22). There are six slots that form a rectangle, but go unused, as indicated by the six "Us".

This approach of striping in different directions does create a relatively large rectangular block for use by the category #2 connections. The resulting 10×23 block of slots may be reserved and allocated to connections of category #2, as indicated by the 230"2s". A second connection category #2 allocation block can be made for the 6 unused slots "U".

Figure 22B:
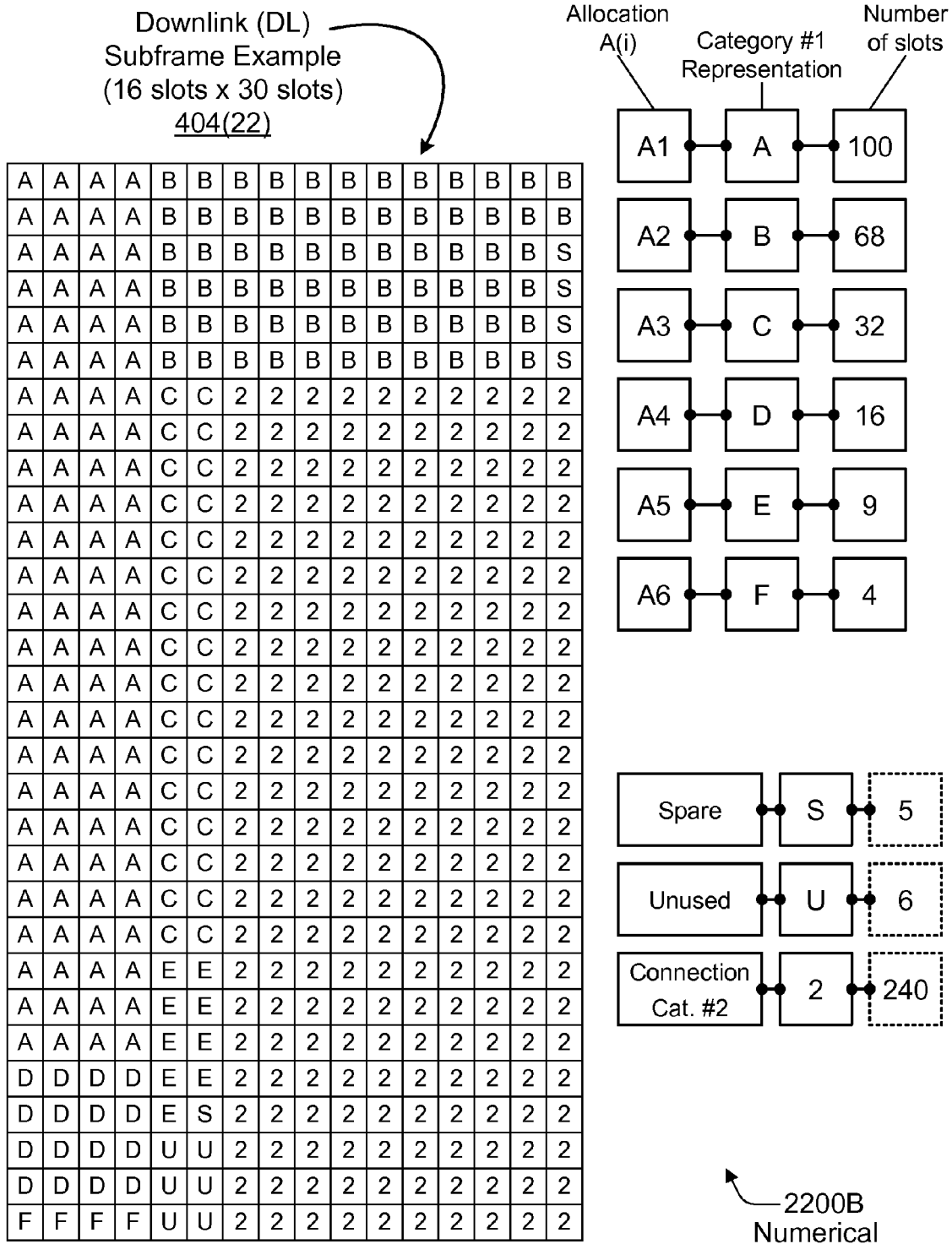

FIG. 22B is a block diagram 2200B of DL subframe 404 (22) having the example numerical values of FIG. 22A in which compression and BFA packing are performed iteratively or recursively. A number of refinements may be implemented to potentially improve the overall efficiency of the example illustrated in FIG. 22A with DL subframe 404(22). Some of these refinements are illustrated in FIG. 22B. For example, the placement of slots during packing into a BFA may be compressed, as is done for the original allocations. Also, BFA packing by packing unit 2004 may be performed recursively on an initial BFA area. As described above with reference to FIG. 22A, the "A" slots for allocation A1 are compressed into a 4×25 block to produce a BFA. The overall tiling efficiency can be increased, on average, if this compression is also performed during the BFA packing. For example, if allocation A4 is compressed into a 4×4 block of 16 "D" slots, a rectangular 4×1 slot is produced for a second BFA packing attempt iteration. Any allocation of four or fewer slots can then be placed in this second level BFA.

As illustrated in block diagram 2200B, the 4 "F" slots of allocation A6 are packed into a secondary BFA tiling "below" the "D" slots of allocation A4. The "E" slots of allocation A5 were also packed into a primary BFA. Compressing these 9 "E" slots results in one spare "S" slot and produces another secondary BFA of six slots (a 2×3 block). If there were another allocation of six or fewer slots, it could be packed into this secondary 2×3 BFA. This would ultimately increase the size of the connection category #2 block. In block diagram 2200B, the resulting slots that are not for the first category allocations are: Spare-S-5; Unused-U-6; and Connection Category #2-2-240. For this particular example, employing an iterative recursive approach to BFA packing and compression (i) reduces the number of spare "S" slots by 10 and (ii) produces an extra 10 slots for category #2 connections as the rectangular region for it can be started a row higher.

In the description below of FIGS. 23-31, the two dimensions of each tile are referred to generically as length and breadth. The length and breadth can be defined on any direction of a subframe and to any dimensional units (e.g., frequency or time). The length of an allocation during tiling is extended toward a subframe edge or maximum value of one dimension. The breadth of the allocation is then expanded along the other dimension to accommodate a size of the allocation being tiled.

Figure 23:
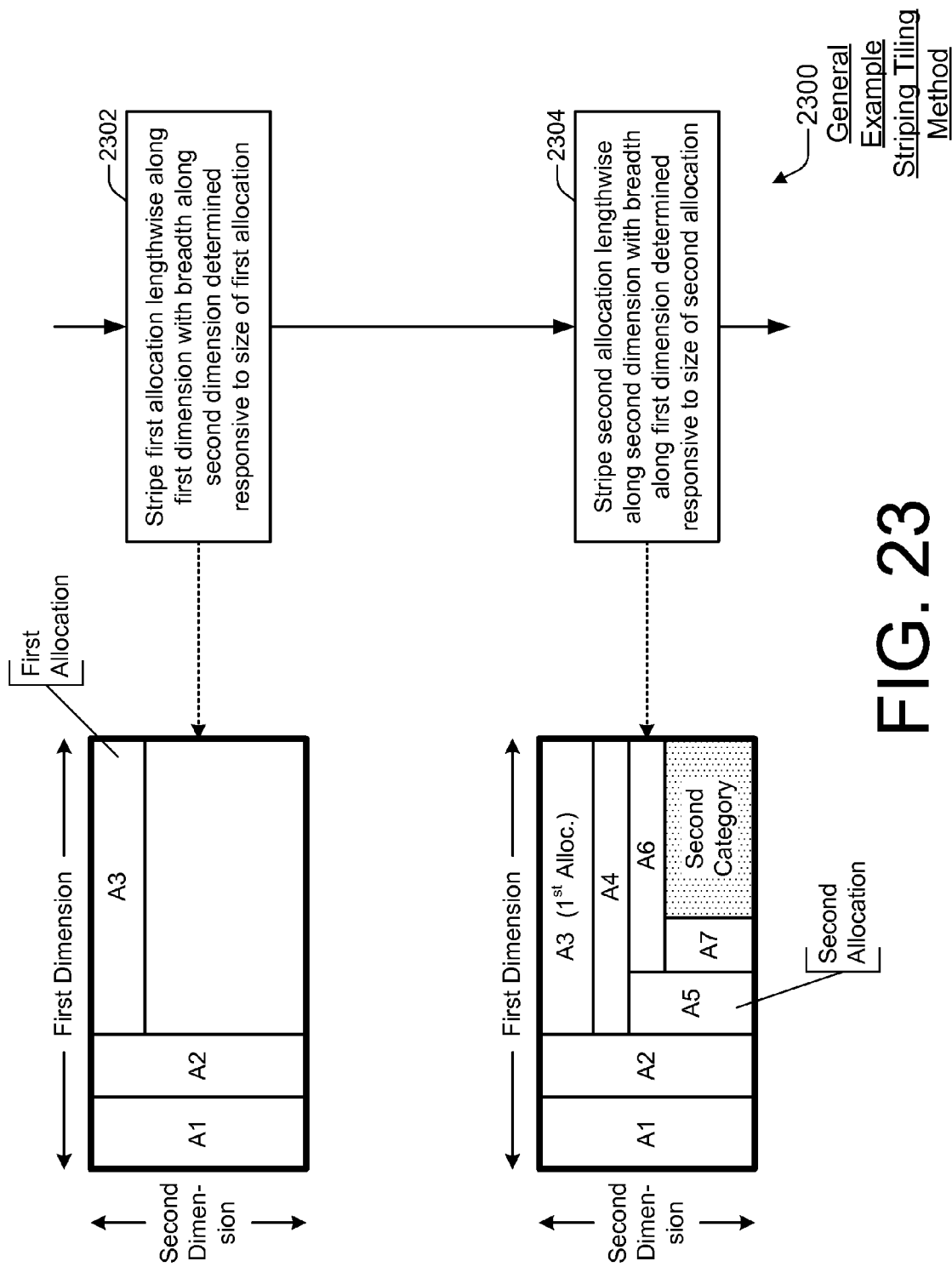
FIG. 23 is a flow diagram that illustrates an example general method for a striping approach to tiling allocations.

FIG. 23 is a flow diagram 2300 that illustrates an example general method for a striping approach to tiling bandwidth allocations. Flow diagram 2300 includes two (2) blocks 2302 and 2304. Although the actions of flow diagram 2300 may be performed in other environments and with a variety of hardware, firmware, and/or software combinations, the environments and components otherwise described herein and/or illustrated in the referenced figures are used to illuminate example implementations of the method.

A subframe is depicted as part of FIG. 23. This subframe has a first dimension and a second dimension. Either the first dimension or the second dimension may correspond to time, with the other dimension corresponding to frequency. The illustrated subframe includes allocations A1 and A2. An allocation A3 is being tiled next.

At block 2302, a first allocation is striped lengthwise along the first dimension with a breadth along the second dimension determined responsive to a size of the first allocation. For example, allocation A3 represents a first allocation that is striped by extending its length along the first dimension and then expanding its breadth along the second dimension so as to accommodate the total bandwidth of allocation A3. Allocation A4 is next tiled onto the illustrated subframe in the direction of the first dimension.

At block 2304, a second allocation is striped lengthwise along the second dimension with a breadth along the first dimension determined responsive to a size of the second allocation. For example, allocation A5 represents a second allocation that is striped by extending its length along the second dimension and then expanding its breadth along the first dimension so as to accommodate the total bandwidth of allocation A5. Afterwards, allocation A6 is tiled onto the subframe in the direction of the first dimension, and allocation A7 is tiled onto the subframe in the direction of the second dimension. After each of the first connection category allocations are tiled, a rectangular tile for the second category connections is reserved.

FIGS. 24-27 jointly show a flow diagram that illustrates a more-specific example method for a striping approach to tiling bandwidth allocations. FIGS. 24, 25, 26, and 27 are flow diagrams 2400, 2500, 2600, and 2700, respectively. In combination, these flow diagrams textually illustrate a more-specific example method for tiling bandwidth allocations using a striping approach. Each flow diagram also includes accompanying block diagrams to further illuminate certain principles of the method.

Flow diagram 2400 includes six (6) blocks 2402-2412 and illustrates an example setup for the method. Flow diagram 2500 includes four (4) blocks 2502, 2504A, 2504B, and 2506 that illustrate example core striping principles. Flow diagram 2600 includes four (4) blocks 2602-2608 and illustrates an example fine tuning when striping an allocation. Flow diagram 2700 includes eight (8) blocks 2702-2716 and illustrates packing into BFAs as well as preparation and progression towards another round of allocation striping. Although the actions of flow diagrams 2400, 2500, 2600, and 2700 may be performed in other environments and with a variety of hardware, firmware, and/or software combinations, the environments and components otherwise described herein and/or illustrated in the referenced figures are used to illuminate example implementations of the method. Although the flow diagrams are directed to tiling a DL subframe, the method is also applicable to tiling UL subframes.

Figure 24:
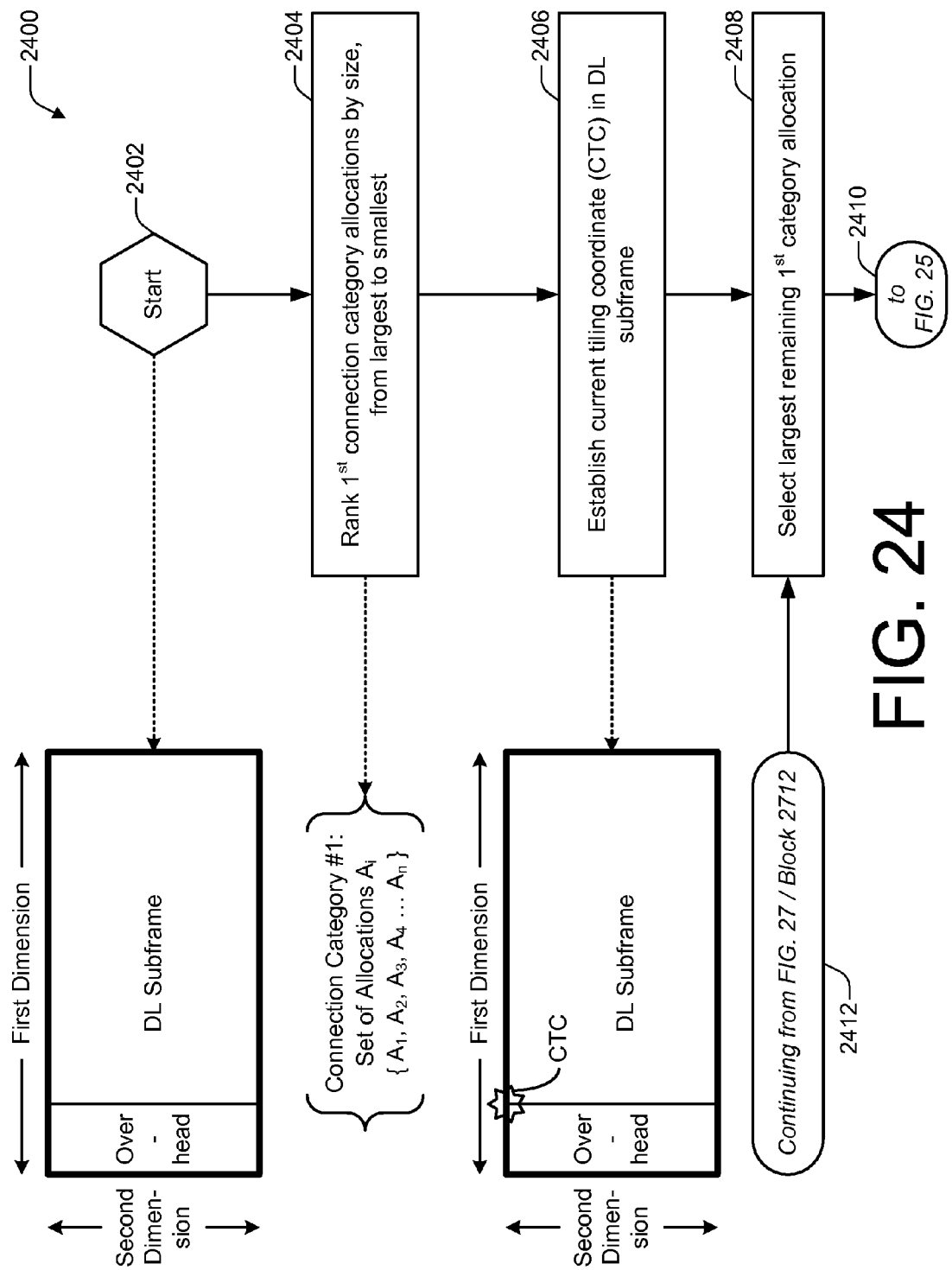
FIGS. 24-27 jointly show a flow diagram that illustrates a more-specific example method for a striping approach to tiling allocations.

At block 2402 of FIG. 24, the method is started with a DL subframe having a first dimension and a second dimension. Either of the first and second dimensions may correspond to time or frequency. A portion of a DL subframe is typically consumed by overhead communications for the wireless system.

At block 2404, first connection category allocations are ranked by size, from largest to smallest. These example allocations A(i) are indicated to be A1, A2, A3, A4 . . . An. At block 2406, a current tiling coordinate (CTC) is established in the DL subframe. Because no allocations have yet been tiled, the CTC may be established at, for example, any of the four corners of unused area of the DL subframe.

At block 2408, the largest remaining first category allocation is selected. In the first loop, this allocation is A1. As indicated by block 2410, the method continues at FIG. 25.

Figure 25:
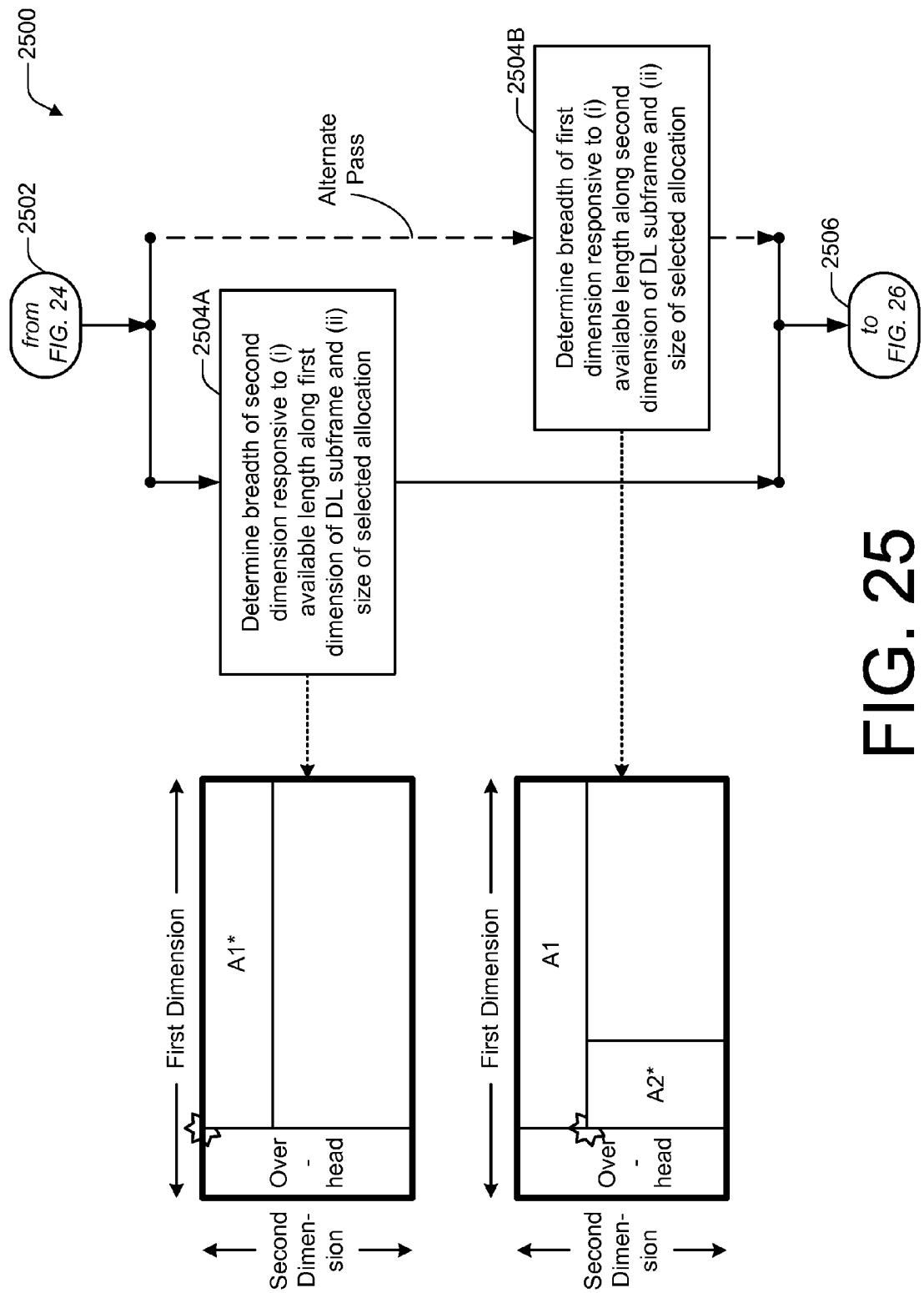

The method continues from FIG. 24 to FIG. 25 at block 2502. Flow diagram 2500 of FIG. 25 illustrates the alternating nature of striping allocations in different directions along the two dimensions. At block 2504A, for the selected allocation, the breadth of the second dimension is determined responsive to (i) the available length along the first dimension of the DL subframe and (ii) the size of the selected allocation. For example, allocation A1 may be striped lengthwise along the first dimension and then expanded in breadth along the second dimension to accommodate the total size of allocation A1. A more mathematical striping description of bandwidth allocation tiling is provided herein below with particular reference to FIG. 28.

The alternate pass or direction (of block 2504B) is described herein below as part of a second pass through the method. As noted herein above and as shown in FIG. 23, the direction of striping need not be alternated each and every pass through the method. As indicated by block 2506, the method continues at FIG. 26.

Figure 26:
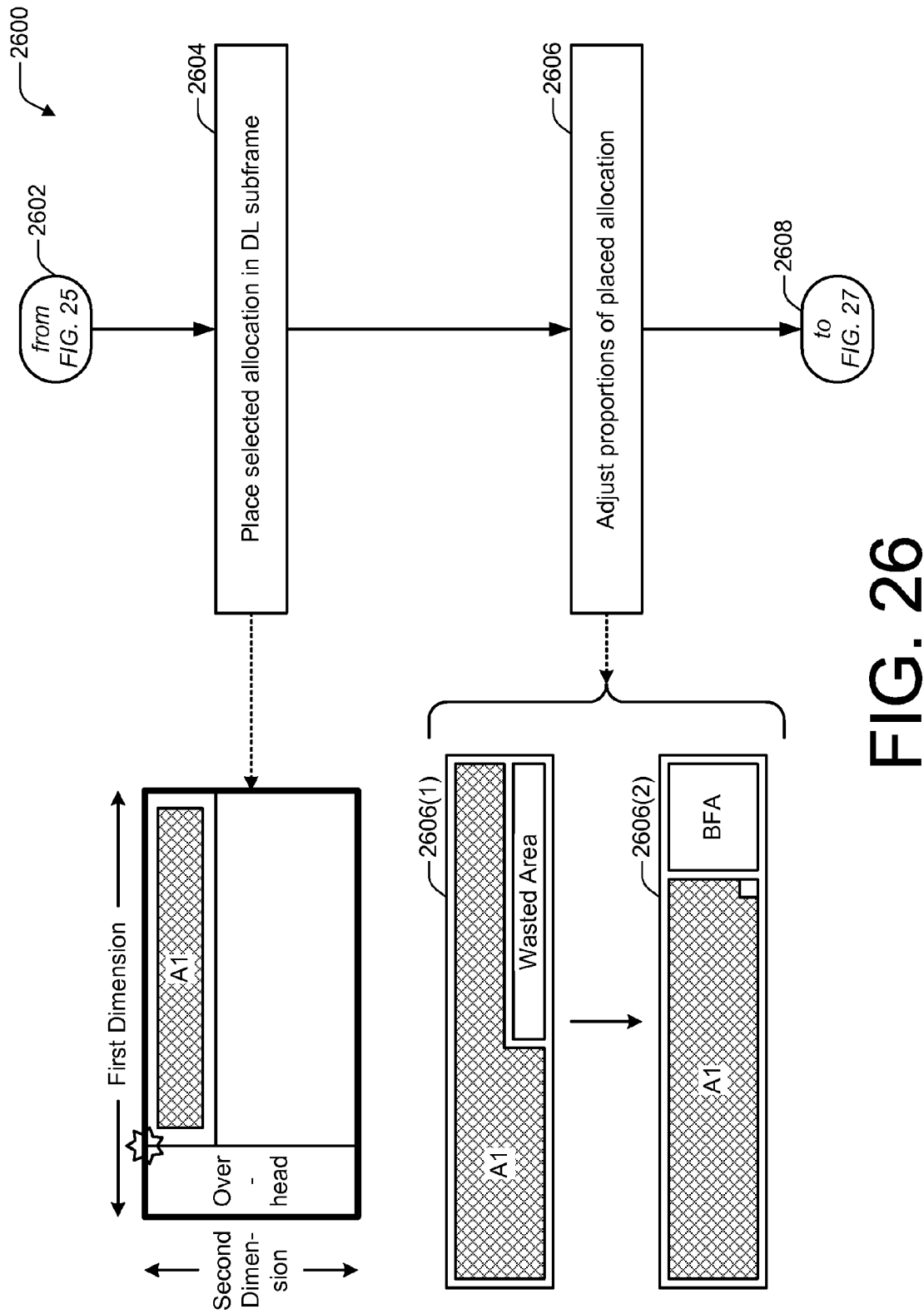

The method continues from FIG. 25 to FIG. 26 at block 2602. At block 2604, the selected allocation is placed within the DL subframe. For example, allocation A1 is indicated as being placed within the DL subframe by the cross-hatched area. As is apparent, due to rounding constraints, there is extra unused spaced between the actual allocated bandwidth for A1 and the preliminary dimensioning.

This extra area is shown in conjunction with block 2606 at tiling areas 2606(1) and 2606(2). The preliminary dimensioning of the tile for allocation A1 is tiling area 2606(1) when allocation A1 is striped completely toward the edge of the first dimension. However, this creates a wasted area when operating in accordance with a standard that requires allocation tiles to be rectangular. A BFA may potentially be created by adjusting the actual slot placement.

At block 2606, the proportions of the placed allocation are adjusted. For example, by compressing the actual placement of individual slots, the final area for allocation A1 may be made rectangular while also creating a rectangular BFA. This is shown by tiling area 2606(2). As indicated by block 2608, the method continues at FIG. 27.

Figure 27:
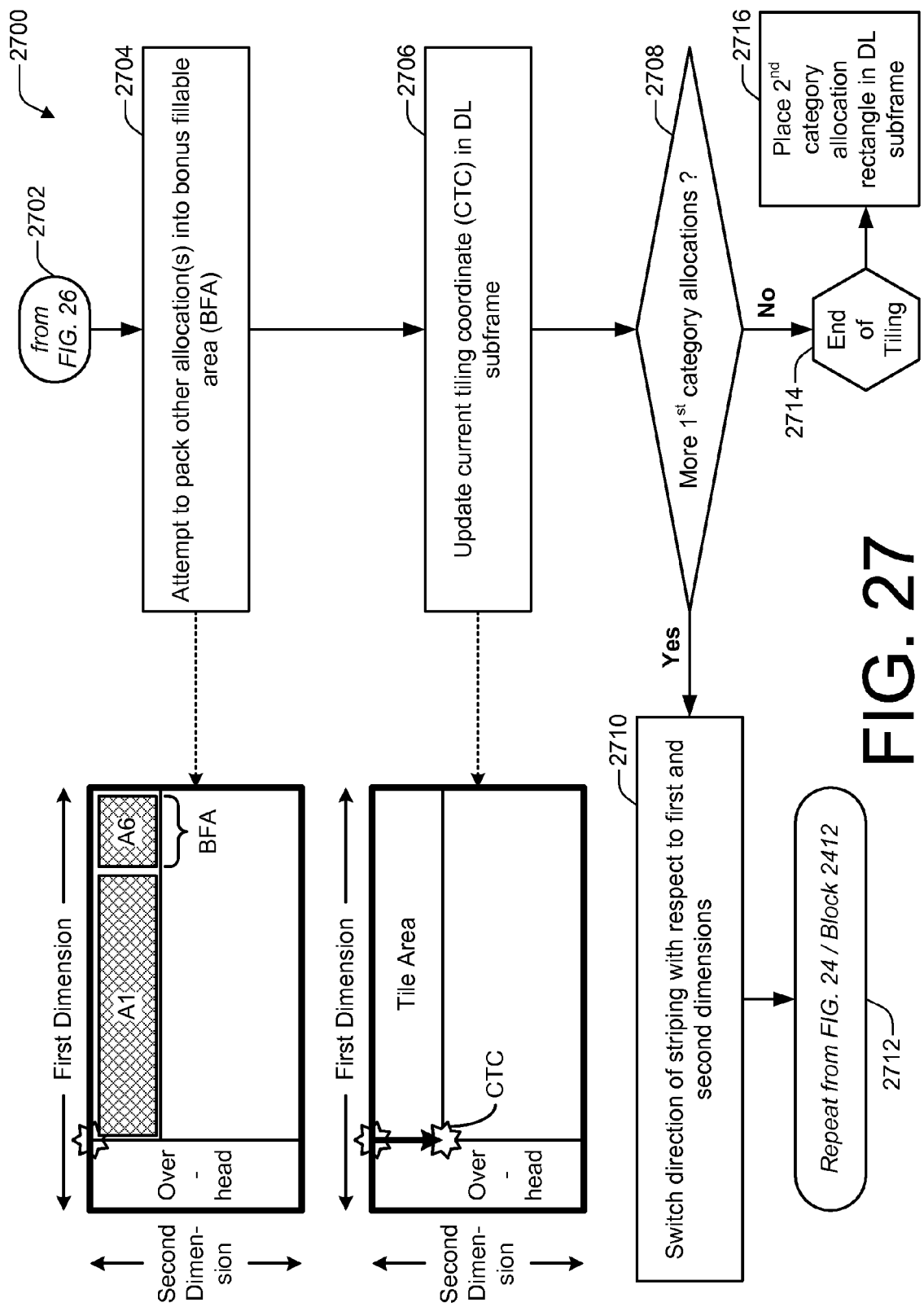

The method continues from FIG. 26 to FIG. 27 at block 2702. At block 2704, packing other allocation(s) into the BFA is attempted. For example, allocation A6 may be packed into the BFA as shown. As described herein above with particular reference to FIG. 22, the packing (and slot placement compression, if appropriate) may be performed iteratively.

At block 2706, the CTC in the DL subframe is updated. For example, the location of the CTC may be moved to compensate for the newly tiled area by adding the breadth of the new allocation to the CTC. As shown, when the recent tiling is extended along the first dimension and expanded along the second dimension, the CTC is moved along the second dimension an amount equal to the breadth of the newly-tiled allocation. CTC updating is described in more detail herein below with particular reference to FIG. 28.

At block 2708, it is determined if there are more first connection category allocations that remain to be tiled. If so, then at block 2710, the direction of striping with respect to the first and second dimensions of the DL subframe is switched. In other words, the striping direction is swapped, which is also indicated by the alternate path of FIG. 25 along with alternative blocks 2504A and 2504B. As indicated previously, this switching need not be performed after each tiling.

At block 2712, the method is repeated from block 2412 of FIG. 24. With reference to FIG. 24, block 2412 indicates that the method is continued at block 2408. At block 2408, the next largest remaining first category allocation is selected. In a second loop, the second largest remaining allocation is allocation A2 (assuming A2 was not placed within a BFA). As indicated by block 2410, the second loop for the method continues at FIG. 25.

The second loop for the method continues from FIG. 24 to FIG. 25 at block 2502. Flow diagram 2500 of FIG. 25 illustrates the alternating nature of striping allocations in different directions along the two dimensions. In this example second loop, the action(s) of block 2504B are performed. At block 2504B, for the selected allocation, the breadth of the first dimension is determined responsive to (i) the available length along the second dimension of the DL subframe and (ii) the size of the selected allocation. For example, allocation A2 may be striped lengthwise along the second dimension and then expanded in breadth along the first dimension to accommodate the total size of allocation A2. Some amount or frequency of alternating the striping directions for the first connection category allocations facilitates the production of a rectangular region for the second connection category allocations.

Continuing with flow diagram 2700 of FIG. 27, if there are no more first connection category allocations (as determined at block 2708), the tiling of first connection category allocations is completed as indicated by block 2714. At block 2716, the tiling of the second connection category allocations can be completed by placing in the DL subframe at least one rectangular tile having an area at least as great as the total size of all of the second connection category allocations. For example, the area for the second category connections may be as large as can be accommodated by the remaining subframe area after the first connection category allocations have been tiled as long as a rectangular shape is maintained. This area for the second category connections may be limited by the total demand of all of the connections in the second category. Additionally, a given wireless standard may limit the maximum size of each block in a particular region.

Figure 28:
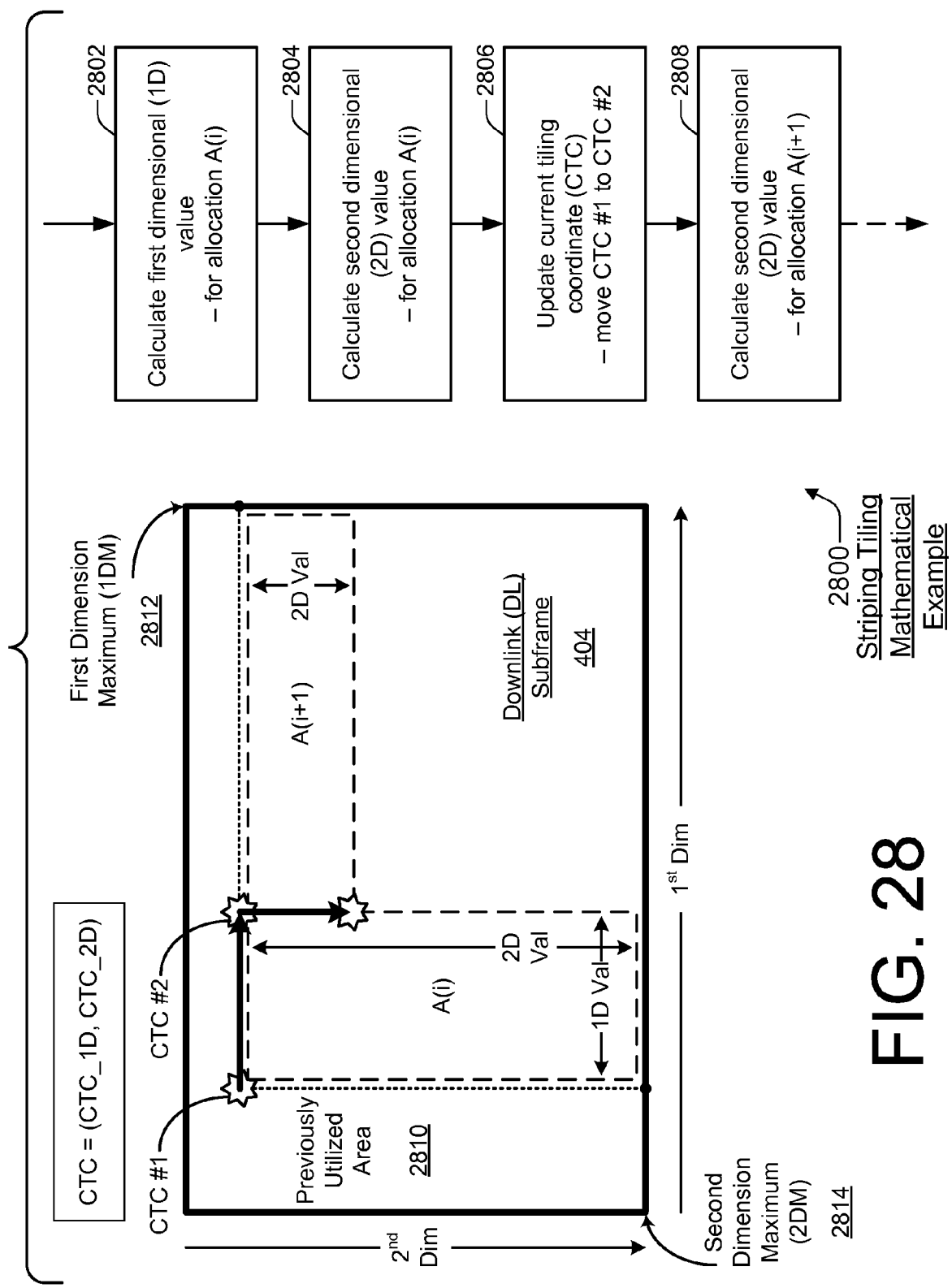
FIG. 28 includes a block diagram and a flow diagram that illustrate a mathematical example for a striping approach to tiling allocations.

FIG. 28 includes a block diagram and a flow diagram 2800 that illustrate a mathematical example for a striping approach to tiling bandwidth allocations. Flow diagram 2800 includes four (4) blocks 2802-2808. Although the actions of flow diagram 2800 may be performed in other environments and with a variety of hardware, firmware, and/or software combinations, the environments and components otherwise described herein and/or illustrated in the referenced figures are used to illuminate example implementations of the method.

A DL subframe 404 is depicted as part of FIG. 28. The DL subframe has a first dimension and a second dimension. Either the first dimension or the second dimension may correspond to time, with the other dimension corresponding to frequency. A first dimension maximum (1DM) 2812 and a second dimension maximum (2DM) 2814 are indicated at the ends of the first and second dimensions, respectively, for DL subframe 404.

The illustrated DL subframe 404 includes a previously-utilized area 2810. This previously-utilized area 2810 may include overhead communications, previously-tiled allocations, and so forth. Two allocations are specifically shown on DL subframe 404: allocation A(i) and allocation A(i+1). Allocation A(i) has a 2D value along the second dimension and a 1D value along the first dimension. A 2D value along the second dimension is also illustrated for allocation A(i+1). Three CTCs are illustrated: CTC #1 is the CTC for tiling allocation A(i), and CTC #2 is the CTC for tiling allocation A(i+1). The CTC has two coordinate values (CTC_1D, CTC_2D).

At block 2802, a first dimensional value for allocation A(i) is calculated. For example, the 1D value (1D Val) for allocation A(i) may be determined by equation T6 as follows:

$$A(i)\_1DVal = \text{ceil}\left[\frac{A(i)\_Area\_Allocation}{(2DM - CTC\#1\_2D)}\right]. \quad \text{(Eqn T6)}$$

The "A(i)_Area_Allocation" variable represents the allocated area for connections A(i). The "CTC#1_2D" variable represents the value of CTC #1 along the second dimension. The "ceil" function rounds up the value of its object (e.g., 2.39 is rounded up to 3.0 by the "ceil" function). The value "(2DM−CTC#1_2D)" is the preliminary length for allocation A(i). The "1D Val" is the breadth of allocation A(i).

The proportions of allocation A(i) are adjusted by compressing the actual slot placement to produce a BFA. Thus, at block 2804, a second dimensional value for allocation A(i) is calculated. The adjusted 2D value (2D Val) for allocation A(i) may be determined by equation T7 as follows:

$$A(i)\_2DVal = \text{ceil}\left[\frac{A(i)\_Area\_Allocation}{A(i)\_1DVal}\right]. \quad \text{(Eqn T7)}$$

The value for the "A(i)_2D Val" variable is the final length for allocation A(i). If a BFA is created, an attempt to pack one or more allocations into it may be performed.

At block 2806, the CTC is updated by moving it along the dimension of the breadth of the tiled allocation A(i) to the extent it was expanded along that dimension. In FIG. 28, the CTC is moved from CTC #1 to CTC #2. The CTC may be updated after tiling allocation A(i) by moving it from CTC #1 to CTC #2 in accordance with equation T8 below:

$$CTC\_Updated=[(CTC\_1D+A(i)\_1D\text{ Val}),(CTC\_2D)]. \quad \text{(Eqn T8)}$$

In this example, the next allocation is being tiled in a different direction—along the first dimension. At block 2808, the second dimensional value for allocation A(i+1) is calculated. The 2D Val for allocation A(i+1) may be calculated by equation T9 as follows:

$$A(i+1)\_2DVal = \text{ceil}\left[\frac{A(i+1)\_Area\_Allocation}{(1DM - CTC\#2\_1D)}\right]. \quad \text{(Eqn T9)}$$

This example mathematical method may be continued for allocation A(i+1) and then additional allocations. The 1D value (1D Val) for allocation A(i+1) (not explicitly shown in FIG. 28) may be determined by equation T10 as follows:

$$A(i+1)\_1DVal = \text{ceil}\left[\frac{A(i+1)\_Area\_Allocation}{A(i+1)\_2DVal}\right]. \quad \text{(Eqn T10)}$$

The tiling for allocation A(i+1) is extended lengthwise along the first dimension and expanded in breadth along the second dimension. Hence, the CTC may be updated after tiling allocation A(i+1) by moving CTC #2 along the second dimension in accordance with equation T11 below:

$$CTC\_Updated=[(CTC\_1D),(CTC\_2D+A(i+1)\_2D\text{ Val})]. \quad \text{(Eqn T11)}$$

Figure 29:
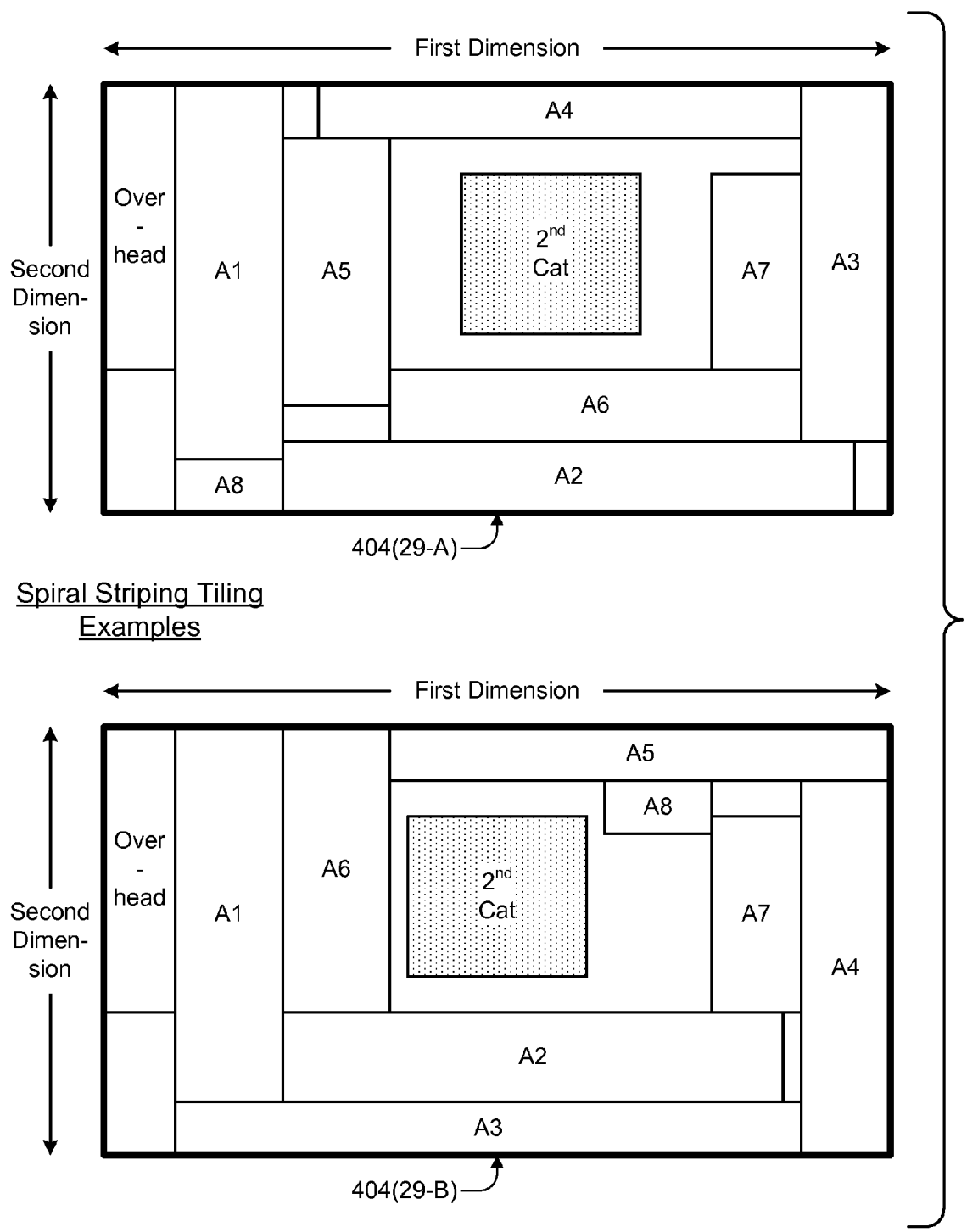
FIG. 29 depicts block diagrams of DL subframes illustrating example alternative spiral techniques for a striping approach to tiling allocations.

FIG. 29 depicts block diagrams of DL subframes 404(29-A) and 404(29-B) illustrating example alternative spiral techniques for a striping approach to tiling bandwidth allocations. The striping techniques that are illustrated in previous figures (e.g., FIGS. 20, 23, 28, etc.) form a right angle pattern as allocations are striped in different directions. However, other patterns may be formed when striping allocations in alternate directions. An example alternative pattern is the spiral pattern of FIG. 29.

The right-angle pattern shown in previous figures produces a rectangular area for a second category of connections that is located, more or less, in a corner quadrant. In contrast, the spiral pattern produces a rectangular area for a second category of connections that is located, more or less, in a centralized region.

DL subframes 404(29-A) and 404(29-B) illustrate two different spiral techniques. DL subframe 404(29-A) illustrates a spiral technique that applies the BFA strategy for packing relatively smaller allocations onto the subframe. DL subframe 404(29-B), on the other hand, attempts to tile a next largest allocation without leaving any BFAs.

With reference to DL subframe 404(29-A), allocation A1 is tiled along the second dimension toward the 2D maximum. A BFA is created "below" allocation A1. The largest allocation that can fit within the BFA, allocation A8, is packed into this area. Starting from the edge of allocation A1, allocation A2 is tiled along the first dimension toward the 1D maximum.

Allocation A3 is then tiled "upward" along the second dimension toward an edge of the second dimension, which may be considered the 2D maximum in that direction. Allocations A4, A5, A6, and A7 are then tiled in a continuing spiral pattern. If there were an allocation, say allocation A9, that would fit to the right of allocation A2, to the left of tiled allocation A4, or below allocation A5, it would have been packed into one of these BFAs.

With reference to DL subframe 404(29-B), BFAs are largely eliminated. Again, allocation A1 is tiled along the second dimension toward the 2D maximum. To prevent the formation of a BFA, the next allocation is to be tiled, at least partially, "below" allocation A1. In this example, allocation A2 will not fit both below allocation A1 and within the confines of the first dimension. Consequently, allocation A3 is tiled along the first dimension toward the 1D maximum because it also fits below tiled allocation A1.

Allocations are continued to be tiled in decreasing size order. However, allocation A2 cannot fit to the right of tiled allocation A3 and within the confines of the second dimension. Consequently, the next largest allocation, allocation A4, is tiled. This spiral tiling procedure is continued through allocations A5 and A6 until there is ample area for allocation A2 to be tiled. Allocations A7 and A8 are then tiled in the spiral pattern. A central region remains for the tiling of a rectangle for the connections of category #2.

There is a likelihood that the spiral technique of DL subframe 404(29-B) will also eventually result in one or more BFAs, as shown to the right of tiled allocation A2 and above tiled allocation A7, which may be unfillable. Moreover, there is a possibility that there may never be a sufficiently-sizable area for a larger allocation, such as allocation A2, to be tiled onto the subframe after it is skipped earlier in the tiling process. For these reasons, the spiral pattern technique for striping allocation tiles that is illustrated in subframe 404(29-A) generally offers a greater certainty of a successful, efficient tiling as compared to the technique illustrated in subframe 404(29-B).

Figure 30:
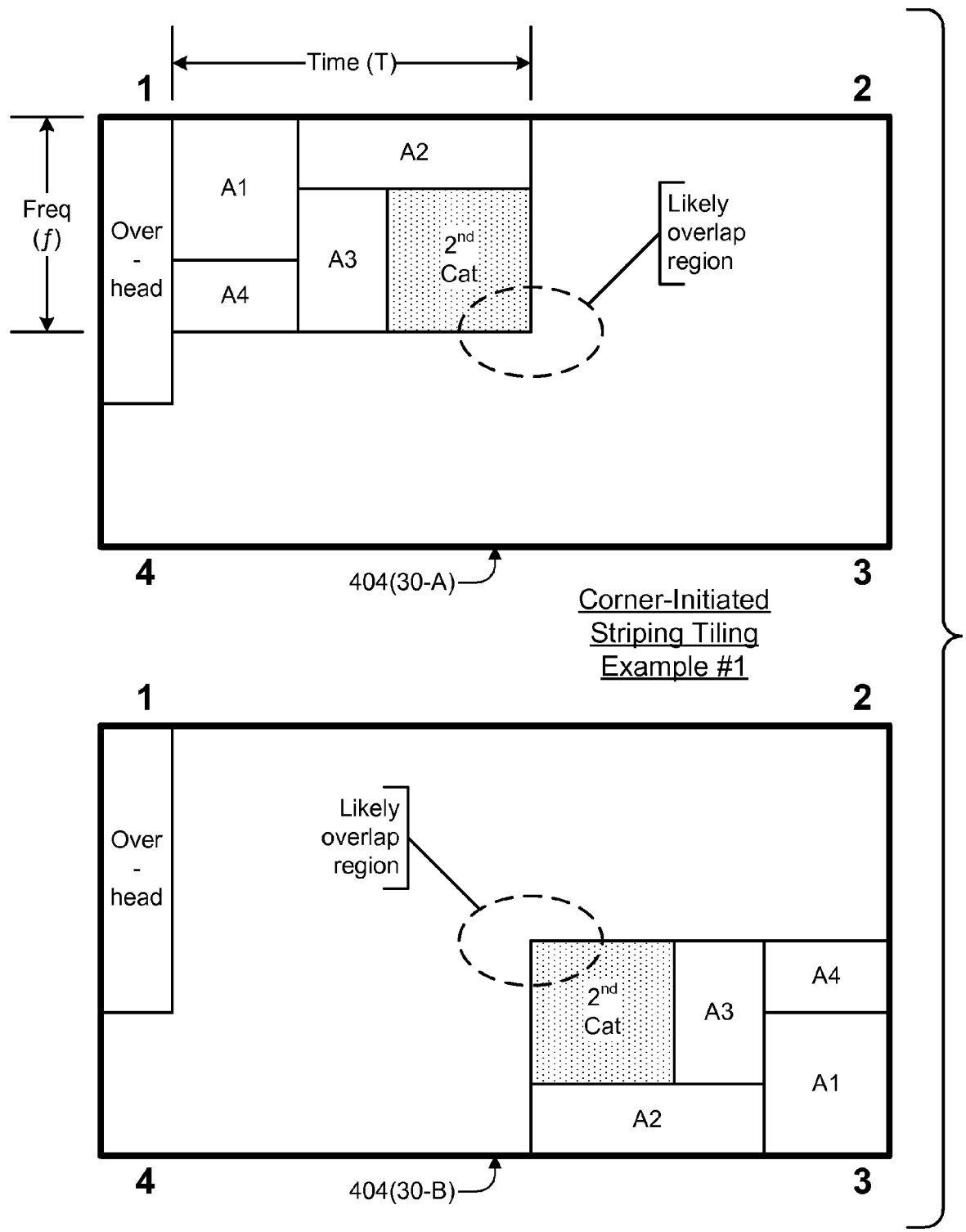
FIG. 30 depicts block diagrams of DL subframes illustrating a first example quadrant-oriented technique for a striping approach to tiling allocations.

FIG. 30 depicts block diagrams of DL subframes 404(30-A) and 404(30-B) illustrating a first example quadrant-oriented technique for a striping approach to tiling bandwidth allocations. These example quadrant-oriented techniques may also be considered corner-initiated striping approaches to tiling because the tiling is started in one of four different corners. Especially in systems that are not loaded to full capacity, these quadrant-oriented techniques can reduce overall system interference. Although they can be implemented in systems of varying load levels, they are particularly adept at reducing interference when each base station is operating at approximately 25% of capacity or less. More specifically, if there are four potentially-interfering base stations, the interference can be reduced to zero if the load on each of them is 25% of capacity of less. Even in systems with greater than 25% load, interference can be reduced and performance can be improved.

At subframes 404(30-A) and 404(30-B), tiling is largely confined to one of four quadrants: 1, 2, 3, or 4. To establish this confinement, the size of the subframe area is artificially limited to T×f. Because the total demand for slots in a given frame is known, the values of T and f may be found subject to: Total_Demand_Category#1_Connections≥T×f. More specifically, the following example computations may be employed. If the size of the original subframe area is M×N (e.g., area A=M×N) and the demand for the allocation is A1, then T=M×√(A1/A) and f=N×√(A1/A) where "√" represents the square root function. It is probably prudent to increase T and f by a few percents (e.g., 5-10%) above the computed values to account for the round-ups that are likely to occur during the tiling.

Tiling may still be performed by striping allocations in alternate directions and packing BFAs. However, the values for 1D Maximum and 2D Maximum (from FIG. 28) are artificially limited to the values determined for T and f. The rectangular tile for second category connections is located in a corner of the artificial subframe region that remains after the first category connection allocations are tiled in the right-angle pattern.

The tiling may be started at any and each of the four quadrant corners: 1, 2, 3, or 4. Tiling is initiated at corner 1 for subframe 404(30-A) and at corner 3 for subframe 404(30-B). Different base stations may start at different corners. For example, a first base station may start at corner 1 while a second base station starts at corner 3. This approach is particularly applicable to AMC zones. In some other modes (e.g., PUSC zones), the frequency assignment to different base stations are random and/or rotate over time. Hence, quadrants 1 and 4 (and similarly for quadrants 2 and 3) would interfere in frequency. In these modes, the separation focus can be in time. Each mode covers the entire frequency band and only a fraction of time in dependence on the allocation size. For example, there can be three non-overlapping areas in time, which are assigned to three interfering sectors of each base station.

With subframe 404(30-A), the tile for the second category connections is located at the bottom-right area of the artificial subframe but near the center of the actual overall subframe. With subframe 404(30-B), the tile for the second category connections is located at the top-left area of the artificial subframe but also near the center of the actual overall subframe. If each base station is loaded by less than approximately 25%, there is no overlap and thus essentially no interference.

If the base station loading is greater than 25%, then the interfering communications are, at least in the initial loadings above 25%, in the likely overlap region, which is indicated in FIG. 30. This likely overlap region corresponds to second category connections. If the second category connections are non-real-time, capable of retransmission without harm, and/or adapted for automatic retransmissions, then any interference that occurs is mitigated. In other words, if the first and second categories of connections are defined such that the second category connections are better able to withstand communication problems resulting from interference, the initiation of tiling in different corners at different base stations can improve overall system performance even if loading exceeds 25% of capacity. For example, HARQ connections in IEEE 802.16 systems are designed to handle automatic retransmissions.

Each base station may start in a different corner of the subframe based on a random determination (e.g., for each subframe). Alternatively, each base station may be assigned a different corner when a wireless system is being planned. Regardless, the corner of tiling initiation and/or the corner selection algorithm may be modified after deployment. As another alternative implementation, instead of a corner initiation, the tiling may be initiated by a base station at any coordinate on the subframe (e.g., to randomly reduce interference).

FIG. 31 depicts block diagrams of DL subframes 404(31-A) and 404(31-B) illustrating a second example quadrant-oriented technique for a striping approach to tiling bandwidth allocations. In this second example quadrant-oriented technique, the artificial subframe is originally sized based on the total demand for slots by the first category connections while excluding the demand by the second category connections. Accordingly, T×f is set responsive to the first connection category allocations. In FIG. 31, these are allocations A1, A2, A3, A4, and A5.

Thus, the tiles that are striped for first connection category allocations effectively form a block. The second category connections are then tiled in two groups: Category #2-1 and Category #2-2. This creates a buffer zone of second category connections around the block of tiled allocations that are of the first connection category. This is illustrated by the two ovals indicating likely regions of overlap between the two (or three or four) base stations.

This second corner-initiated technique for striping can therefore improve the interference handling attributes as compared to the first corner-initiated technique (of FIG. 30). However, there is increased complexity because the second category connections are separated into two different tiles on the DL subframe. Alternatively, the second category connections can still be tiled in one larger rectangle, such as to either exposed side of the combined block of first category connection tiles.

FIGS. 14-19 (distributive) and 20-31 (striping) are described primarily in terms of tiling bandwidth allocations onto a DL subframe. FIGS. 32-35, on the other hand, are described primarily in terms of tiling bandwidth allocations on a UL subframe. Nevertheless, the principles described with reference to FIGS. 14-31 may also be applied to UL subframes, and the principles described with reference to FIGS. 32-35 may also be applied to organize DL subframes. It is also noted that the distributive approach to tiling (or the striping approach to tiling) can be used internally to organize any overall tiling rectangle for the second category connections.

Figure 32:
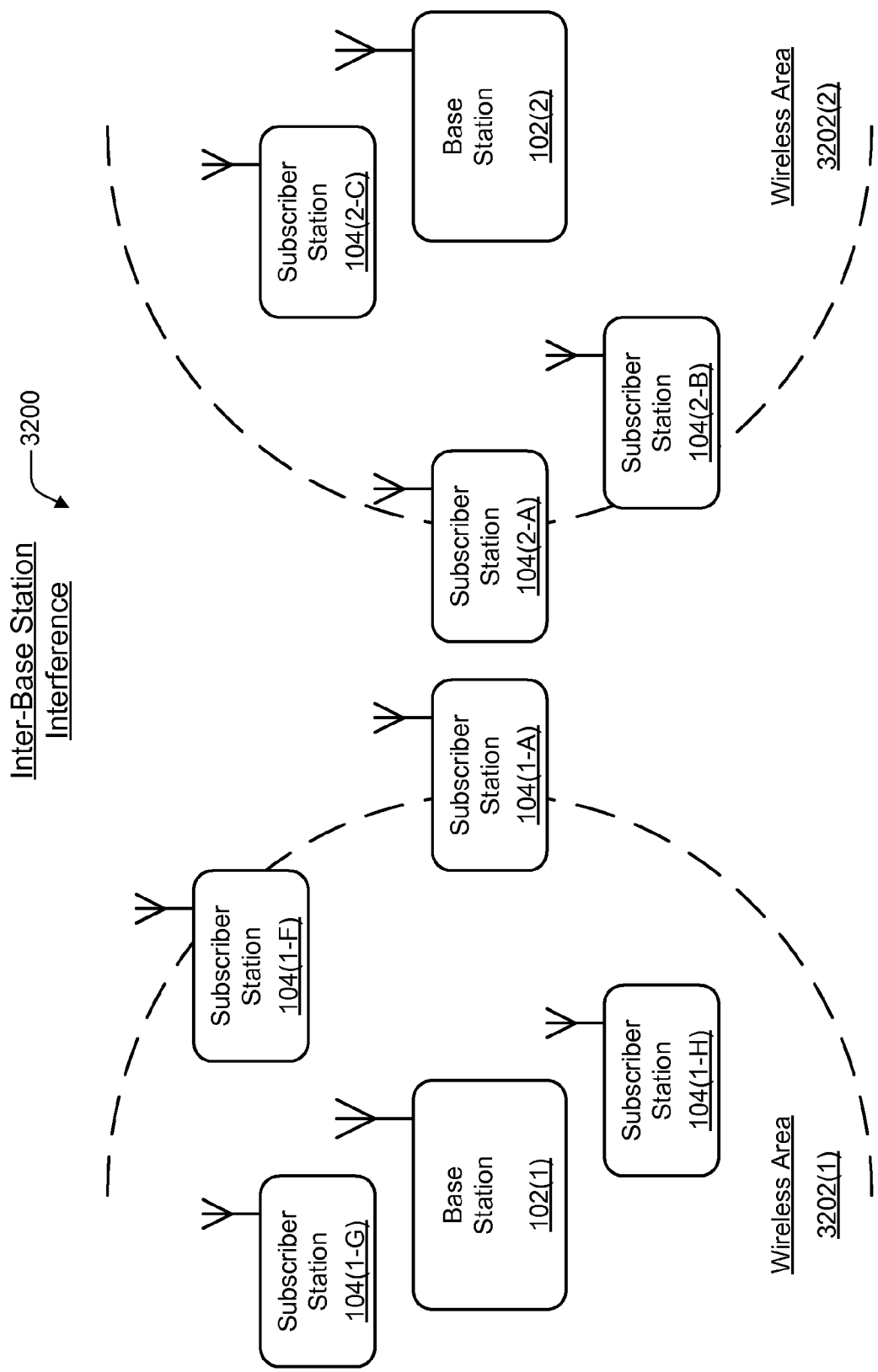
FIG. 32 is a block diagram of two base stations and multiple subscriber stations that illustrate inter-base station interference.

FIG. 32 is a block diagram 3200 of two base stations 102 and multiple subscriber stations 104 that illustrate inter-base station interference. Block diagram 3200 includes a first wireless area 3202(1) and a second wireless area 3202(2). Wireless area 3202(1) is served by a first base station 102(1), and wireless area 3202(2) is served by a second base station 102(2). Base station 102(1) is in communication with subscriber stations 104(1-A), 104(1-F), 104(1-G), and 104(1-H). Base station 102(2) is in communication with subscriber stations 104(2-A), 104(2-B), and 104(2-C).

A number of typical wireless system characteristics may be described with reference to block diagram 3200. First, subscriber stations 104 that are relatively distant from base stations 102 usually transmit at a higher power than those subscriber stations 104 that are relatively proximate to base stations 102. Consequently, relatively distant subscriber stations 104, such as 104(1-A) and 104(2-A), transmit at a higher power and therefore generate a greater amount of interfering electromagnetic emissions with respect to other base stations than relatively proximate subscriber stations 104, such as 104(1-H) and 104(2-C).

Second, the relative distances between a base station 102 and respective subscriber stations 104 may be estimated using Carrier-to-Interference Noise Ratio (CINR) values. The lower that a CINR value of a subscriber station 104 is, the farther the subscriber station 104 is likely to be from its base station 102. Hence, the CINR of subscriber station 104(2-C) is probably greater than the CINR of subscriber station 104(2-B), and the CINR of subscriber station 104(2-B) is probably greater than the CINR of subscriber station 104(2-A).

Figure 33:
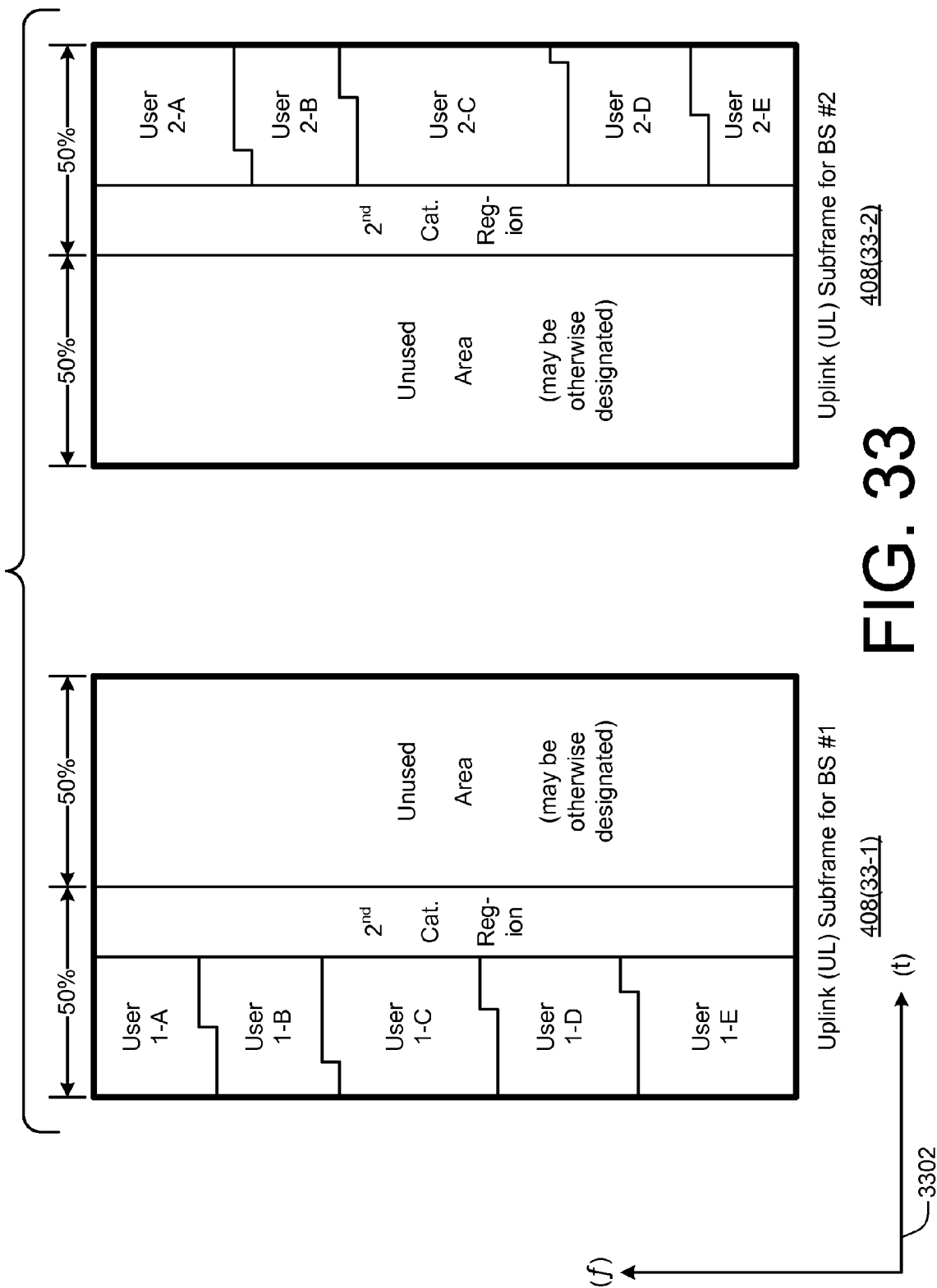
FIG. 33 depicts block diagrams of two UL subframe organizations that can mitigate inter-base station interference.

FIG. 33 depicts block diagrams of two UL subframe organizations 408(33-1) and 408(33-2) that can mitigate inter-base station interference. A time (t) and frequency (f) axis 3302 is also shown. UL subframe for BS #1 408(33-1) is subdivided into two approximately equal areas. However, the 50% split is illustrative only; the areas need not be equal in size or be two in number (e.g., two areas may be divided 60-40, three areas may be divided 33-33-33 or 40-30-30, etc.). The first area includes allocations for users 1-A, 1-B, 1-C, 1-D, and 1-E that are each part of a first category of connections. The first area also includes a region for second category connections. The second area is an unused area. However, it may be otherwise designated. For instance, in accordance with the requirements of certain standards, it may be defined in the MAP as a valid area but left unpopulated. Example approaches include implementing a zone switch, assigning the area as a phony allocation (e.g., a second category region that is left blank), and so forth.

UL subframe for BS #2 408(33-2) is also divided into two approximately equal areas. The first area is an unused area. The second area includes allocations for users 2-A, 2-B, 2-C, 2-D, and 2-E that are each part of a first category of connections. The second area also includes a region for second category connections. The example UL subframes specifically pertain to systems in which UL allocations need not be rectangular; nevertheless, the principles described herein are also applicable to subframes having rectangular tiled allocations.

In a lightly loaded system, the UL subframe organization can be instituted in such a way so as to reduce interference to other base stations through the use of spare, unused areas. These unused areas may be designated as being for category #2 connections, such as being setup as phony HARQ regions in IEEE 802.16 systems, for example. FIG. 33 presents an example of two interfering base stations labeled as BS #1 and BS #2. The UL subframe organization policy of BS #1 is to fill up the first half of UL subframe 408(33-1). The UL subframe organization policy of BS #2 is to fill up the second half of UL subframe 408(332).

This policy enables each base station to receive on the UL from its subscriber stations when the subscriber stations of the other base station are not transmitting. Interference is therefore reduced. By placing the second category connection region between the allocations for connections of the first category and the unused area, the second category connection region can be used as a buffer zone in situations when the load exceeds 50%. Using category #2 connections as a buffer zone is also described herein above with particular reference to FIGS. 30 and 31.

These example UL subframe organization policies can also be extended and applied to cases involving more than two base stations. The UL subframe may be divided, for example, into the number of relevant interfering base stations, such as three or four. The area assigned to each base station may be selected randomly or may be designated during system planning.

Figure 34:
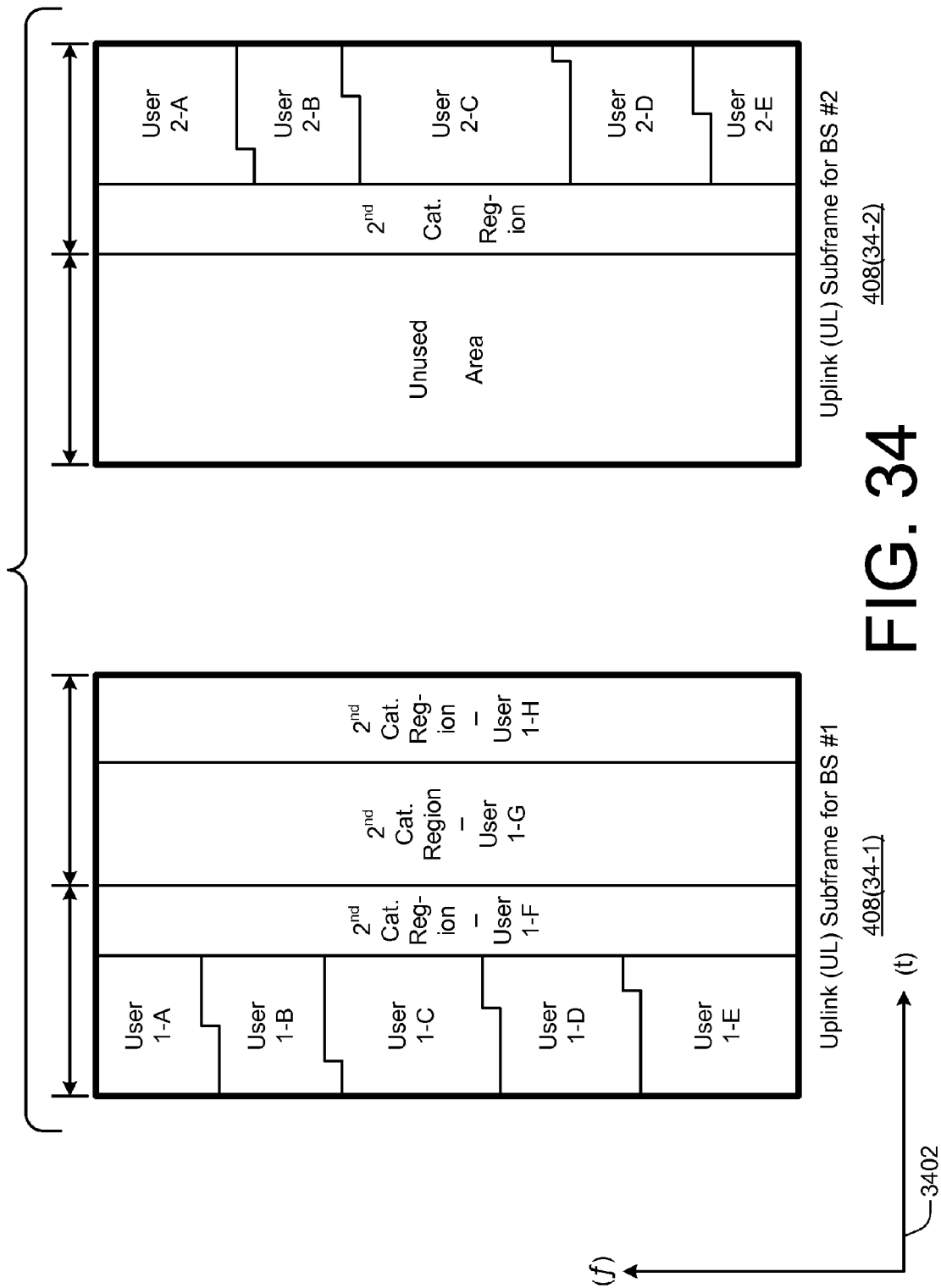
FIG. 34 depicts block diagrams of two other UL subframe organizations that can mitigate inter-base station interference.

FIG. 34 depicts block diagrams of two other UL subframe organizations 408(34-1) and 408(34-2) that can mitigate inter-base station interference. A time (t) and frequency (f) axis 3402 is also shown. In this example, it is assumed that the load of base station 102(1) is such that it has to overlap the time area of the other base station. Overall interference may be reduced if those overlapping time areas are filled with second category connections for users that have a high CINR, which indicates that the subscriber stations 104 of such high-CINR users are near base station 102(1). With reference to FIG. 32, base station 102(1) is in communication with subscriber stations 102(1-F), 102(1-G), and 102(1-H). The CINR value of subscriber station 104(1-F) is lower than either of the CINR values of subscriber stations 104(1-G) or 104(1H).

Consequently, base station 102(1) determines that subscriber station 104(1-F) is most likely to be the most distant from base station 102(1) and thus the most likely to interfere with other base stations, such as base station 102(2), during transmission. In contrast, subscriber stations 104(1-G) and 104(1-H) are likely relatively close and thus less likely to interfere with other base stations.

Hence, the second category connection of subscriber station 104(1-F) is assigned to the first area, when base station 102(2) need not receive from its subscriber stations 104. The second category connections of subscriber stations 104(1-G) and 104(1-H) are assigned to the second area, when base station 102(2) is receiving from its subscriber stations 104 because subscriber stations 104(1-G) and 104(1-H) are less likely to cause interference.

Figure 35:
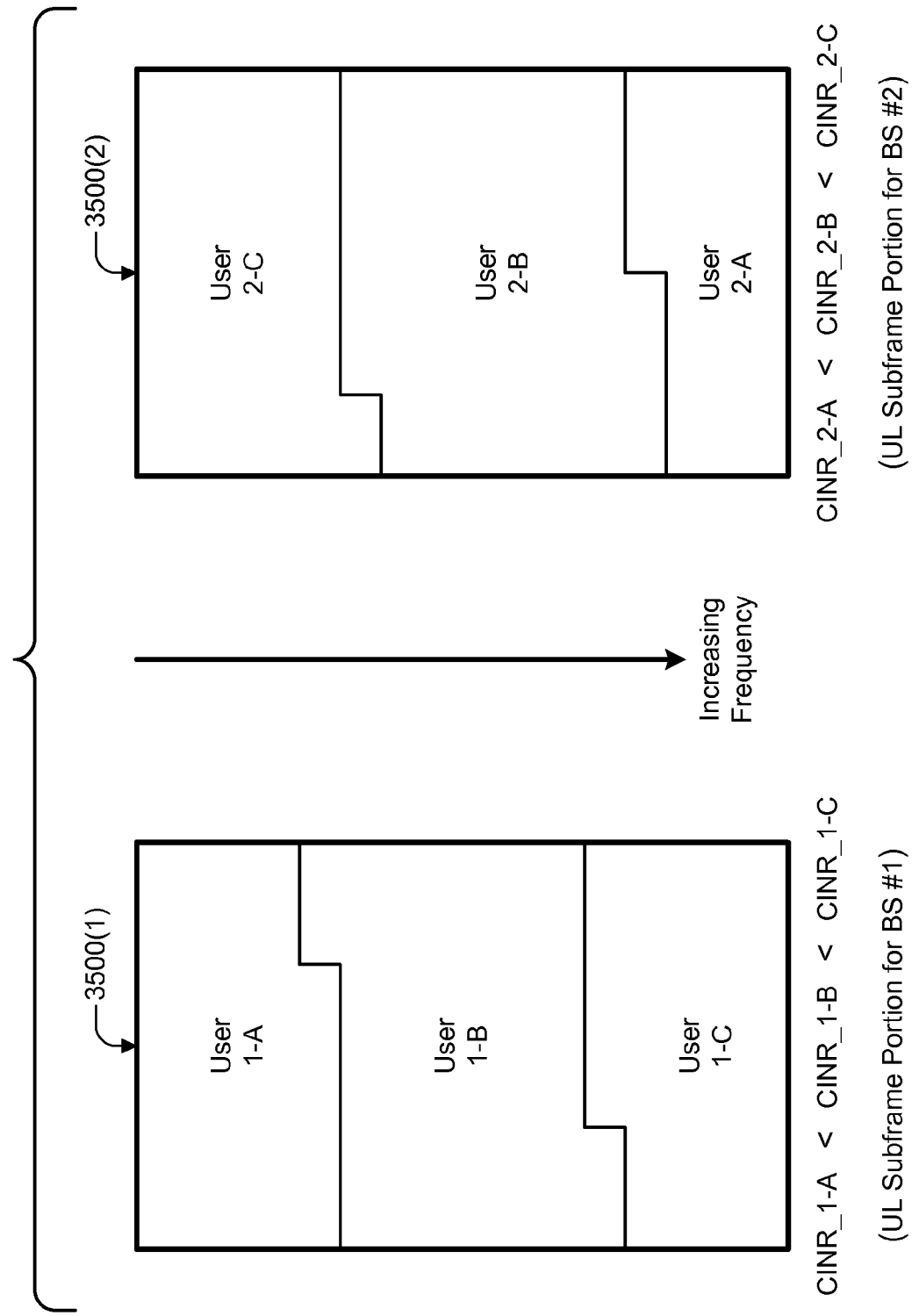
FIG. 35 depicts block diagrams of two UL subframe portions that can be used to mitigate inter-base station interference.
Figure 36:
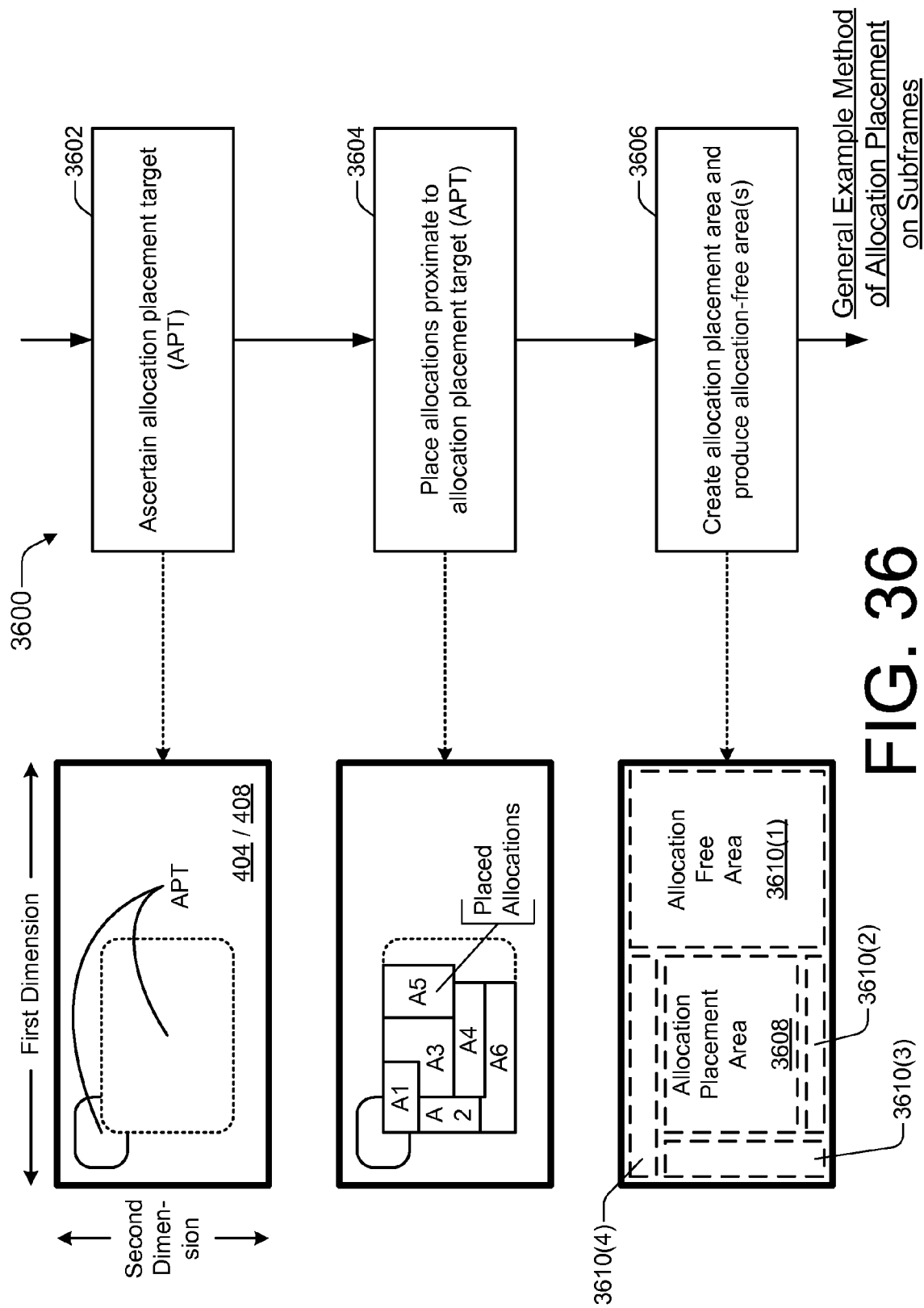
FIG. 36 is a flow diagram that illustrates an example general method for placing allocations onto subframes to mitigate inter-base station interference.

FIG. 35 depicts block diagrams of two UL subframe portions 3500(1) and 3500(2) that can be used to mitigate inter-base station interference. In AMC zones, subchannels have relatively closely clustered subcarriers (as shown in FIG. 3). Hence, in AMC zones, interference can be reduced by separating subscriber stations in frequency. For example, if the subscriber stations in the region of BS #1 are interfering with the subscriber stations in the region of BS #2, each base station can adopt a policy for UL subframe organization that matches high CINR values at one base station with low CINR values at the other base station, and vice versa.

In the example of FIG. 35, each of BS #1 and BS #2 is in communication with three subscriber stations A, B, C, which correspond to users A, B, and C, respectively. For BS #1, CINR_1-A<CINR_1-B<CINR_1-C. For BS #2, CINR_2-A<CINR_2-B<CINR_2-C.

By way of example only, the UL subframe organizational policy of BS #1 is to schedule the users with lowest CINR at the top frequencies and fill up the band in frequency as the CINR increases. On the other hand, the policy of BS #2 is to follow an opposite allocation order such that the user having the lowest CINR is placed at the bottom frequencies and the frequency band is filled up by adding users with higher CINR values at decreasing frequencies.

When following this example policy and as illustrated in FIG. 35, the increasing frequency order for users allocated in UL subframe portion for BS #1 3500(1) is: user 1-A, user 1-B, and user 1-C. The increasing frequency order for users allocated in UL subframe portion for BS #2 3500(2) is: user 2-C, user 2-B, user 2-A.

FIG. 36 is a flow diagram 3600 that illustrates an example general method for placing bandwidth allocations onto subframes 404/408 to mitigate inter-base station interference. Flow diagram 3600 includes three (3) blocks 3602-3606. Although the actions of flow diagram 3600 may be performed in other environments and with a variety of hardware, firmware, and/or software combinations, the environments and components otherwise described herein and/or illustrated in the referenced figures are used to illuminate example implementations of the method. The actions of flow diagram 3600 may be performed by an allocation placement module, such as allocation placement module 3714 (of FIG. 37).

A subframe 404/408 is depicted as part of FIG. 36. The three depictions of subframe 404/408 change in accordance with the action(s) of the associated respective block 3602, 3604, and 3606. This subframe 404/408 has a first dimension and a second dimension. Either the first dimension or the second dimension may correspond to frequency, with the other dimension corresponding to time. Subframe 404/408 may be a DL subframe 404 or an UL subframe 408.

At block 3602, an allocation placement target (APT) is ascertained. For example, an APT may be ascertained on subframe 404/408. The APT may be a CTC (e.g., as shown in FIGS. 24-28), may be a corner or quadrant (e.g., as shown in FIGS. 30-31), may be a region or portion of the subframe (e.g., as shown for specific users in FIGS. 33-34), and so forth. Hence, the APT may be a starting coordinate on the subframe, a corner/quadrant defined on the subframe, a portion delineated on the subframe, and so forth. In the associated subframe 404/408, a starting coordinate APT and a regional APT are both shown by way of example.

The APT may be ascertained in any of many possible manners. For example, it may be ascertained by retrieving it from a storage location at the base station if the APT is unchanging. Alternatively, it may be ascertained from a random decision-making process at the base station. Furthermore, it may be ascertained from communication(s) with other base stations and/or with a centralized controller. Regardless, the ascertainment technique may involve an inter-base station level of coordination so that different respective base stations ascertain different respective APTs, at least on average.

At block 3604, allocations are placed proximate to the allocation placement target. For example, bandwidth allocations may be placed starting at the APT, within the APT, near the APT, or otherwise with respect to the APT. As shown in the associated subframe, allocations A1-A6 are placed proximate to the APT. By way of example only, they can start at the APT-specified coordinate (e.g., where allocation A1 is placed), be placed so as to be contained within the APT region (e.g., as allocations A1-A6 have been placed), and so forth. Although not explicitly shown in FIG. 36, the set of allocations may be placed starting at a corner of the subframe, within a quadrant of the subframe, and so forth. It should be understood that the total demand may cause the allocations to need to be placed beyond a desired APT region when capacity exceeds a given level.

The placed allocations may be any shape and may be identified on the subframe in any manner. They may be rectangular tiles (e.g., allocations A1, A2, A4, and A5), irregular shapes (e.g., allocations A3 and A4), and so forth. The allocations may be placed in a right-angle pattern, in a spiral pattern, randomly, irregularly, some combination thereof, and so forth. Allocations may be identified by two corners for a rectangular shape, by a starting point and an ending point for allocations placed in a ribbon manner, by an amalgamation of shapes forming an allocation, by some combination thereof, and so forth. Although not specifically shown in FIG. 36, there may be unused areas between allocations resulting from relatively inefficient placements.

At block 3606, an allocation placement area is created and allocation-free area(s) are created. For example, at least one allocation placement area 3608 may be created on the subframe. This allocation placement area 3608 corresponds to the area of the subframe on which allocations are placed with the action(s) of block 3604. As a result of placing allocations proximately to the APT, one or more allocation-free areas 3610 are produced. As illustrated, four (4) allocation-free areas 3610(1), 3610(2), 3610(3), and 3610(4) are produced.

Allocation-free areas 3610 are areas for which a particular base station has determined that it will not be transmitting (for a DL subframe 404) or receiving (for an UL subframe 408), or more generally transceiving, in the current subframe. Consequently, one or more other base stations can communicate wirelessly in these allocation-free areas 3610 without causing or suffering from interference with respect to the particular base station.

As shown by FIGS. 30 and 31, these areas 3608 and 3610 may be roughly rectangular and correspond to quadrants for interference mitigation among as many as four different base stations. As shown by FIGS. 33 and 34, these areas 3608 and 3610 may be roughly rectangular and correspond to subframe halves to mitigate interference between two different base stations. However, other area percentages, area shapes, area locations, numbers of base stations, etc. may be involved in such interference mitigation by separating subframes into areas using ascertained APTs and proximate allocation placements. The relative sizes of the areas may be equal for each base station (e.g., each of three base station is given ⅓ of each subframe), may be set and/or weighted based on other parameter(s) (e.g., a current loading level at each base station), and so forth.

Example Device Implementations

Figure 37:
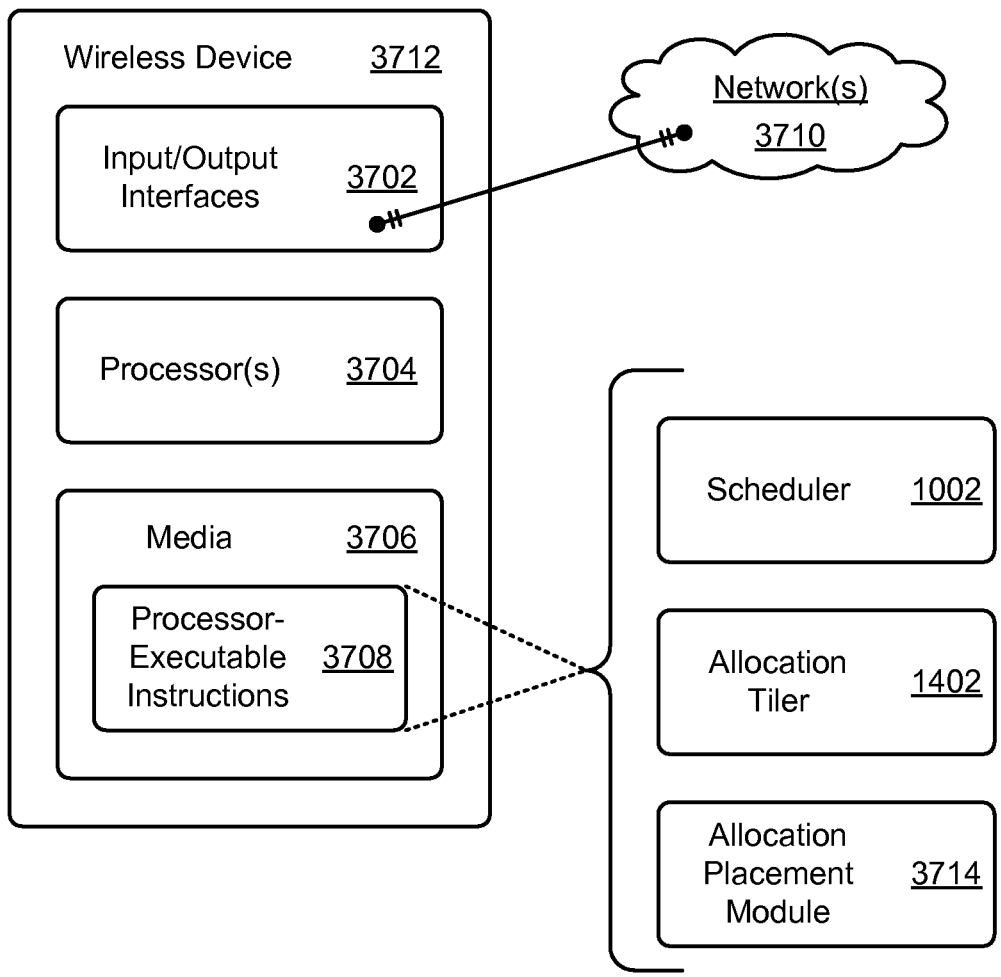
FIG. 37 is a block diagram of an example wireless device that is capable of performing data downlink operations (e.g., a scheduling algorithm, allocation tiling, etc.) using processor-executable instructions and a processor.

FIG. 37 is a block diagram of an example wireless device 3712 that is capable of performing data downlink operations (e.g., a scheduling algorithm, bandwidth allocation tiling, etc.) using processor-executable instructions 3708 and a processor 3704. Examples of wireless device 3712 include, but are not limited to, a base station 102, a subscriber station 104, and so forth. As illustrated, wireless device 3712 includes one or more input/output (I/O) interfaces 3702, at least one processor 3704, and one or more media 3706. I/O interfaces 3702 enable wireless device 3712 to communicate with one or more networks 3710, such as network 108. Networks 3710 may be wireless or wired networks, or a combination thereof, that are operating in accordance with any given standard.

I/O interfaces 3702 may include, by way of example but not limitation, an antenna, an RF component, any component of a baseband integrated circuit (IC), some combination thereof, and so forth. I/O interfaces 3702 may also include interfaces for communicating over wired networks. Such interfaces may include a network interface card, a modem, one or more network ports, some combination thereof, and so forth. Wired network interfaces enable wireless device 3712 to forward information from a wired network to a wireless network, or vice versa.

Processor(s) 3704 may be implemented using any applicable processing-capable technology. Media 3706 may be any available media that is included as part of and/or accessible by wireless device 3712. It includes volatile and non-volatile media, removable and non-removable media, and storage and transmission media (e.g., wireless or wired communication channels).

Processor(s) 3704 may be one or more processors such as central processing units (CPUs), dedicated processing circuits, digital signal processors (DSPs), some combination thereof, and so forth. Generally, processor 3704 is capable of executing, performing, and/or otherwise effectuating processor-executable instructions, such as processor-executable instructions 3708. Media 3706 is comprised of one or more processor-accessible media. In other words, media 3706 may include processor-executable instructions 3708 that are executable by processor 3704 to effectuate the performance of functions by wireless device 3712.

Thus, realizations for data downlink operations may be described in the general context of processor-executable instructions. Processor-executable instructions may include programs, applications, coding, modules, objects, interfaces, components, data structures, frame organizations, etc. that perform and/or enable the performance of particular tasks and/or implement particular data structures. Processor-executable instructions may be located in separate storage media, executed by different processors, and/or propagated over or extant on various transmission media.

As specifically illustrated, media 3706 comprises at least processor-executable instructions 3708. Generally, processor-executable instructions 3708, when executed by processor 3704, enable wireless device 3712 to perform the various functions and operations described herein, including by way of example only those that are associated with the illustrated components and flow diagrams. Processor-executable instructions 3708 may include, by way of example but not limitation, a scheduler module 1002, an allocation tiler module 1402, an allocation placement module 3714, and so forth. Allocation tiler 1402 may be separate from or part of scheduler 1002.

The devices, actions, aspects, features, functions, procedures, modules, schemes, approaches, architectures, components, etc. of FIGS. 1-37 are illustrated in diagrams that are divided into multiple blocks. However, the order, interconnections, interrelationships, layout, etc. in which FIGS. 1-37 are described and/or shown are not intended to be construed as a limitation, and any number of the blocks can be modified, combined, rearranged, augmented, omitted, etc. in any manner to implement one or more methods, apparatuses, systems, devices, procedures, media, arrangements, etc. for performing data downlink operations (e.g., a scheduling algorithm, bandwidth allocation tiling, etc.).

Moreover, although systems, apparatuses, devices, media, methods, procedures, techniques, schemes, approaches, arrangements, and other implementations have been described in language specific to structural, logical, algorithmic, and functional features and/or diagrams, it is to be understood that the invention defined in the appended claims is not necessarily limited to the specific features or acts described above. Rather, the specific features and acts described above are disclosed as example forms of implementing the claims.

What is claimed is:

1. A wireless device configured to operate in accordance with an orthogonal frequency division multiplying (OFDM) scheme or an orthogonal frequency division multiple access (OFDMA) scheme to tile allocations onto a subframe having a time dimension and a frequency dimension, the wireless device comprising:
an allocation tiler configured to lock the time dimension of the subframe and to distribute the allocations along the frequency dimension of the subframe while the time dimension is locked and to lock the frequency dimension of the subframe and to distribute the allocations along the time dimension of the subframe while the frequency dimension is locked, and configured to proportionally distribute the allocations along the time and frequency dimensions of the subframe responsive to relative sizes of the allocations and to available sizes of the time and frequency dimensions of the subframe.

2. The wireless device of claim 1, wherein the allocation tiler is configured to distribute the allocations along the time dimension of the subframe with regard to how the allocations are previously distributed along the frequency dimension of the subframe.

3. The wireless device of claim 1, wherein the allocations comprise bandwith allocations for a plurality of connections.

4. The wireless device of claim 3, wherein the allocation tiler is configured to lock the time dimension of the subframe and distribute the allocations along the frequency dimension of the subframe by:
partitioning the bandwidth allocations into allocation groups according to at least one criterion; and
creating a respective sub-band within the subframe for each respective one of the allocation groups, wherein a size of each sub-band in the frequency dimension corresponds to a ratio of a size of the respective one of the allocation groups associated with the sub-band to a total size of all of the plurality of allocation groups.

5. The wireless device of claim 4, wherein the allocation tiler is configured to lock the frequency dimension of the subframe and distribute the allocation along the time dimension of the subframe by:
partitioning the allocations within a first group of the allocation groups into subgroups according to at least one criterion; and
assigning each of the subgroups within the first group to a portion of the sub-band associated with the first group having a size in the time dimension corresponding to a ratio of a size of the allocations within each respective subgroup to a total size of the allocations within the first group to create tiles of the allocations within the subframe.

6. The wireless device of claim 5, wherein the allocation tiler is configured to repeat the partitioning and assigning for each of the allocation groups.

7. The wireless device of claim 1, wherein the subframe comprises a downlink subframe or an uplink subframe.

8. The wireless device of claim 1, wherein each allocation comprises one of an allocation in bytes and an area allocation that reflects a current modulation and coding scheme for a connection.

9. The wireless device of claim 1, wherein the wireless device is configured to partition the subframe into zones, and wherein the allocation distributions along the time and frequency dimensions of the subframe are performed within individual ones of the partitioned zones.

10. The wireless device of claim 1, wherein the wireless device comprises a base station.

11. The wireless device of claim 1, wherein the allocations comprise allocations per connection and the allocation tiler comprises:
   a grouping unit that is configured to organize the allocations into multiple groups and organize the allocations of each group into multiple subgroups; and
   a distributing unit that is configured to produce tiled allocations by distributing the multiple groups along the frequency dimension while the time dimension is locked and distributing the multiple subgroups along the time dimension while the frequency dimension is locked.

12. The wireless device of claim 11, wherein the distributing unit comprises a proportional distributing unit and the proportional distributing unit is configured to assign a portion of the frequency dimension to each individual group of the multiple groups based on a ratio of a size of each individual group to a total size of the multiple groups.

13. The wireless device of claim 11, wherein the distributing unit comprises a proportional distributing unit and the proportional distributing unit is configured to assign a portion of the time dimension to each individual subgroup of the multiple subgroups based on a ratio of a size of each individual subgroup to a total size of the particular group of which each individual subgroup forms a part.

14. The wireless device of claim 11, wherein the wireless device is configured to operate in accordance with an IEEE 802.16 standard.

15. The wireless device of claim 1, wherein the allocation tiler is configured to lock the frequency dimension of the subframe and distribute the allocations along the time dimension of the subframe while the frequency dimension is locked after locking the time dimension of the subframe and distributing the allocations along the frequency dimension of the same subframe while the time dimension is locked.

16. The wireless device of claim 1, wherein the allocation tiler is configured to lock the time dimension of the subframe and distribute the allocations along the frequency dimension of the subframe while the time dimension is locked after locking the frequency dimension of the subframe and distributing the allocations along the time dimension of the same subframe while the frequency dimension is locked.

17. A method comprising:
   locking a time dimension of a subframe;
   distributing allocations along a frequency dimension of the subframe while the time dimension is locked;
   locking the frequency dimension of the subframe;
   distributing the allocations along the time dimension of the subframe while the frequency dimension is locked; and
   proportionally distributing the allocations along the time and frequency dimensions of the subframe responsive to relative sizes of the allocations and to available sizes of the time and frequency dimensions of the subframe.

18. The method of claim 17, further comprising:
   creating groups of allocations; and
   creating subgroups of allocations within a group of the groups of allocations,
   wherein the distributing allocations along the frequency dimension comprises proportionally distributing the groups of allocations along the frequency dimension of the subframe while the time dimension is locked, and
   wherein the distributing the allocations along the time dimension comprises proportionally distributing the subgroups of allocations along the time dimension of the subframe while the frequency dimension is locked.

19. The method of claim 18, further comprising:
   repeating the creating subgroups of allocations and the proportionally distributing the subgroups of allocations for each group of the groups of allocations.

20. The method of claim 18, further comprising:
   partitioning the subframe into multiple zones; and
   for each zone of the multiple zones, repeating the creating groups of allocations, locking the time dimension, proportionally distributing the groups of allocations, creating subgroups of allocations, locking the frequency dimension, and proportionally distributing the subgroups of allocations.

21. The method of claim 18, wherein the proportionally-distributed subgroups of allocations comprise tiles on the subframe, and the method further comprises:
   filling respective tiles with data corresponding to connections that are associated with the allocations of respective proportionally-distributed subgroups.

22. The method of claim 18, wherein the proportionally distributing the groups of allocations comprises:
   assigning to each respective group of allocations a respective portion of the frequency dimension that is proportional to a respective size of the respective group of allocations relative to a total size of the groups of allocations.

23. The method of claim 18, wherein the proportionally distributing the subgroups of allocations comprises:
   assigning to each respective subgroup of allocations a respective portion of the time dimension that is proportional to a respective size of the respective subgroup of allocations relative to a total size of the group of allocations from which the respective subgroup of allocations is created.

24. The method of claim 18, wherein the creating groups of allocations comprises:
   creating the groups of allocations from individual allocations based on one or more of the following criteria: channel condition preferences of each subscriber station, modulation and coding scheme of each connection, allocation leveling for each group across the groups of allocations, and active antenna systems/multiple input, multiple output (AAS/MIMO).

25. The method of claim 18, wherein the creating subgroups of allocations within the group of the groups of allocations comprises:
   creating the subgroups of allocations based on one or more of a constellation and a coding rate of each connection.

26. The method of claim 17, wherein the allocations comprise allocation areas, and the method further comprises:
   organizing connections into multiple connection groups, each respective connection associated with a respective allocation area; and determining a connection group allocation area for a connection group of the multiple connection groups, wherein the locking the time dimension and distributing allocations along the frequency dimension comprise determining a portion of the frequency dimension of the subframe to be apportioned to the connection group based on the connection group allocation area, an area of the subframe, and a size of the frequency dimension.

27. The method of claim 26, wherein the determining the connection group allocation area comprises:
summing the respective allocation areas of the respective connections that are organized into the connection group to determine the connection group allocation area.

28. The method of claim 26, wherein the determining the portion of the frequency dimension of the subframe comprises:
determining the portion of the frequency dimension of the subframe to be apportioned to the connection group based on a percentage of the size of the frequency dimension that is responsive to a ratio of the connection group allocation area and the area of the subframe.

29. The method of claim 26, wherein the determining the connection group allocation area and the determining the portion of the frequency dimension of the subframe are both performed for each connection group of the multiple connection groups.

30. The method of claim 26, further comprising:
organizing the connections of the connection group into multiple subgroups; and
determining a subgroup allocation area for a subgroup of the multiple subgroups,
wherein the locking the frequency dimension and the distributing the allocations along the time dimension comprise determining a portion of the time dimension of the subframe to be apportioned to the subgroup based on the subgroup allocation area, the connection group allocation area, and a size of the time dimension.

31. The method of claim 30, wherein the determining the subgroup allocation area comprises:
summing the respective allocation areas of the respective connections that are organized into the subgroup to determine the subgroup allocation area.

32. The method of claim 30, wherein the determining the portion of the time dimension of the subframe comprises:
determining the portion of the time dimension of the subframe to be apportioned to the subgroup based on a percentage of the size of the time dimension that is responsive to a ratio of the subgroup allocation area and the connection group subframe area.

33. The method of claim 30, wherein the determining the subgroup allocation area and the determining the portion of the time dimension of the subframe are both performed for each subgroup of the multiple subgroups.

34. The method of claim 30, further comprising:
partitioning the subframe into multiple zones; and
determining a zone area for a zone of the multiple zones responsive to the connections,
wherein the area of the subframe comprises the zone area, and
wherein the organizing and the determining are performed in each zone of the multiple zones.

35. The method of claim 30, wherein a dimensionality of the subgroup is established by the portion of the frequency dimension and the portion of the time dimension.

36. The method of claim 30, wherein between the portion of the frequency dimension and the portion of the time dimension, one portion has units of symbol groups while the other portion has units of subchannel groups.

37. The method of claim 30, wherein the areas are in units of slots.

38. A non-transitory machine readable medium storing a set of instructions for execution by one or more processors for tiling allocations onto a subframe having a time dimension and a frequency dimension, the set of instructions, when executed by the one or more processors, to:
lock a time dimension of a subframe;
distribute allocations along a frequency dimension of the subframe while the time dimension is locked;
lock the frequency dimension of the subframe;
distribute the allocations along the time dimension of the subframe while the frequency dimension is locked; and
proportionally distribute the allocations along the time and frequency dimensions of the subframe responsive to relative sizes of the allocations and to available sizes of the time and frequency dimensions of the subframe.

39. A wireless device for transmitting standardized frames in an orthogonal frequency division multiplexing (OFDM) wireless network, each standardized frame containing a downlink subframe, the wireless device comprising:
an allocation tiler that is configured to receive allocations per connection and tile the allocations in slots onto the downlink subframe, the downlink subframe having a time dimension and a frequency dimension, the allocation tiler comprising:
a grouping unit that is configured to organize the allocations into multiple groups and organize the allocations of each group into multiple subgroups; and
a distributing unit that is configured to produce tiled allocations by distributing the multiple groups along the frequency dimension while the time dimension is locked and distributing the multiple subgroups along the time dimension while the frequency dimension is locked, and proportionally distribute the allocations along the time and frequency dimensions of the subframe responsive to relative sizes of the allocations and to available sizes of the time and frequency dimensions of the subframe.

40. A method for tiling allocations onto a downlink subframe of a standardized frame that is for transmission in an orthogonal frequency division multiplexing (OFDM) wireless network, the method comprising:
organizing allocations per connection into multiple groups;
organizing the allocations of each group into multiple subgroups; and
tiling allocations in slots onto the downlink subframe having a time dimension and a frequency dimension by:
distributing the multiple groups along the frequency dimension while the time dimension is locked;
distributing the multiple subgroups along the time dimension while the frequency dimension is locked; and
proportionally distributing the allocations along the time and frequency dimensions of the subframe responsive to relative sizes of the allocations and to available sizes of the time and frequency dimensions of the subframe.

* * * * *